US011741196B2

(12) United States Patent
Ghose

(10) Patent No.: US 11,741,196 B2
(45) Date of Patent: Aug. 29, 2023

(54) DETECTING AND PREVENTING EXPLOITS OF SOFTWARE VULNERABILITY USING INSTRUCTION TAGS

(71) Applicant: The Research Foundation for the State University of New York, Binghamton, NY (US)

(72) Inventor: Kanad Ghose, Vestal, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 890 days.

(21) Appl. No.: 16/684,233

(22) Filed: Nov. 14, 2019

(65) Prior Publication Data

US 2020/0159888 A1    May 21, 2020

Related U.S. Application Data

(60) Provisional application No. 62/767,908, filed on Nov. 15, 2018.

(51) Int. Cl.
*G06F 21/12* (2013.01)
*G06F 21/62* (2013.01)
(Continued)

(52) U.S. Cl.
CPC .......... *G06F 21/123* (2013.01); *G06F 9/3842* (2013.01); *G06F 12/10* (2013.01);
(Continued)

(58) Field of Classification Search
CPC .. G06F 12/0842; G06F 12/10; G06F 12/1408; G06F 12/1441; G06F 12/1483;
(Continued)

(56) References Cited

U.S. PATENT DOCUMENTS 3,956,615 A   5/1976  Anderson et al.
4,599,647 A   7/1986  George et al.
(Continued)

OTHER PUBLICATIONS

D. Y. Deng, D. Lo, G. Malysa, S. Schneider and G. E. Suh, "Flexible and Efficient Instruction-Grained Run-Time Monitoring Using On-Chip Reconfigurable Fabric," 2010 43rd Annual IEEE/ACM International Symposium on Microarchitecture, 2010, pp. 137-148 (IEEE 2010) (Year: 2010).*

(Continued)

*Primary Examiner* — Theodore C Parsons
(74) *Attorney, Agent, or Firm* — Hoffberg & Associates; Steven M. Hoffberg

(57) ABSTRACT

A secure processor, comprising a logic execution unit configured to process data based on instructions; a communication interface unit, configured to transfer of the instructions and the data, and metadata tags accompanying respective instructions and data; a metadata processing unit, configured to enforce specific restrictions with respect to at least execution of instructions, access to resources, and manipulation of data, selectively dependent on the received metadata tags; and a control transfer processing unit, configured to validate a branch instruction execution and an entry point instruction of each control transfer, selectively dependent on the respective metadata tags.

20 Claims, 3 Drawing Sheets

RISC-V Rocket Pipeline showing Security Extensions for SP

(51) Int. Cl.
*G06F 9/38* (2018.01)
*G06F 12/10* (2016.01)
(52) U.S. Cl.
CPC ...... *G06F 21/62* (2013.01); *G06F 2212/1052* (2013.01); *G06F 2212/452* (2013.01)
(58) Field of Classification Search
CPC .... G06F 12/1491; G06F 21/123; G06F 21/54; G06F 21/62; G06F 21/71; G06F 2212/1052; G06F 2212/452; G06F 9/30043; G06F 9/3013; G06F 9/30192; G06F 9/322; G06F 9/3842
See application file for complete search history.

(56) References Cited

U.S. PATENT DOCUMENTS

| | | | |
|---|---|---|---|
| 4,872,157 A | 10/1989 | Hemmady et al. | |
| 4,872,158 A | 10/1989 | Richards | |
| 4,872,159 A | 10/1989 | Hemmady et al. | |
| 4,872,160 A | 10/1989 | Hemmady et al. | |
| 4,875,206 A | 10/1989 | Nichols et al. | |
| 4,893,302 A | 1/1990 | Hemmady et al. | |
| 4,894,824 A | 1/1990 | Hemmady et al. | |
| 4,896,319 A | 1/1990 | Lidinsky et al. | |
| 4,897,874 A | 1/1990 | Lidinsky et al. | |
| 4,899,333 A | 2/1990 | Roediger | |
| 4,922,486 A | 5/1990 | Lidinsky et al. | |
| 4,942,574 A | 7/1990 | Zelle | |
| 4,958,341 A | 9/1990 | Hemmady et al. | |
| 4,977,582 A | 12/1990 | Nichols et al. | |
| 5,204,840 A | 4/1993 | Mazur | |
| 5,603,031 A | 2/1997 | White et al. | |
| 5,729,710 A | 3/1998 | Magee et al. | |
| 5,742,840 A | 4/1998 | Hansen et al. | |
| 5,794,060 A | 8/1998 | Hansen et al. | |
| 5,794,061 A | 8/1998 | Hansen et al. | |
| 5,809,321 A | 9/1998 | Hansen et al. | |
| 5,812,639 A | 9/1998 | Bartholomew et al. | |
| 5,822,603 A | 10/1998 | Hansen et al. | |
| 5,862,325 A | 1/1999 | Reed et al. | |
| 5,864,683 A | 1/1999 | Boebert et al. | |
| 5,867,494 A | 2/1999 | Krishnaswamy et al. | |
| 5,867,495 A | 2/1999 | Elliott et al. | |
| 5,875,296 A | 2/1999 | Shi et al. | |
| 5,892,900 A | 4/1999 | Ginter et al. | |
| 5,909,694 A * | 6/1999 | Gregor | G06F 12/0864 711/140 |
| 5,910,987 A | 6/1999 | Ginter et al. | |
| 5,915,019 A | 6/1999 | Ginter et al. | |
| 5,917,912 A | 6/1999 | Ginter et al. | |
| 5,918,228 A | 6/1999 | Rich et al. | |
| 5,933,816 A | 8/1999 | Zeanah et al. | |
| 5,949,876 A | 9/1999 | Ginter et al. | |
| 5,974,566 A | 10/1999 | Ault et al. | |
| 5,982,891 A | 11/1999 | Ginter et al. | |
| 5,987,506 A | 11/1999 | Carter et al. | |
| 5,999,525 A | 12/1999 | Krishnaswamy et al. | |
| 6,006,318 A | 12/1999 | Hansen et al. | |
| 6,016,393 A | 1/2000 | White et al. | |
| 6,044,205 A | 3/2000 | Reed et al. | |
| 6,088,659 A | 7/2000 | Kelley et al. | |
| 6,088,717 A | 7/2000 | Reed et al. | |
| 6,199,068 B1 | 3/2001 | Carpenter | |
| 6,237,786 B1 | 5/2001 | Ginter et al. | |
| 6,253,193 B1 | 6/2001 | Ginter et al. | |
| 6,289,382 B1 | 9/2001 | Bowman-Amuah | |
| 6,332,163 B1 | 12/2001 | Bowman-Amuah | |
| 6,335,927 B1 | 1/2002 | Elliott et al. | |
| 6,339,832 B1 | 1/2002 | Bowman-Amuah | |
| 6,341,352 B1 | 1/2002 | Child et al. | |
| 6,345,288 B1 | 2/2002 | Reed et al. | |
| 6,357,010 B1 | 3/2002 | Viets et al. | |
| 6,363,488 B1 | 3/2002 | Ginter et al. | |
| 6,385,552 B1 | 5/2002 | Snyder | |
| 6,389,402 B1 | 5/2002 | Ginter et al. | |
| 6,411,309 B1 | 6/2002 | Ly | |
| 6,415,246 B1 | 7/2002 | Snyder | |
| 6,427,063 B1 | 7/2002 | Cook et al. | |
| 6,427,140 B1 | 7/2002 | Ginter et al. | |
| 6,434,568 B1 | 8/2002 | Bowman-Amuah | |
| 6,434,628 B1 | 8/2002 | Bowman-Amuah | |
| 6,438,594 B1 | 8/2002 | Bowman-Amuah | |
| 6,442,748 B1 | 8/2002 | Bowman-Amuah | |
| 6,477,580 B1 | 11/2002 | Bowman-Amuah | |
| 6,477,665 B1 | 11/2002 | Bowman-Amuah | |
| 6,496,850 B1 | 12/2002 | Bowman-Amuah | |
| 6,501,832 B1 | 12/2002 | Saylor et al. | |
| 6,502,102 B1 | 12/2002 | Haswell et al. | |
| 6,502,213 B1 | 12/2002 | Bowman-Amuah | |
| 6,523,027 B1 | 2/2003 | Underwood | |
| 6,529,909 B1 | 3/2003 | Bowman-Amuah | |
| 6,529,948 B1 | 3/2003 | Bowman-Amuah | |
| 6,539,396 B1 | 3/2003 | Bowman-Amuah | |
| 6,542,841 B1 | 4/2003 | Snyder | |
| 6,546,546 B1 | 4/2003 | Van Doorn | |
| 6,549,949 B1 | 4/2003 | Bowman-Amuah | |
| 6,550,057 B1 | 4/2003 | Bowman-Amuah | |
| 6,571,282 B1 | 5/2003 | Bowman-Amuah | |
| 6,578,068 B1 | 6/2003 | Bowman-Amuah | |
| 6,594,671 B1 | 7/2003 | Aman et al. | |
| 6,601,192 B1 | 7/2003 | Bowman-Amuah | |
| 6,601,233 B1 | 7/2003 | Underwood | |
| 6,601,234 B1 | 7/2003 | Bowman-Amuah | |
| 6,606,479 B2 | 8/2003 | Cook et al. | |
| 6,606,660 B1 | 8/2003 | Bowman-Amuah | |
| 6,606,744 B1 | 8/2003 | Mikurak | |
| 6,609,128 B1 | 8/2003 | Underwood | |
| 6,615,199 B1 | 9/2003 | Bowman-Amuah | |
| 6,615,253 B1 | 9/2003 | Bowman-Amuah | |
| 6,633,835 B1 | 10/2003 | Moran et al. | |
| 6,633,878 B1 | 10/2003 | Underwood | |
| 6,636,242 B2 | 10/2003 | Bowman-Amuah | |
| 6,640,238 B1 | 10/2003 | Bowman-Amuah | |
| 6,640,244 B1 | 10/2003 | Bowman-Amuah | |
| 6,640,249 B1 | 10/2003 | Bowman-Amuah | |
| 6,640,304 B2 | 10/2003 | Ginter et al. | |
| 6,640,307 B2 | 10/2003 | Viets et al. | |
| 6,647,400 B1 | 11/2003 | Moran | |
| 6,662,231 B1 | 12/2003 | Drosset et al. | |
| 6,671,818 B1 | 12/2003 | Mikurak | |
| 6,701,514 B1 | 3/2004 | Haswell et al. | |
| 6,704,873 B1 | 3/2004 | Underwood | |
| 6,707,889 B1 | 3/2004 | Saylor et al. | |
| 6,715,145 B1 | 3/2004 | Bowman-Amuah | |
| 6,718,535 B1 | 4/2004 | Underwood | |
| 6,731,625 B1 | 5/2004 | Eastep et al. | |
| 6,742,015 B1 | 5/2004 | Bowman-Amuah | |
| 6,745,286 B2 | 6/2004 | Staub et al. | |
| 6,754,181 B1 | 6/2004 | Elliott et al. | |
| 6,754,773 B2 | 6/2004 | Ulrich et al. | |
| 6,757,710 B2 | 6/2004 | Reed | |
| 6,772,332 B1 | 8/2004 | Boebert et al. | |
| 6,775,792 B2 | 8/2004 | Ulrich et al. | |
| 6,779,120 B1 | 8/2004 | Valente et al. | |
| 6,792,086 B1 | 9/2004 | Saylor et al. | |
| 6,801,940 B1 | 10/2004 | Moran et al. | |
| 6,826,697 B1 | 11/2004 | Moran | |
| 6,842,906 B1 | 1/2005 | Bowman-Amuah | |
| 6,857,061 B1 * | 2/2005 | Liao | G06F 9/30014 712/E9.034 |
| 6,862,692 B2 | 3/2005 | Ulrich et al. | |
| 6,871,295 B2 | 3/2005 | Ulrich et al. | |
| 6,888,929 B1 | 5/2005 | Saylor et al. | |
| 6,895,084 B1 | 5/2005 | Saylor et al. | |
| 6,907,546 B1 | 6/2005 | Haswell et al. | |
| 6,909,708 B1 | 6/2005 | Krishnaswamy et al. | |
| 6,948,070 B1 | 9/2005 | Ginter et al. | |
| 6,976,090 B2 | 12/2005 | Ben-Shaul et al. | |
| 6,986,052 B1 | 1/2006 | Mittal | |
| 6,990,547 B2 | 1/2006 | Ulrich et al. | |
| 6,990,667 B2 | 1/2006 | Ulrich et al. | |
| 6,996,843 B1 | 2/2006 | Moran | |
| 7,020,697 B1 | 3/2006 | Goodman et al. | |

(56) References Cited

U.S. PATENT DOCUMENTS

| | | |
|---|---|---|
| 7,024,692 B1 | 4/2006 | Schanze et al. |
| 7,032,114 B1 | 4/2006 | Moran |
| 7,051,212 B2 | 5/2006 | Ginter et al. |
| 7,054,927 B2 | 5/2006 | Ulrich et al. |
| 7,062,567 B2 | 6/2006 | Benitez et al. |
| 7,065,579 B2 | 6/2006 | Traversat et al. |
| 7,065,657 B1 | 6/2006 | Moran |
| 7,069,451 B1 | 6/2006 | Ginter et al. |
| 7,076,652 B2 | 7/2006 | Ginter et al. |
| 7,085,936 B1 | 8/2006 | Moran |
| 7,095,854 B1 | 8/2006 | Ginter et al. |
| 7,100,195 B1 | 8/2006 | Underwood |
| 7,100,199 B2 | 8/2006 | Ginter et al. |
| 7,114,059 B2 | 9/2006 | Wilkerson |
| 7,120,771 B2 | 10/2006 | Dahan et al. |
| 7,120,800 B2 | 10/2006 | Ginter et al. |
| 7,124,101 B1 | 10/2006 | Mikurak |
| 7,124,302 B2 | 10/2006 | Ginter et al. |
| 7,124,305 B2 | 10/2006 | Margolus et al. |
| 7,130,807 B1 | 10/2006 | Mikurak |
| 7,130,885 B2 | 10/2006 | Chandra et al. |
| 7,133,845 B1 | 11/2006 | Ginter et al. |
| 7,136,927 B2 | 11/2006 | Traversat et al. |
| 7,145,898 B1 | 12/2006 | Elliott |
| 7,165,107 B2 | 1/2007 | Pouyoul et al. |
| 7,167,920 B2 | 1/2007 | Traversat et al. |
| 7,171,689 B2 | 1/2007 | Beavers |
| 7,181,613 B2 | 2/2007 | Boebert et al. |
| 7,188,003 B2 | 3/2007 | Ransom et al. |
| 7,194,769 B2 | 3/2007 | Lippmann et al. |
| 7,197,565 B2 | 3/2007 | Abdelaziz et al. |
| 7,203,962 B1 | 4/2007 | Moran |
| 7,206,841 B2 | 4/2007 | Traversat et al. |
| 7,206,934 B2 | 4/2007 | Pabla et al. |
| 7,213,047 B2 | 5/2007 | Yeager et al. |
| 7,219,239 B1 | 5/2007 | Njemanze et al. |
| 7,237,081 B2 | 6/2007 | Dahan et al. |
| 7,237,123 B2 | 6/2007 | LeVine et al. |
| 7,246,370 B2 | 7/2007 | Valente et al. |
| 7,249,344 B1 | 7/2007 | Zeanah et al. |
| 7,254,586 B2 | 8/2007 | Chen et al. |
| 7,254,608 B2 | 8/2007 | Yeager et al. |
| 7,263,560 B2 | 8/2007 | Abdelaziz et al. |
| 7,275,102 B2 | 9/2007 | Yeager et al. |
| 7,287,030 B2 | 10/2007 | Margolus et al. |
| 7,289,964 B1 | 10/2007 | Bowman-Amuah |
| 7,289,994 B2 | 10/2007 | Nixon et al. |
| 7,299,277 B1 | 11/2007 | Moran et al. |
| 7,305,697 B2 | 12/2007 | Alao et al. |
| 7,328,243 B2 | 2/2008 | Yeager et al. |
| 7,334,123 B2 | 2/2008 | Gulick et al. |
| 7,337,441 B2 | 2/2008 | Felt et al. |
| 7,340,469 B1 | 3/2008 | Alghathbar et al. |
| 7,340,500 B2 | 3/2008 | Traversat et al. |
| 7,346,922 B2 | 3/2008 | Miliefsky |
| 7,350,085 B2 | 3/2008 | Johnson et al. |
| 7,356,701 B2 | 4/2008 | Margolus et al. |
| 7,356,730 B2 | 4/2008 | Ulrich et al. |
| 7,376,969 B1 | 5/2008 | Njemanze et al. |
| 7,395,536 B2 | 7/2008 | Verbeke et al. |
| 7,398,283 B2 | 7/2008 | Margolus et al. |
| 7,401,152 B2 | 7/2008 | Traversat et al. |
| 7,401,153 B2 | 7/2008 | Traversat et al. |
| 7,412,462 B2 | 8/2008 | Margolus et al. |
| 7,430,670 B1 | 9/2008 | Horning et al. |
| 7,431,650 B2 | 10/2008 | Kessman et al. |
| 7,437,614 B2 | 10/2008 | Haswell et al. |
| 7,451,488 B2 | 11/2008 | Cooper et al. |
| 7,457,397 B1 | 11/2008 | Saylor et al. |
| 7,457,959 B2 | 11/2008 | Margolus et al. |
| 7,464,407 B2 | 12/2008 | Nakae et al. |
| 7,467,198 B2 | 12/2008 | Goodman et al. |
| 7,478,422 B2 | 1/2009 | Valente et al. |
| 7,484,008 B1 | 1/2009 | Gelvin et al. |
| 7,484,225 B2 | 1/2009 | Hugly et al. |
| 7,484,236 B2 | 1/2009 | Alao et al. |
| 7,487,509 B2 | 2/2009 | Hugly et al. |
| 7,492,873 B2 | 2/2009 | Giroti et al. |
| 7,496,750 B2 | 2/2009 | Kumar et al. |
| 7,502,752 B1 | 3/2009 | Lemons et al. |
| 7,502,807 B2 | 3/2009 | Muthukrishnan et al. |
| 7,506,173 B2 | 3/2009 | Margolus et al. |
| 7,509,431 B2 | 3/2009 | Singhal et al. |
| 7,509,639 B2 | 3/2009 | Worley, Jr. |
| 7,523,054 B2 | 4/2009 | Tyson-Quah |
| 7,533,141 B2 | 5/2009 | Nadgir et al. |
| 7,533,161 B2 | 5/2009 | Hugly et al. |
| 7,533,172 B2 | 5/2009 | Traversat et al. |
| 7,543,329 B2 | 6/2009 | Viets et al. |
| 7,546,334 B2 | 6/2009 | Redlich et al. |
| 7,551,567 B2 | 6/2009 | Anthias et al. |
| 7,555,706 B2 | 6/2009 | Chapman et al. |
| 7,574,523 B2 | 8/2009 | Traversat et al. |
| 7,586,871 B2 | 9/2009 | Hamilton et al. |
| 7,587,617 B2 | 9/2009 | Margolus et al. |
| 7,603,550 B2 | 10/2009 | McGrath et al. |
| 7,606,267 B2 | 10/2009 | Ho et al. |
| 7,607,169 B1 | 10/2009 | Njemanze et al. |
| 7,630,986 B1 | 12/2009 | Herz et al. |
| 7,650,638 B1 | 1/2010 | Njemanze et al. |
| 7,657,597 B2 | 2/2010 | Arora et al. |
| 7,657,931 B2 | 2/2010 | Margolus et al. |
| 7,664,879 B2 | 2/2010 | Chan et al. |
| 7,669,051 B2 | 2/2010 | Redlich et al. |
| 7,669,212 B2 | 2/2010 | Alao et al. |
| 7,673,345 B2 | 3/2010 | Cheng et al. |
| 7,676,539 B2 | 3/2010 | Jhoney et al. |
| 7,683,940 B2 | 3/2010 | Fleming |
| 7,685,096 B2 | 3/2010 | Margolus et al. |
| 7,693,185 B1 | 4/2010 | Brown et al. |
| 7,693,814 B2 | 4/2010 | Margolus et al. |
| 7,698,416 B2 | 4/2010 | Potti et al. |
| 7,716,077 B1 | 5/2010 | Mikurak |
| 7,725,934 B2 | 5/2010 | Kumar et al. |
| 7,730,299 B2 | 6/2010 | Boebert et al. |
| 7,743,421 B2 | 6/2010 | Cosquer et al. |
| 7,747,523 B2 | 6/2010 | Cohen |
| 7,747,797 B2 | 6/2010 | Abraham et al. |
| 7,752,255 B2 | 7/2010 | Cohen et al. |
| 7,752,459 B2 | 7/2010 | Cowan et al. |
| 7,752,466 B2 | 7/2010 | Ginter et al. |
| 7,761,910 B2 | 7/2010 | Ransom et al. |
| 7,761,917 B1 | 7/2010 | Kumar |
| 7,761,918 B2 | 7/2010 | Gula et al. |
| 7,762,470 B2 | 7/2010 | Finn et al. |
| 7,774,495 B2 | 8/2010 | Pabla et al. |
| 7,779,270 B2 | 8/2010 | Horning et al. |
| 7,779,394 B2 | 8/2010 | Horning et al. |
| 7,783,777 B1 | 8/2010 | Pabla et al. |
| 7,788,433 B2 | 8/2010 | Henry et al. |
| 7,788,722 B1 | 8/2010 | Njemanze et al. |
| 7,797,406 B2 | 9/2010 | Patel et al. |
| 7,814,554 B1 | 10/2010 | Ragner |
| 7,822,979 B2 | 10/2010 | Mittal |
| 7,823,135 B2 | 10/2010 | Horning et al. |
| 7,827,256 B2 | 11/2010 | Phillips et al. |
| 7,827,606 B2 | 11/2010 | Rits et al. |
| 7,831,823 B2 | 11/2010 | Ginter et al. |
| 7,844,835 B2 | 11/2010 | Ginter et al. |
| 7,861,299 B1 | 12/2010 | Tidwell et al. |
| 7,869,425 B2 | 1/2011 | Elliott et al. |
| 7,878,909 B2 | 2/2011 | Kessman et al. |
| 7,890,753 B2 | 2/2011 | Dahan et al. |
| 7,891,004 B1 | 2/2011 | Gelvin et al. |
| 7,904,187 B2 | 3/2011 | Hoffberg et al. |
| 7,904,569 B1 | 3/2011 | Gelvin et al. |
| 7,917,695 B2 | 3/2011 | Ulrich et al. |
| 7,917,749 B2 | 3/2011 | Ginter et al. |
| 7,926,113 B1 | 4/2011 | Gula et al. |
| 7,933,925 B2 | 4/2011 | Sreedhar |
| 7,941,396 B2 | 5/2011 | Power et al. |
| 7,945,958 B2 | 5/2011 | Amarasinghe et al. |
| 7,949,728 B2 | 5/2011 | Rivette et al. |
| 7,957,991 B2 | 6/2011 | Mikurak |

(56) References Cited

U.S. PATENT DOCUMENTS

| | | |
|---|---|---|
| 7,958,549 B2 | 6/2011 | Nakae et al. |
| 7,961,743 B2 | 6/2011 | Alao et al. |
| 7,962,582 B2 | 6/2011 | Potti et al. |
| 7,962,961 B1 | 6/2011 | Griffin et al. |
| 7,966,078 B2 | 6/2011 | Hoffberg et al. |
| 7,966,369 B1 | 6/2011 | Briere et al. |
| 7,971,018 B2 | 6/2011 | Schwemmlein |
| 7,975,051 B2 | 7/2011 | Saint Clair et al. |
| 7,980,948 B2 | 7/2011 | Rowe et al. |
| 7,984,509 B2 | 7/2011 | Ginter et al. |
| 7,987,003 B2 | 7/2011 | Hoffberg et al. |
| 7,987,272 B2 | 7/2011 | Kumar et al. |
| 7,996,556 B2 | 8/2011 | Raghavan et al. |
| 8,001,546 B2 | 8/2011 | Felt et al. |
| 8,006,087 B2 | 8/2011 | Ginter et al. |
| 8,015,570 B2 | 9/2011 | Venkatraman et al. |
| 8,028,341 B2 | 9/2011 | Cheng et al. |
| 8,032,409 B1 | 10/2011 | Mikurak |
| 8,037,202 B2 | 10/2011 | Yeager et al. |
| 8,055,732 B2 | 11/2011 | Cohen et al. |
| 8,055,797 B2 | 11/2011 | Cohen et al. |
| 8,055,913 B2 | 11/2011 | Ginter et al. |
| 8,056,130 B1 | 11/2011 | Njemanze et al. |
| 8,065,725 B2 | 11/2011 | Zheng et al. |
| 8,074,256 B2 | 12/2011 | Valente et al. |
| 8,078,788 B2 | 12/2011 | Chang et al. |
| 8,079,118 B2 | 12/2011 | Gelvin et al. |
| 8,082,304 B2 | 12/2011 | Ho et al. |
| 8,086,585 B1 | 12/2011 | Brashers et al. |
| 8,086,744 B2 | 12/2011 | Abdullah et al. |
| 8,090,839 B2 | 1/2012 | Kumar et al. |
| 8,094,647 B2 | 1/2012 | Elliott et al. |
| 8,095,984 B2 | 1/2012 | McFarlane et al. |
| 8,108,455 B2 | 1/2012 | Yeager et al. |
| 8,112,330 B1 | 2/2012 | Grandcolas et al. |
| 8,112,625 B2 | 2/2012 | Ginter et al. |
| 8,117,261 B2 | 2/2012 | Briere et al. |
| 8,127,359 B2 | 2/2012 | Kelekar |
| 8,140,786 B2 | 3/2012 | Bunte et al. |
| 8,141,155 B2 | 3/2012 | Jeschke et al. |
| 8,141,165 B2 | 3/2012 | Ginter et al. |
| 8,160,077 B2 | 4/2012 | Traversat et al. |
| 8,161,540 B2 | 4/2012 | Mantripragada et al. |
| 8,176,001 B2 | 5/2012 | Mantripragada et al. |
| 8,176,527 B1 | 5/2012 | Njemanze et al. |
| 8,176,563 B2 | 5/2012 | Redlich et al. |
| 8,181,021 B2 | 5/2012 | Ginter et al. |
| 8,185,651 B2 | 5/2012 | Moran et al. |
| 8,191,157 B2 | 5/2012 | Ginter et al. |
| 8,191,158 B2 | 5/2012 | Ginter et al. |
| 8,194,646 B2 | 6/2012 | Elliott et al. |
| 8,196,131 B1 | 6/2012 | von Behren et al. |
| 8,201,216 B2 | 6/2012 | Cha et al. |
| 8,201,257 B1 | 6/2012 | Andres et al. |
| 8,204,992 B2 | 6/2012 | Arora et al. |
| 8,209,753 B2 | 6/2012 | Wen et al. |
| 8,209,763 B2 | 6/2012 | Henry et al. |
| 8,214,590 B2 | 7/2012 | Ulrich et al. |
| 8,224,930 B2 | 7/2012 | Cohen et al. |
| 8,230,507 B1 | 7/2012 | Njemanze et al. |
| 8,234,711 B2 | 7/2012 | Kang et al. |
| 8,250,552 B2 | 8/2012 | Kandasamy et al. |
| 8,261,359 B2 | 9/2012 | Levine et al. |
| 8,266,327 B2 | 9/2012 | Kumar et al. |
| 8,271,336 B2 | 9/2012 | Mikurak |
| 8,281,036 B2 | 10/2012 | Cohen et al. |
| 8,286,255 B2 | 10/2012 | Grant et al. |
| 8,291,238 B2 | 10/2012 | Ginter et al. |
| 8,296,848 B1 | 10/2012 | Griffin et al. |
| 8,306,228 B2 | 11/2012 | Le Saint et al. |
| 8,312,148 B2 | 11/2012 | Anthias et al. |
| 8,316,091 B2 | 11/2012 | Hirvela et al. |
| 8,316,448 B2 | 11/2012 | Peinado et al. |
| 8,316,449 B2 | 11/2012 | Ginter et al. |
| 8,327,328 B2 | 12/2012 | Colton et al. |
| 8,332,367 B2 | 12/2012 | Bhattacherjee et al. |
| 8,346,532 B2 | 1/2013 | Chakra et al. |
| 8,347,072 B2 | 1/2013 | Mittal |
| 8,359,397 B2 | 1/2013 | Traversat et al. |
| 8,365,021 B2 | 1/2013 | Inoue et al. |
| 8,365,278 B1 | 1/2013 | Njemanze et al. |
| 8,365,289 B2 | 1/2013 | Russ et al. |
| 8,370,641 B2 | 2/2013 | Henry et al. |
| 8,375,082 B2 | 2/2013 | Mukherjee |
| 8,381,192 B1 | 2/2013 | Drewry et al. |
| 8,387,022 B2 | 2/2013 | Horning et al. |
| 8,392,677 B2 | 3/2013 | Bunte et al. |
| 8,392,997 B2 | 3/2013 | Chen et al. |
| 8,393,969 B2 | 3/2013 | Kessman et al. |
| 8,402,557 B2 | 3/2013 | Ginter et al. |
| 8,417,866 B2 | 4/2013 | Chang et al. |
| 8,422,379 B2 | 4/2013 | Xu et al. |
| 8,423,953 B2 | 4/2013 | Colton et al. |
| 8,434,128 B2 | 4/2013 | Kennedy |
| 8,438,532 B2 | 5/2013 | Fox et al. |
| 8,438,643 B2 | 5/2013 | Wiemer et al. |
| 8,458,798 B2 | 6/2013 | Williams et al. |
| 8,464,077 B2 | 6/2013 | Ginter et al. |
| 8,468,244 B2 | 6/2013 | Redlich et al. |
| 8,468,606 B2 | 6/2013 | Van De Weyer et al. |
| 8,474,004 B2 | 6/2013 | Leone |
| 8,484,741 B1 | 7/2013 | Chapman |
| 8,516,118 B2 | 8/2013 | Saint Clair et al. |
| 8,516,594 B2 | 8/2013 | Bennett et al. |
| 8,522,348 B2 | 8/2013 | Chen et al. |
| 8,522,354 B2 | 8/2013 | Henry et al. |
| 8,527,406 B2 | 9/2013 | Cohen |
| 8,527,549 B2 | 9/2013 | Cidon |
| 8,533,843 B2 | 9/2013 | Levi |
| 8,533,851 B2 | 9/2013 | Ginter et al. |
| 8,533,854 B2 | 9/2013 | Ginter et al. |
| 8,543,506 B2 | 9/2013 | Grandcolas et al. |
| 8,543,607 B2 | 9/2013 | Sreedhar |
| 8,543,842 B2 | 9/2013 | Ginter et al. |
| 8,543,982 B2 | 9/2013 | Zeanah et al. |
| 8,544,098 B2 | 9/2013 | Gustave et al. |
| 8,549,171 B2 | 10/2013 | Ramarao et al. |
| 8,549,275 B2 | 10/2013 | Mittal |
| 8,560,366 B2 | 10/2013 | Mikurak |
| 8,566,839 B2 | 10/2013 | Johnson et al. |
| 8,566,928 B2 | 10/2013 | Dagon et al. |
| 8,572,173 B2 | 10/2013 | Briere et al. |
| 8,572,411 B2 | 10/2013 | Ginter et al. |
| 8,572,550 B2 | 10/2013 | Fox et al. |
| 8,572,750 B2 | 10/2013 | Patel et al. |
| 8,578,490 B2 | 11/2013 | Moran |
| 8,583,263 B2 | 11/2013 | Hoffberg et al. |
| 8,595,306 B2 | 11/2013 | Hirvela et al. |
| 8,595,845 B2 | 11/2013 | Basavapatna et al. |
| 8,599,277 B2 | 12/2013 | Fleming |
| 8,601,104 B2 | 12/2013 | Cohen et al. |
| 8,601,498 B2 | 12/2013 | Laurich et al. |
| 8,601,530 B2 | 12/2013 | Cohen et al. |
| 8,601,595 B2 | 12/2013 | Gelvin et al. |
| 8,602,089 B2 | 12/2013 | Singh et al. |
| 8,607,034 B2 | 12/2013 | Henry et al. |
| 8,607,067 B1 | 12/2013 | Janse van Rensburg et al. |
| 8,607,325 B2 | 12/2013 | Kennedy |
| 8,607,336 B2 | 12/2013 | Cohen et al. |
| 8,611,232 B2 | 12/2013 | Xu et al. |
| 8,612,936 B2 | 12/2013 | Fox et al. |
| 8,613,080 B2 | 12/2013 | Wysopal et al. |
| 8,613,083 B1 | 12/2013 | Njemanze et al. |
| 8,615,656 B2 | 12/2013 | Weinstein et al. |
| 8,615,799 B2 | 12/2013 | Henry et al. |
| 8,627,053 B2 | 1/2014 | Mittal |
| 8,627,402 B2 | 1/2014 | Cohen et al. |
| 8,631,248 B2 | 1/2014 | Cowan et al. |
| 8,631,387 B2 | 1/2014 | Henderson |
| 8,631,489 B2 | 1/2014 | Antonakakis et al. |
| 8,639,625 B1 | 1/2014 | Ginter et al. |
| 8,640,194 B2 | 1/2014 | Inoue et al. |
| 8,640,240 B2 | 1/2014 | Sagoo et al. |
| 8,644,516 B1 | 2/2014 | Le Saint et al. |

(56) References Cited

U.S. PATENT DOCUMENTS

| | | |
|---|---|---|
| 8,645,572 B2 | 2/2014 | Alao et al. |
| 8,646,059 B1 | 2/2014 | von Behren et al. |
| 8,650,637 B2 | 2/2014 | Beresnevichiene et al. |
| 8,655,939 B2 | 2/2014 | Redlich et al. |
| 8,656,497 B2 | 2/2014 | Amarasinghe et al. |
| 8,660,849 B2 | 2/2014 | Gruber et al. |
| 8,660,880 B2 | 2/2014 | Chehade et al. |
| 8,670,979 B2 | 3/2014 | Gruber et al. |
| 8,677,505 B2 | 3/2014 | Redlich et al. |
| 8,677,507 B2 | 3/2014 | Ginter et al. |
| 8,683,560 B1 | 3/2014 | Brooker et al. |
| 8,688,461 B1 | 4/2014 | Richards et al. |
| 8,700,772 B2 | 4/2014 | Saint Clair |
| 8,706,503 B2 | 4/2014 | Cheyer et al. |
| 8,706,914 B2 | 4/2014 | Duchesneau |
| 8,706,915 B2 | 4/2014 | Duchesneau |
| 8,730,946 B2 | 5/2014 | Mantripragada et al. |
| 8,731,942 B2 | 5/2014 | Cheyer et al. |
| 8,732,023 B2 | 5/2014 | Mikurak |
| 8,738,860 B1 | 5/2014 | Griffin et al. |
| 8,738,932 B2 | 5/2014 | Lee et al. |
| 8,750,841 B2 | 6/2014 | Johnson et al. |
| 8,755,392 B2 | 6/2014 | Traversat et al. |
| 8,762,188 B2 | 6/2014 | Abercrombie et al. |
| 8,762,687 B2 | 6/2014 | Henry et al. |
| 8,769,127 B2 | 7/2014 | Selimis et al. |
| 8,769,304 B2 | 7/2014 | Kirsch |
| 8,776,180 B2 | 7/2014 | Kumar et al. |
| 8,782,661 B2 | 7/2014 | Ulrich et al. |
| 8,789,192 B2 | 7/2014 | LaBumbard |
| 8,789,193 B2 | 7/2014 | Kelekar |
| 8,793,803 B2 | 7/2014 | Henry et al. |
| 8,799,000 B2 | 8/2014 | Guzzoni et al. |
| 8,799,403 B2 | 8/2014 | Chan et al. |
| 8,807,440 B1 | 8/2014 | von Behren et al. |
| 8,813,235 B2 | 8/2014 | Sidagni |
| 8,819,225 B2 | 8/2014 | Wang et al. |
| 8,819,420 B1 | 8/2014 | McKeeman et al. |
| 8,819,839 B2 | 8/2014 | Henry et al. |
| 8,825,830 B2 | 9/2014 | Newton et al. |
| 8,826,438 B2 | 9/2014 | Perdisci et al. |
| 8,838,924 B2 | 9/2014 | Henry et al. |
| 8,844,043 B2 | 9/2014 | Williams et al. |
| 8,844,045 B2 | 9/2014 | Benefield |
| 8,850,588 B2 | 9/2014 | Kumar et al. |
| 8,856,936 B2 | 10/2014 | Datta Ray et al. |
| 8,868,914 B2 | 10/2014 | Teppler |
| 8,869,110 B2 | 10/2014 | Kaksonen |
| 8,874,685 B1 | 10/2014 | Hollis et al. |
| 8,887,177 B2 | 11/2014 | Johnson et al. |
| 8,892,446 B2 | 11/2014 | Cheyer et al. |
| 8,893,283 B2 | 11/2014 | Raz et al. |
| 8,900,054 B2 | 12/2014 | Patel |
| 8,903,705 B2 | 12/2014 | Douceur et al. |
| 8,903,716 B2 | 12/2014 | Chen et al. |
| 8,909,779 B2 | 12/2014 | Clair et al. |
| 8,909,881 B2 | 12/2014 | Bunte et al. |
| 8,910,276 B2 | 12/2014 | Henry et al. |
| 8,917,159 B2 | 12/2014 | McAllister et al. |
| 8,918,884 B2 | 12/2014 | Jajodia et al. |
| 8,918,887 B2 | 12/2014 | Taniguchi et al. |
| 8,925,082 B2 | 12/2014 | Ashley |
| 8,930,191 B2 | 1/2015 | Gruber et al. |
| 8,942,986 B2 | 1/2015 | Cheyer et al. |
| 8,943,313 B2 | 1/2015 | Glew et al. |
| 8,943,513 B2 | 1/2015 | Ulrich et al. |
| 8,949,169 B2 | 2/2015 | Shelton et al. |
| 8,966,619 B2 | 2/2015 | Ormazabal et al. |
| 8,966,639 B1 | 2/2015 | Roytman et al. |
| 8,978,132 B2 | 3/2015 | Henry et al. |
| 8,984,579 B2 | 3/2015 | Cohen et al. |
| 8,984,643 B1 | 3/2015 | Krisher et al. |
| 8,990,948 B2 | 3/2015 | Kumar et al. |
| 8,996,449 B2 | 3/2015 | Power et al. |
| 9,002,014 B2 | 4/2015 | Henry et al. |
| 9,003,537 B2 | 4/2015 | Raz et al. |
| 9,005,031 B2 | 4/2015 | Kessman et al. |
| 9,015,301 B2 | 4/2015 | Redlich et al. |
| 9,020,885 B2 | 4/2015 | Beartusk et al. |
| 9,027,125 B2 | 5/2015 | Kumar et al. |
| 9,032,533 B2 | 5/2015 | Bennett et al. |
| 9,043,753 B2 | 5/2015 | Fox et al. |
| 9,043,919 B2 | 5/2015 | Wyatt et al. |
| 9,043,920 B2 | 5/2015 | Gula et al. |
| 9,047,293 B2 | 6/2015 | Grafi et al. |
| 9,047,483 B2 | 6/2015 | Briere et al. |
| 9,047,484 B2 | 6/2015 | Briere et al. |
| 9,064,099 B2 | 6/2015 | Horning et al. |
| 9,064,111 B2 | 6/2015 | Aciicmez et al. |
| 9,069,930 B1 | 6/2015 | Hart |
| 9,069,967 B2 | 6/2015 | Wysopal et al. |
| 9,072,965 B2 | 7/2015 | Kessman et al. |
| 9,092,616 B2 | 7/2015 | Kumar et al. |
| 9,094,448 B2 | 7/2015 | Benefield |
| 9,111,088 B2 | 8/2015 | Ghai et al. |
| 9,113,051 B1 | 8/2015 | Scalisi |
| 9,117,447 B2 | 8/2015 | Gruber et al. |
| 9,118,706 B2 | 8/2015 | Bianco |
| 9,118,713 B2 | 8/2015 | Bisht et al. |
| 9,128,728 B2 | 9/2015 | Siman |
| 9,128,801 B2 | 9/2015 | Fox et al. |
| 9,129,279 B1 | 9/2015 | Zeanah et al. |
| 9,135,778 B2 | 9/2015 | Patel |
| 9,141,378 B2 | 9/2015 | Fox et al. |
| 9,141,805 B2 | 9/2015 | Giakouminakis et al. |
| 9,141,806 B2 | 9/2015 | Siman |
| 9,143,392 B2 | 9/2015 | Duchesneau |
| 9,158,871 B2 | 10/2015 | Neergaard |
| 9,158,922 B2 | 10/2015 | Liu |
| 9,160,761 B2 | 10/2015 | Lee et al. |
| 9,165,133 B2 | 10/2015 | La Fever et al. |
| 9,166,994 B2 | 10/2015 | Ward et al. |
| 9,177,175 B2 | 11/2015 | Margolus et al. |
| 9,178,911 B2 | 11/2015 | Cohen et al. |
| 9,185,125 B2 | 11/2015 | Varsanyi et al. |
| 9,215,236 B2 | 12/2015 | Kennedy |
| 9,224,117 B2 | 12/2015 | Chapman |
| 9,237,062 B2 | 1/2016 | Ermis et al. |
| 9,240,943 B2 | 1/2016 | Lu et al. |
| 9,241,044 B2 | 1/2016 | Shribman et al. |
| 9,251,265 B2 | 2/2016 | Briere et al. |
| 9,256,746 B2 | 2/2016 | Toback et al. |
| 9,268,945 B2 | 2/2016 | Williams et al. |
| 9,270,695 B2 | 2/2016 | Roytman et al. |
| 9,270,697 B2 | 2/2016 | Ghosh et al. |
| 9,276,951 B2 | 3/2016 | Choi et al. |
| 9,292,695 B1 | 3/2016 | Bassett |
| 9,298,923 B2 | 3/2016 | Salowey et al. |
| 9,305,165 B2 | 4/2016 | Snow et al. |
| 9,305,183 B2 | 4/2016 | Mittal |
| 9,306,969 B2 | 4/2016 | Dagon et al. |
| 9,306,975 B2 | 4/2016 | Cohen et al. |
| 9,311,140 B2 | 4/2016 | Raghu et al. |
| 9,311,499 B2 | 4/2016 | Redlich et al. |
| 9,311,670 B2 | 4/2016 | Hoffberg |
| 9,317,692 B2 | 4/2016 | Elder et al. |
| 9,317,708 B2 | 4/2016 | Lee et al. |
| 9,318,108 B2 | 4/2016 | Gruber et al. |
| 9,319,425 B2 | 4/2016 | Giokas |
| 9,323,921 B2 | 4/2016 | Hunt et al. |
| 9,323,954 B2 | 4/2016 | Mittal |
| 9,325,729 B2 | 4/2016 | Jajodia et al. |
| 9,329,894 B2 | 5/2016 | Raghu |
| 9,348,652 B2 | 5/2016 | Raghu |
| 9,356,962 B2 | 5/2016 | Ilieva et al. |
| 9,369,330 B1 | 6/2016 | Alao et al. |
| 9,369,482 B2 | 6/2016 | Borohovski et al. |
| 9,372,995 B2 | 6/2016 | Shigemoto et al. |
| 9,378,044 B1 | 6/2016 | Gaurav et al. |
| 9,380,008 B2 | 6/2016 | Ramarao et al. |
| 9,386,124 B2 | 7/2016 | Briere et al. |
| 9,389,893 B2 | 7/2016 | Raghu |
| 9,389,933 B2 | 7/2016 | Baumann et al. |
| 9,390,151 B2 | 7/2016 | Briere et al. |

(56) References Cited

U.S. PATENT DOCUMENTS

| | | |
|---|---|---|
| 9,390,590 B2 | 7/2016 | Kessman et al. |
| 9,391,801 B2 | 7/2016 | Raghu |
| 9,392,007 B2 | 7/2016 | Giokas |
| 9,396,479 B2 | 7/2016 | Briere et al. |
| 9,407,645 B2 | 8/2016 | Modi et al. |
| 9,411,524 B2 | 8/2016 | O'Hare et al. |
| 9,411,965 B2 | 8/2016 | Giakouminakis et al. |
| 9,413,538 B2 | 8/2016 | Baumann et al. |
| 9,418,263 B2 | 8/2016 | Butler et al. |
| 9,425,965 B2 | 8/2016 | Baumann et al. |
| 9,430,256 B2 | 8/2016 | Raghu |
| 9,443,074 B1 | 9/2016 | Janse Van Rensburg et al. |
| 9,449,443 B2 | 9/2016 | Libin et al. |
| 9,455,975 B2 | 9/2016 | Brooker et al. |
| 9,456,004 B2 | 9/2016 | Agrawal et al. |
| 9,467,464 B2 | 10/2016 | Gula et al. |
| 9,467,465 B2 | 10/2016 | Hibbert et al. |
| 9,473,529 B2 | 10/2016 | Ormazabal et al. |
| 9,479,535 B2 | 10/2016 | Cohen et al. |
| 9,495,183 B2 | 11/2016 | Bond et al. |
| 9,495,468 B2 | 11/2016 | Coyote et al. |
| 9,495,714 B2 | 11/2016 | Bush et al. |
| 9,503,467 B2 | 11/2016 | Lefebvre et al. |
| 9,507,962 B2 | 11/2016 | Mittal |
| 9,507,963 B2 | 11/2016 | Mittal |
| 9,514,305 B2 | 12/2016 | Acar et al. |
| 9,516,058 B2 | 12/2016 | Antonakakis et al. |
| 9,519,911 B2 | 12/2016 | Briere et al. |
| 9,529,514 B2 | 12/2016 | Saint Clair |
| 9,537,841 B2 | 1/2017 | Schutz et al. |
| 9,537,876 B2 | 1/2017 | Kelekar |
| 9,537,884 B1 | 1/2017 | Raugas et al. |
| 9,542,577 B2 | 1/2017 | Butler et al. |
| 9,544,326 B2 | 1/2017 | Hershey et al. |
| 9,547,779 B2 | 1/2017 | Mittal |
| 9,548,050 B2 | 1/2017 | Gruber et al. |
| 9,560,147 B2 | 1/2017 | Shaheen et al. |
| 9,563,749 B2 | 2/2017 | Wyatt et al. |
| 9,569,612 B2 | 2/2017 | Wilkerson et al. |
| 9,569,729 B1 | 2/2017 | Oehrle et al. |
| 9,575,903 B2 | 2/2017 | Glew et al. |
| 9,588,803 B2 | 3/2017 | Howell et al. |
| 9,591,968 B2 | 3/2017 | Gross et al. |
| 9,602,529 B2 | 3/2017 | Jones et al. |
| 9,613,117 B1 | 4/2017 | Meritt et al. |
| 9,614,864 B2 | 4/2017 | Nair et al. |
| 9,619,261 B2 | 4/2017 | Gaurav et al. |
| 9,619,270 B2 | 4/2017 | Ramasubramanian et al. |
| 9,619,655 B2 | 4/2017 | Bach et al. |
| 9,619,672 B2 | 4/2017 | Mittal |
| 9,628,342 B2 | 4/2017 | Newton et al. |
| 9,628,343 B2 | 4/2017 | Newton et al. |
| 9,628,344 B2 | 4/2017 | Newton et al. |
| 9,628,345 B2 | 4/2017 | Newton et al. |
| 9,628,346 B2 | 4/2017 | Crowder et al. |
| 9,628,347 B2 | 4/2017 | Varney et al. |
| 9,628,501 B2 | 4/2017 | Datta Ray et al. |
| 9,629,545 B2 | 4/2017 | Gross et al. |
| 9,629,546 B2 | 4/2017 | Gross et al. |
| 9,629,547 B2 | 4/2017 | Gross et al. |
| 9,633,213 B2 | 4/2017 | Swoboda |
| 9,634,904 B2 | 4/2017 | Varney et al. |
| 9,634,905 B2 | 4/2017 | Newton et al. |
| 9,634,906 B2 | 4/2017 | Varney et al. |
| 9,634,907 B2 | 4/2017 | Varney et al. |
| 9,634,918 B2 | 4/2017 | Lipstone et al. |
| 9,635,033 B2 | 4/2017 | Nguyen-Tuong et al. |
| 9,636,018 B2 | 5/2017 | Gross et al. |
| 9,639,703 B2 | 5/2017 | Liu |
| 9,641,401 B2 | 5/2017 | Varney et al. |
| 9,641,402 B2 | 5/2017 | Newton et al. |
| 9,642,527 B2 | 5/2017 | Gross et al. |
| 9,642,528 B2 | 5/2017 | Gross et al. |
| 9,647,899 B2 | 5/2017 | Varney et al. |
| 9,647,900 B2 | 5/2017 | Crowder et al. |
| 9,647,901 B2 | 5/2017 | Newton et al. |
| 9,648,036 B2 | 5/2017 | Ver et al. |
| 9,654,353 B2 | 5/2017 | Newton et al. |
| 9,654,354 B2 | 5/2017 | Newton et al. |
| 9,654,355 B2 | 5/2017 | Varney et al. |
| 9,654,356 B2 | 5/2017 | Varney et al. |
| 9,660,874 B2 | 5/2017 | Lipstone et al. |
| 9,660,875 B2 | 5/2017 | Crowder et al. |
| 9,660,876 B2 | 5/2017 | Lipstone et al. |
| 9,661,046 B2 | 5/2017 | Varney et al. |
| 9,665,721 B2 | 5/2017 | Artes et al. |
| 9,667,506 B2 | 5/2017 | Varney et al. |
| 9,672,071 B2 | 6/2017 | Gerganov |
| 9,672,074 B2 | 6/2017 | Gaurav et al. |
| 9,680,699 B2 | 6/2017 | Cohen et al. |
| 9,680,861 B2 | 6/2017 | Ward et al. |
| 9,686,148 B2 | 6/2017 | Varney et al. |
| 9,686,291 B2 | 6/2017 | Antonakakis et al. |
| 9,690,583 B2 | 6/2017 | Gschwind et al. |
| 9,692,778 B1 | 6/2017 | Mohanty |
| 9,692,779 B2 | 6/2017 | Maeng et al. |
| 9,703,890 B2 | 7/2017 | Kakaraddi et al. |
| 9,705,754 B2 | 7/2017 | Crowder et al. |
| 9,710,682 B2 | 7/2017 | Butler et al. |
| 9,713,425 B2 | 7/2017 | Gross et al. |
| 9,716,721 B2 | 7/2017 | Hovor et al. |
| 9,720,403 B2 | 8/2017 | Power et al. |
| 9,722,803 B1 | 8/2017 | Ellingson et al. |
| 9,722,882 B2 | 8/2017 | Varney et al. |
| 9,722,883 B2 | 8/2017 | Varney et al. |
| 9,722,884 B2 | 8/2017 | Newton et al. |
| 9,726,460 B2 | 8/2017 | Hershey et al. |
| 9,727,736 B1 | 8/2017 | McClintock et al. |
| 9,729,568 B2 | 8/2017 | Lefebvre et al. |
| 9,734,169 B2 | 8/2017 | Redlich et al. |
| 9,742,435 B1 | 8/2017 | Poghosyan et al. |
| 9,742,866 B2 | 8/2017 | Shribman et al. |
| 9,743,834 B2 | 8/2017 | Gross et al. |
| 9,749,190 B2 | 8/2017 | Newton et al. |
| 9,749,191 B2 | 8/2017 | Varney et al. |
| 9,749,192 B2 | 8/2017 | Varney et al. |
| 9,750,409 B2 | 9/2017 | Gross et al. |
| 9,750,410 B2 | 9/2017 | Gross et al. |
| 9,750,411 B2 | 9/2017 | Gross et al. |
| 9,750,412 B2 | 9/2017 | Gross et al. |
| 9,754,446 B2 | 9/2017 | Kessman et al. |
| 9,755,914 B2 | 9/2017 | Newton et al. |
| 9,756,118 B2 | 9/2017 | Taheri et al. |
| 9,756,549 B2 | 9/2017 | Perdomo |
| 9,757,032 B2 | 9/2017 | Gross et al. |
| 9,762,617 B2 | 9/2017 | Modi et al. |
| 9,762,659 B2 | 9/2017 | Ska et al. |
| 9,772,971 B2 | 9/2017 | Smith |
| 9,775,517 B2 | 10/2017 | Gross et al. |
| 9,775,518 B2 | 10/2017 | Gross et al. |
| 9,779,191 B1 | 10/2017 | Hershey et al. |
| 9,779,253 B2 | 10/2017 | Mahaffey et al. |
| 9,781,148 B2 | 10/2017 | Mahaffey et al. |
| 9,781,212 B2 | 10/2017 | Briere et al. |
| 9,782,073 B2 | 10/2017 | Gross et al. |
| 9,782,074 B2 | 10/2017 | Gross et al. |
| 9,784,260 B2 | 10/2017 | Lee et al. |
| 9,785,440 B2 | 10/2017 | DeHon |
| 9,785,799 B2 | 10/2017 | Sreedhar |
| 9,787,551 B2 | 10/2017 | Newton et al. |
| 9,788,049 B2 | 10/2017 | Lockett et al. |
| 9,788,723 B2 | 10/2017 | Gross et al. |
| 9,792,438 B2 | 10/2017 | Heldt-Sheller et al. |
| 9,795,297 B2 | 10/2017 | Gross et al. |
| 9,801,543 B2 | 10/2017 | Gross et al. |
| 9,817,978 B2 | 11/2017 | Marsh et al. |
| 9,819,554 B2 | 11/2017 | Varney et al. |
| 9,825,981 B2 | 11/2017 | Roytman et al. |
| 9,825,982 B1 | 11/2017 | Htay |
| 9,826,045 B2 | 11/2017 | Straub et al. |
| 9,836,546 B2 | 12/2017 | Briere et al. |
| 9,838,479 B2 | 12/2017 | Briere et al. |
| 9,842,065 B2 | 12/2017 | Banginwar et al. |
| 9,846,780 B2 | 12/2017 | Tonn et al. |

(56) References Cited

U.S. PATENT DOCUMENTS

| | | |
|---|---|---|
| 9,847,917 B2 | 12/2017 | Varney et al. |
| 9,851,953 B2 | 12/2017 | Straub et al. |
| 9,851,968 B2 | 12/2017 | Straub |
| 9,854,973 B2 | 1/2018 | Crawley et al. |
| 9,858,174 B2 | 1/2018 | Straub et al. |
| 9,858,452 B2 | 1/2018 | Butler et al. |
| 9,860,265 B2 | 1/2018 | Gula et al. |
| 9,866,426 B2 | 1/2018 | Shelton et al. |
| 9,871,815 B2 | 1/2018 | Ouchn |
| 9,872,620 B2 | 1/2018 | Gross et al. |
| 9,881,271 B2 | 1/2018 | Chapman |
| 9,882,798 B2 | 1/2018 | Padala et al. |
| 9,886,303 B2 | 2/2018 | Koller Jemio et al. |
| 9,886,581 B2 | 2/2018 | Olson et al. |
| 9,886,582 B2 | 2/2018 | Hovor et al. |
| 9,887,885 B2 | 2/2018 | Varney et al. |
| 9,887,886 B2 | 2/2018 | Rahaman |
| 9,888,091 B2 | 2/2018 | Saint Clair |
| 9,888,849 B2 | 2/2018 | Gross et al. |
| 9,888,850 B2 | 2/2018 | Gross et al. |
| 9,888,851 B2 | 2/2018 | Gross et al. |
| 9,888,852 B2 | 2/2018 | Gross et al. |
| 9,894,088 B2 | 2/2018 | Ward et al. |
| 9,895,061 B2 | 2/2018 | Gross et al. |
| 9,895,062 B2 | 2/2018 | Gross et al. |
| 9,898,739 B2 | 2/2018 | Monastyrsky et al. |
| 9,900,339 B2 | 2/2018 | Bach et al. |
| 9,912,683 B2 | 3/2018 | Cam |
| 9,916,092 B2 | 3/2018 | Saha et al. |
| 9,916,601 B2 | 3/2018 | Mahadevan et al. |
| 9,922,345 B2 | 3/2018 | Mikurak |
| 9,923,916 B1 | 3/2018 | McClintock et al. |
| 9,923,917 B2 | 3/2018 | Fausto et al. |
| 9,928,369 B2 | 3/2018 | Grieco et al. |
| 9,928,379 B1 | 3/2018 | Hoffer |
| 9,930,065 B2 | 3/2018 | Nelms et al. |
| 9,931,035 B2 | 4/2018 | Gross et al. |
| 9,934,380 B2 | 4/2018 | Dalcher et al. |
| 9,935,975 B2 | 4/2018 | Wilkerson et al. |
| 9,946,565 B2 | 4/2018 | Strandzhev et al. |
| 9,953,193 B2 | 4/2018 | Butler et al. |
| 9,959,100 B2 | 5/2018 | Straub |
| 9,965,619 B2 | 5/2018 | Brandt et al. |
| 9,965,627 B2 | 5/2018 | Ray et al. |
| 9,967,264 B2 | 5/2018 | Harris et al. |
| 9,967,282 B2 | 5/2018 | Thomas et al. |
| 9,967,283 B2 | 5/2018 | Ray et al. |
| 9,971,574 B2 | 5/2018 | Mathew et al. |
| 9,971,909 B2 | 5/2018 | Mittal |
| 9,974,438 B2 | 5/2018 | Gross et al. |
| 9,984,248 B2 | 5/2018 | Ray et al. |
| 9,989,043 B2 | 6/2018 | Lee et al. |
| 9,992,228 B2 | 6/2018 | Ray et al. |
| 9,996,697 B2 | 6/2018 | Mahaffey et al. |
| 9,997,036 B2 | 6/2018 | Scalisi |
| 10,013,668 B2 | 7/2018 | Straub |
| 10,013,705 B2 | 7/2018 | Mikurak |
| 10,015,169 B2 | 7/2018 | Kennedy |
| 10,015,720 B2 | 7/2018 | Perdomo |
| 10,021,446 B2 | 7/2018 | Barton et al. |
| 10,025,638 B2 | 7/2018 | Raghu |
| 10,031,505 B2 | 7/2018 | Martindale et al. |
| 10,031,768 B2 | 7/2018 | Strandzhev et al. |
| 10,042,628 B2 | 8/2018 | OlmstedThompson |
| 10,044,747 B2 | 8/2018 | Liu |
| 10,050,868 B2 | 8/2018 | Porras et al. |
| 10,061,566 B2 | 8/2018 | Brown et al. |
| 10,063,373 B2 | 8/2018 | Schutz et al. |
| RE47,053 E | 9/2018 | Drosset et al. |
| 10,073,679 B2 | 9/2018 | Straub et al. |
| 10,079,878 B2 | 9/2018 | Ulrich et al. |
| 10,089,651 B2 | 10/2018 | Mahadevan et al. |
| 10,095,543 B1 | 10/2018 | Griffin et al. |
| 10,097,531 B2 | 10/2018 | Brooker et al. |
| 10,114,950 B2 | 10/2018 | Nalluri et al. |
| 10,120,668 B2 | 11/2018 | Palavalli et al. |
| 10,120,928 B2 | 11/2018 | Kushmerick et al. |
| 10,122,687 B2 | 11/2018 | Thomas et al. |
| 10,135,697 B2 | 11/2018 | Varney et al. |
| 10,142,191 B2 | 11/2018 | Varney et al. |
| 10,142,353 B2 | 11/2018 | Yadav et al. |
| 10,147,110 B2 | 12/2018 | Shapsa et al. |
| 10,154,021 B1 | 12/2018 | Lerner |
| 10,157,044 B2 | 12/2018 | Khazanchi et al. |
| 10,182,073 B2 | 1/2019 | Redlich et al. |
| 10,185,584 B2 | 1/2019 | Lee et al. |
| 10,185,670 B2 | 1/2019 | Litichever et al. |
| 10,204,244 B2 | 2/2019 | Butler et al. |
| 10,205,627 B2 | 2/2019 | Kushmerick et al. |
| 10,205,637 B2 | 2/2019 | Porras et al. |
| 10,212,023 B2 | 2/2019 | Brown |
| 10,212,045 B2 | 2/2019 | Strandzhev et al. |
| 10,216,615 B2 | 2/2019 | Klemenz |
| 10,216,921 B1 | 2/2019 | Janse Van Rensburg et al. |
| 10,225,142 B2 | 3/2019 | Strandzhev et al. |
| 10,225,286 B2 | 3/2019 | Ray et al. |
| 10,230,532 B2 | 3/2019 | Chan et al. |
| 10,235,176 B2 | 3/2019 | DeHon et al. |
| 10,235,439 B2 | 3/2019 | Sullivan et al. |
| 10,235,810 B2 | 3/2019 | Morrison |
| 10,237,059 B2 | 3/2019 | Sethumadhavan et al. |
| 10,243,815 B2 | 3/2019 | Shapsa et al. |
| 10,243,990 B1 | 3/2019 | Chen et al. |
| 10,248,119 B2 | 4/2019 | Kentley-Klay et al. |
| 10,250,639 B2 | 4/2019 | Redlich et al. |
| 10,250,640 B2 | 4/2019 | Redlich et al. |
| 10,250,641 B2 | 4/2019 | Porras et al. |
| 10,255,292 B2 | 4/2019 | Hinterbichler et al. |
| 10,255,414 B2 | 4/2019 | Horning et al. |
| 10,257,261 B2 | 4/2019 | Raghu |
| 10,261,794 B2 | 4/2019 | DeHon |
| 10,261,809 B1 | 4/2019 | Meritt et al. |
| 10,261,815 B2 | 4/2019 | Gaurav et al. |
| 10,263,966 B2 | 4/2019 | Humphries et al. |
| 10,268,534 B2 | 4/2019 | Brown et al. |
| 10,275,600 B2 | 4/2019 | Wysopal et al. |
| 10,276,170 B2 | 4/2019 | Gruber et al. |
| 10,277,477 B2 | 4/2019 | Nortman |
| 10,277,711 B2 | 4/2019 | Shribman et al. |
| 10,282,223 B2 | 5/2019 | Uliel et al. |
| 10,284,598 B2 | 5/2019 | Stutz |
| 10,290,133 B2 | 5/2019 | Straub |
| 10,296,327 B2 | 5/2019 | Govindaraju et al. |
| 10,296,338 B2 | 5/2019 | Boswell et al. |
| 10,303,899 B2 | 5/2019 | Durham et al. |
| 10,305,758 B1 | 5/2019 | Bhide et al. |
| 10,320,891 B2 | 6/2019 | Agarwal et al. |
| 10,326,769 B2 | 6/2019 | Ilieva et al. |
| 10,332,132 B2 | 6/2019 | Briere et al. |
| 10,334,050 B2 | 6/2019 | Kentley-Klay et al. |
| 10,338,913 B2 | 7/2019 | Franchitti |
| 10,360,168 B1 | 7/2019 | Griffin et al. |
| 10,367,912 B2 | 7/2019 | Saint Clair |
| 10,372,945 B2 | 8/2019 | Costa |
| 10,382,459 B2 | 8/2019 | Harris et al. |
| 10,387,332 B1 | 8/2019 | Metcalf et al. |
| 10,402,253 B2 | 9/2019 | Harutyunyan et al. |
| 10,417,108 B2 | 9/2019 | Tankersley et al. |
| 10,417,432 B2 | 9/2019 | Mahaffey et al. |
| 10,417,626 B1 | 9/2019 | Locke et al. |
| 10,419,514 B2 | 9/2019 | Straub et al. |
| 10,430,263 B2 | 10/2019 | Polar Seminario |
| 10,440,146 B2 | 10/2019 | Shribman et al. |
| 10,445,536 B2 | 10/2019 | Butler et al. |
| 10,445,668 B2 | 10/2019 | Oehrle et al. |
| 10,446,037 B2 | 10/2019 | Kentley-Klay et al. |
| 10,447,809 B2 | 10/2019 | Shribman et al. |
| 10,452,426 B2 | 10/2019 | Nandagopal et al. |
| 10,452,497 B2 | 10/2019 | Straub et al. |
| 10,452,665 B2 | 10/2019 | Poghosyan et al. |
| 10,454,801 B2 | 10/2019 | Lui |
| 10,454,903 B2 | 10/2019 | Neal |
| 10,469,614 B2 | 11/2019 | Shribman et al. |
| 10,469,615 B2 | 11/2019 | Shribman et al. |

(56) References Cited

U.S. PATENT DOCUMENTS

| | | |
|---|---|---|
| 10,485,431 B1 | 11/2019 | Khachaturian et al. |
| 10,492,684 B2 | 12/2019 | Khachaturian et al. |
| 10,498,707 B2 | 12/2019 | Kurian |
| 10,503,630 B2 | 12/2019 | Kasi et al. |
| 10,503,822 B1 | 12/2019 | Spencer et al. |
| 10,503,933 B2 | 12/2019 | Auh |
| 10,505,825 B1 | 12/2019 | Bettaiah et al. |
| 10,506,926 B2 | 12/2019 | Khachaturian et al. |
| 10,509,910 B2 | 12/2019 | Mahaffey et al. |
| 10,509,911 B2 | 12/2019 | Mahaffey et al. |
| 10,513,531 B2 | 12/2019 | Toutov et al. |
| 10,515,096 B1 | 12/2019 | Choudhary et al. |
| 10,516,533 B2 | 12/2019 | Mannan et al. |
| 2002/0010798 A1 | 1/2002 | Ben-Shaul et al. |
| 2002/0038296 A1 | 3/2002 | Margolus et al. |
| 2002/0048369 A1 | 4/2002 | Ginter et al. |
| 2002/0064149 A1 | 5/2002 | Elliott et al. |
| 2002/0095454 A1 | 7/2002 | Reed et al. |
| 2002/0108121 A1 | 8/2002 | Alao et al. |
| 2002/0111948 A1 | 8/2002 | Nixon et al. |
| 2002/0112171 A1 | 8/2002 | Ginter et al. |
| 2002/0138582 A1 | 9/2002 | Chandra et al. |
| 2002/0138848 A1 | 9/2002 | Alao et al. |
| 2002/0143855 A1 | 10/2002 | Traversat et al. |
| 2002/0143944 A1 | 10/2002 | Traversat et al. |
| 2002/0144153 A1 | 10/2002 | LeVine et al. |
| 2002/0147645 A1 | 10/2002 | Alao et al. |
| 2002/0147771 A1 | 10/2002 | Traversat et al. |
| 2002/0147810 A1 | 10/2002 | Traversat et al. |
| 2002/0152156 A1 | 10/2002 | Tyson-Quah |
| 2002/0152299 A1 | 10/2002 | Traversat et al. |
| 2002/0156893 A1 | 10/2002 | Pouyoul et al. |
| 2002/0161908 A1 | 10/2002 | Benitez et al. |
| 2002/0168621 A1 | 11/2002 | Cook et al. |
| 2002/0184310 A1 | 12/2002 | Traversat et al. |
| 2002/0184357 A1 | 12/2002 | Traversat et al. |
| 2002/0184358 A1 | 12/2002 | Traversat et al. |
| 2002/0188657 A1 | 12/2002 | Traversat et al. |
| 2002/0194389 A1* | 12/2002 | Worley, Jr. ............ G06F 9/4812 719/310 |
| 2003/0002521 A1 | 1/2003 | Traversal et al. |
| 2003/0041141 A1 | 2/2003 | Abdelaziz et al. |
| 2003/0051026 A1 | 3/2003 | Carter et al. |
| 2003/0058277 A1 | 3/2003 | Bowman-Amuah |
| 2003/0088784 A1 | 5/2003 | Ginter et al. |
| 2003/0097331 A1 | 5/2003 | Cohen |
| 2003/0105721 A1 | 6/2003 | Ginter et al. |
| 2003/0140205 A1 | 7/2003 | Dahan et al. |
| 2003/0140244 A1 | 7/2003 | Dahan et al. |
| 2003/0140245 A1 | 7/2003 | Dahan et al. |
| 2003/0163431 A1 | 8/2003 | Ginter et al. |
| 2003/0163718 A1 | 8/2003 | Johnson et al. |
| 2003/0167406 A1 | 9/2003 | Beavers |
| 2003/0177187 A1 | 9/2003 | Levine et al. |
| 2003/0182572 A1 | 9/2003 | Cowan et al. |
| 2003/0191719 A1 | 10/2003 | Ginter et al. |
| 2004/0003278 A1 | 1/2004 | Chen et al. |
| 2004/0021679 A1 | 2/2004 | Chapman et al. |
| 2004/0030743 A1 | 2/2004 | Hugly et al. |
| 2004/0030794 A1 | 2/2004 | Hugly et al. |
| 2004/0031038 A1 | 2/2004 | Hugly et al. |
| 2004/0044727 A1 | 3/2004 | Abdelaziz et al. |
| 2004/0054630 A1 | 3/2004 | Ginter et al. |
| 2004/0064351 A1 | 4/2004 | Mikurak |
| 2004/0064512 A1 | 4/2004 | Arora et al. |
| 2004/0064568 A1 | 4/2004 | Arora et al. |
| 2004/0064693 A1 | 4/2004 | Pabla et al. |
| 2004/0088347 A1 | 5/2004 | Yeager et al. |
| 2004/0088348 A1 | 5/2004 | Yeager et al. |
| 2004/0088369 A1 | 5/2004 | Yeager et al. |
| 2004/0088646 A1 | 5/2004 | Yeager et al. |
| 2004/0098306 A1 | 5/2004 | Fitzpatrick et al. |
| 2004/0098447 A1 | 5/2004 | Verbeke et al. |
| 2004/0103305 A1 | 5/2004 | Ginter et al. |
| 2004/0133640 A1 | 7/2004 | Yeager et al. |
| 2004/0133793 A1 | 7/2004 | Ginter et al. |
| 2004/0139098 A1 | 7/2004 | Margolus et al. |
| 2004/0139303 A1 | 7/2004 | Margolus et al. |
| 2004/0143578 A1 | 7/2004 | Margolus et al. |
| 2004/0143730 A1 | 7/2004 | Wen et al. |
| 2004/0143743 A1 | 7/2004 | Margolus et al. |
| 2004/0143744 A1 | 7/2004 | Margolus et al. |
| 2004/0143745 A1 | 7/2004 | Margolus et al. |
| 2004/0148326 A1 | 7/2004 | Nadgir et al. |
| 2004/0162808 A1 | 8/2004 | Margolus et al. |
| 2004/0162871 A1 | 8/2004 | Pabla et al. |
| 2004/0172557 A1 | 9/2004 | Nakae et al. |
| 2004/0177243 A1 | 9/2004 | Worley |
| 2004/0193329 A1 | 9/2004 | Ransom et al. |
| 2004/0218762 A1 | 11/2004 | Le Saint et al. |
| 2004/0230791 A1 | 11/2004 | Boebert et al. |
| 2004/0236660 A1 | 11/2004 | Thomas et al. |
| 2004/0250112 A1 | 12/2004 | Valente et al. |
| 2004/0255140 A1 | 12/2004 | Margolus et al. |
| 2005/0004978 A1 | 1/2005 | Reed et al. |
| 2005/0005169 A1 | 1/2005 | Kelekar |
| 2005/0010821 A1 | 1/2005 | Cooper et al. |
| 2005/0038565 A1 | 2/2005 | Power et al. |
| 2005/0086300 A1 | 4/2005 | Yeager et al. |
| 2005/0108057 A1 | 5/2005 | Cohen et al. |
| 2005/0108091 A1 | 5/2005 | Sotak et al. |
| 2005/0108153 A1 | 5/2005 | Thomas et al. |
| 2005/0131903 A1 | 6/2005 | Margolus et al. |
| 2005/0131904 A1 | 6/2005 | Margolus et al. |
| 2005/0131905 A1 | 6/2005 | Margolus et al. |
| 2005/0131961 A1 | 6/2005 | Margolus et al. |
| 2005/0132070 A1 | 6/2005 | Redlich et al. |
| 2005/0138109 A1 | 6/2005 | Redlich et al. |
| 2005/0138110 A1 | 6/2005 | Redlich et al. |
| 2005/0138413 A1 | 6/2005 | Lippmann et al. |
| 2005/0144437 A1 | 6/2005 | Ransom et al. |
| 2005/0177716 A1 | 8/2005 | Ginter et al. |
| 2005/0183072 A1 | 8/2005 | Horning et al. |
| 2005/0187963 A1 | 8/2005 | Markin |
| 2005/0193269 A1 | 9/2005 | Haswell et al. |
| 2005/0204348 A1 | 9/2005 | Horning et al. |
| 2005/0210275 A1 | 9/2005 | Homing et al. |
| 2005/0229255 A1 | 10/2005 | Gula et al. |
| 2005/0262006 A1 | 11/2005 | Beartusk et al. |
| 2005/0262007 A1 | 11/2005 | Beartusk et al. |
| 2005/0262075 A1 | 11/2005 | Beartusk et al. |
| 2005/0262092 A1 | 11/2005 | Beartusk et al. |
| 2005/0262093 A1 | 11/2005 | Beartusk et al. |
| 2005/0262094 A1 | 11/2005 | Beartusk et al. |
| 2005/0262095 A1 | 11/2005 | Beartusk et al. |
| 2005/0262185 A1 | 11/2005 | Beartusk et al. |
| 2005/0273382 A1 | 12/2005 | Beartusk et al. |
| 2005/0273714 A1 | 12/2005 | Beartusk et al. |
| 2005/0278294 A1 | 12/2005 | Beartusk et al. |
| 2006/0004690 A1 | 1/2006 | Beartusk et al. |
| 2006/0010125 A1 | 1/2006 | Beartusk et al. |
| 2006/0010205 A1 | 1/2006 | Beartusk et al. |
| 2006/0015749 A1 | 1/2006 | Mittal |
| 2006/0031234 A1 | 2/2006 | Beartusk et al. |
| 2006/0031497 A1 | 2/2006 | Beartusk et al. |
| 2006/0036755 A1 | 2/2006 | Abdullah et al. |
| 2006/0059253 A1 | 3/2006 | Goodman et al. |
| 2006/0069912 A1 | 3/2006 | Zheng et al. |
| 2006/0069926 A1 | 3/2006 | Ginter et al. |
| 2006/0106941 A1 | 5/2006 | Singhal et al. |
| 2006/0114832 A1 | 6/2006 | Hamilton et al. |
| 2006/0123010 A1 | 6/2006 | Landry et al. |
| 2006/0123226 A1 | 6/2006 | Kumar et al. |
| 2006/0123425 A1 | 6/2006 | Ramarao et al. |
| 2006/0123467 A1 | 6/2006 | Kumar et al. |
| 2006/0123477 A1 | 6/2006 | Raghavan et al. |
| 2006/0123479 A1 | 6/2006 | Kumar et al. |
| 2006/0129650 A1 | 6/2006 | Ho et al. |
| 2006/0129689 A1 | 6/2006 | Ho et al. |
| 2006/0146879 A1 | 7/2006 | Anthias et al. |
| 2006/0155398 A1 | 7/2006 | Hoffberg et al. |
| 2006/0155862 A1 | 7/2006 | Kathi et al. |
| 2006/0167975 A1 | 7/2006 | Chan et al. |
| 2006/0168334 A1 | 7/2006 | Potti et al. |

(56) References Cited

U.S. PATENT DOCUMENTS

| | | |
|---|---|---|
| 2006/0174326 A1 | 8/2006 | Ginter et al. |
| 2006/0178918 A1 | 8/2006 | Mikurak |
| 2006/0200253 A1 | 9/2006 | Hoffberg et al. |
| 2006/0200259 A1 | 9/2006 | Hoffberg et al. |
| 2006/0208066 A1 | 9/2006 | Finn et al. |
| 2006/0212722 A1 | 9/2006 | Ginter et al. |
| 2006/0224903 A1 | 10/2006 | Ginter et al. |
| 2006/0225135 A1 | 10/2006 | Cheng et al. |
| 2006/0259726 A1 | 11/2006 | Nardini et al. |
| 2006/0259828 A1 | 11/2006 | Swoboda |
| 2006/0265324 A1 | 11/2006 | Leclerc et al. |
| 2006/0265751 A1 | 11/2006 | Cosquer et al. |
| 2007/0005786 A1 | 1/2007 | Kumar et al. |
| 2007/0005801 A1 | 1/2007 | Kumar et al. |
| 2007/0006294 A1 | 1/2007 | Hunter |
| 2007/0011281 A1 | 1/2007 | Jhoney et al. |
| 2007/0028001 A1 | 2/2007 | Phillips et al. |
| 2007/0061594 A1 | 3/2007 | Ginter et al. |
| 2007/0061874 A1 | 3/2007 | Coppola et al. |
| 2007/0061885 A1 | 3/2007 | Hammes et al. |
| 2007/0064943 A1 | 3/2007 | Ginter et al. |
| 2007/0067846 A1 | 3/2007 | McFarlane et al. |
| 2007/0067847 A1 | 3/2007 | Wiemer et al. |
| 2007/0067848 A1 | 3/2007 | Gustave et al. |
| 2007/0097885 A1 | 5/2007 | Traversat et al. |
| 2007/0100834 A1 | 5/2007 | Landry et al. |
| 2007/0132733 A1 | 6/2007 | Ram |
| 2007/0156919 A1 | 7/2007 | Potti et al. |
| 2007/0162890 A1 | 7/2007 | Meier et al. |
| 2007/0169199 A1 | 7/2007 | Quinnell et al. |
| 2007/0177615 A1 | 8/2007 | Miliefsky |
| 2007/0192866 A1 | 8/2007 | Sagoo et al. |
| 2007/0192867 A1 | 8/2007 | Miliefsky |
| 2007/0199074 A1 | 8/2007 | LeVine et al. |
| 2007/0226789 A1 | 9/2007 | Boebert et al. |
| 2007/0226807 A1 | 9/2007 | Ginter et al. |
| 2007/0234069 A1 | 10/2007 | Ginter et al. |
| 2007/0234070 A1 | 10/2007 | Horning et al. |
| 2007/0245403 A1 | 10/2007 | Ginter et al. |
| 2007/0250808 A1 | 10/2007 | Zeanah et al. |
| 2007/0250937 A1 | 10/2007 | Ginter et al. |
| 2007/0260838 A1 | 11/2007 | Schwemmlein |
| 2007/0261125 A1 | 11/2007 | Ginter et al. |
| 2007/0265064 A1 | 11/2007 | Kessman et al. |
| 2007/0266429 A1 | 11/2007 | Ginter et al. |
| 2007/0277031 A1 | 11/2007 | Ginter et al. |
| 2007/0282951 A1 | 12/2007 | Selimis et al. |
| 2007/0288610 A1 | 12/2007 | Saint Clair et al. |
| 2008/0005062 A1 | 1/2008 | Gupta et al. |
| 2008/0005135 A1 | 1/2008 | Muthukrishnan et al. |
| 2008/0005784 A1 | 1/2008 | Miliefsky |
| 2008/0005794 A1 | 1/2008 | Inoue et al. |
| 2008/0022137 A1 | 1/2008 | Ginter et al. |
| 2008/0025230 A1 | 1/2008 | Patel et al. |
| 2008/0034227 A1 | 2/2008 | Ginter et al. |
| 2008/0034230 A1 | 2/2008 | Ginter et al. |
| 2008/0034231 A1 | 2/2008 | Ginter et al. |
| 2008/0034406 A1 | 2/2008 | Ginter et al. |
| 2008/0052541 A1 | 2/2008 | Ginter et al. |
| 2008/0060077 A1 | 3/2008 | Cowan et al. |
| 2008/0064501 A1 | 3/2008 | Patel |
| 2008/0068381 A1 | 3/2008 | Cohen et al. |
| 2008/0071793 A1 | 3/2008 | Cohen et al. |
| 2008/0071826 A1 | 3/2008 | Cohen et al. |
| 2008/0071871 A1 | 3/2008 | Cohen et al. |
| 2008/0071888 A1 | 3/2008 | Cohen et al. |
| 2008/0071889 A1 | 3/2008 | Cohen et al. |
| 2008/0071891 A1 | 3/2008 | Cohen et al. |
| 2008/0071896 A1 | 3/2008 | Cohen et al. |
| 2008/0071898 A1 | 3/2008 | Cohen et al. |
| 2008/0072032 A1 | 3/2008 | Cohen et al. |
| 2008/0072241 A1 | 3/2008 | Cohen et al. |
| 2008/0072277 A1 | 3/2008 | Cohen et al. |
| 2008/0072278 A1 | 3/2008 | Cohen et al. |
| 2008/0075099 A1 | 3/2008 | Alao et al. |
| 2008/0082568 A1 | 4/2008 | Miller et al. |
| 2008/0089521 A1 | 4/2008 | Le Saint et al. |
| 2008/0092237 A1 | 4/2008 | Yoon et al. |
| 2008/0095339 A1 | 4/2008 | Elliott et al. |
| 2008/0109289 A1 | 5/2008 | Vivadelli et al. |
| 2008/0126349 A1 | 5/2008 | Venkatraman et al. |
| 2008/0126798 A1 | 5/2008 | Ginter et al. |
| 2008/0126803 A1 | 5/2008 | Ginter et al. |
| 2008/0127293 A1 | 5/2008 | Cohen et al. |
| 2008/0127304 A1 | 5/2008 | Ginter et al. |
| 2008/0127349 A1 | 5/2008 | Ormazabal et al. |
| 2008/0146344 A1 | 6/2008 | Rowe et al. |
| 2008/0148056 A1 | 6/2008 | Ginter et al. |
| 2008/0168135 A1 | 7/2008 | Redlich et al. |
| 2008/0172739 A1 | 7/2008 | Nakae et al. |
| 2008/0189250 A1 | 8/2008 | Cha et al. |
| 2008/0209505 A1 | 8/2008 | Ghai et al. |
| 2008/0222724 A1 | 9/2008 | Ormazabal et al. |
| 2008/0222734 A1 | 9/2008 | Redlich et al. |
| 2008/0229037 A1 | 9/2008 | Bunte et al. |
| 2008/0256638 A1 | 10/2008 | Russ et al. |
| 2008/0270104 A1 | 10/2008 | Stratton et al. |
| 2008/0271018 A1 | 10/2008 | Gross et al. |
| 2008/0271019 A1 | 10/2008 | Stratton et al. |
| 2008/0271025 A1 | 10/2008 | Gross et al. |
| 2008/0281666 A1 | 11/2008 | Kessman et al. |
| 2008/0282339 A1 | 11/2008 | Nakae et al. |
| 2008/0313739 A1 | 12/2008 | Martin |
| 2008/0314570 A1 | 12/2008 | Singh et al. |
| 2009/0007269 A1 | 1/2009 | Bianco |
| 2009/0028135 A1 | 1/2009 | Mantripragada et al. |
| 2009/0043652 A1 | 2/2009 | Ginter et al. |
| 2009/0048978 A1 | 2/2009 | Ginter et al. |
| 2009/0077666 A1 | 3/2009 | Chen et al. |
| 2009/0083372 A1 | 3/2009 | Teppler |
| 2009/0083374 A1 | 3/2009 | Saint Clair |
| 2009/0099885 A1 | 4/2009 | Sung et al. |
| 2009/0100077 A1 | 4/2009 | Jung et al. |
| 2009/0103524 A1 | 4/2009 | Mantripragada et al. |
| 2009/0106318 A1 | 4/2009 | Mantripragada et al. |
| 2009/0109959 A1 | 4/2009 | Elliott et al. |
| 2009/0113550 A1 | 4/2009 | Costa et al. |
| 2009/0119541 A1 | 5/2009 | Inoue et al. |
| 2009/0124374 A1 | 5/2009 | Patel |
| 2009/0124375 A1 | 5/2009 | Patel |
| 2009/0125387 A1 | 5/2009 | Mak et al. |
| 2009/0132805 A1 | 5/2009 | Ginter et al. |
| 2009/0132815 A1 | 5/2009 | Ginter et al. |
| 2009/0138393 A1 | 5/2009 | Lemons et al. |
| 2009/0178102 A1 | 7/2009 | Alghathbar et al. |
| 2009/0178144 A1 | 7/2009 | Redlich et al. |
| 2009/0182919 A1 | 7/2009 | Chang et al. |
| 2009/0199259 A1 | 8/2009 | Alao et al. |
| 2009/0204591 A1 | 8/2009 | Kaksonen |
| 2009/0216910 A1 | 8/2009 | Duchesneau |
| 2009/0254572 A1 | 10/2009 | Redlich et al. |
| 2009/0254971 A1 | 10/2009 | Herz et al. |
| 2009/0254993 A1 | 10/2009 | Leone |
| 2009/0280906 A1 | 11/2009 | Larsen et al. |
| 2009/0280907 A1 | 11/2009 | Larsen et al. |
| 2009/0281864 A1 | 11/2009 | Abercrombie et al. |
| 2009/0290712 A1 | 11/2009 | Henry et al. |
| 2009/0292847 A1 | 11/2009 | Henry et al. |
| 2009/0292853 A1 | 11/2009 | Henry et al. |
| 2009/0292893 A1 | 11/2009 | Henry et al. |
| 2009/0292894 A1 | 11/2009 | Henry et al. |
| 2009/0292901 A1 | 11/2009 | Henry et al. |
| 2009/0292902 A1 | 11/2009 | Henry et al. |
| 2009/0292903 A1 | 11/2009 | Henry et al. |
| 2009/0292904 A1 | 11/2009 | Henry et al. |
| 2009/0292929 A1 | 11/2009 | Henry et al. |
| 2009/0292931 A1 | 11/2009 | Henry et al. |
| 2009/0293100 A1 | 11/2009 | Kang et al. |
| 2009/0293129 A1 | 11/2009 | Henry et al. |
| 2009/0293130 A1 | 11/2009 | Henry et al. |
| 2009/0293132 A1 | 11/2009 | Henry et al. |
| 2010/0010968 A1 | 1/2010 | Redlich et al. |
| 2010/0011000 A1 | 1/2010 | Chakra et al. |
| 2010/0037324 A1 | 2/2010 | Grant et al. |

(56) References Cited

U.S. PATENT DOCUMENTS

| | | |
|---|---|---|
| 2010/0042824 A1 | 2/2010 | Lee et al. |
| 2010/0050266 A1 | 2/2010 | Cheng et al. |
| 2010/0063892 A1 | 3/2010 | Keronen et al. |
| 2010/0091676 A1 | 4/2010 | Moran et al. |
| 2010/0094945 A1 | 4/2010 | Chan et al. |
| 2010/0095235 A1 | 4/2010 | Bennett et al. |
| 2010/0095381 A1 | 4/2010 | Levi |
| 2010/0131357 A1 | 5/2010 | Steelberg et al. |
| 2010/0136943 A1 | 6/2010 | Hirvela et al. |
| 2010/0154066 A1 | 6/2010 | Hammes et al. |
| 2010/0185855 A1 | 7/2010 | Margolus et al. |
| 2010/0192228 A1 | 7/2010 | Levi |
| 2010/0228996 A1 | 9/2010 | Ginter et al. |
| 2010/0235285 A1 | 9/2010 | Hoffberg |
| 2010/0250497 A1 | 9/2010 | Redlich et al. |
| 2010/0250935 A1 | 9/2010 | Ginter et al. |
| 2010/0257614 A1 | 10/2010 | Ginter et al. |
| 2010/0262952 A1 | 10/2010 | Colton et al. |
| 2010/0265179 A1 | 10/2010 | Ram |
| 2010/0275040 A1 | 10/2010 | Ginter et al. |
| 2010/0275263 A1 | 10/2010 | Bennett et al. |
| 2010/0280948 A1 | 11/2010 | Cohen |
| 2010/0281273 A1 | 11/2010 | Lee et al. |
| 2010/0289627 A1 | 11/2010 | McAllister et al. |
| 2010/0306552 A1 | 12/2010 | LeVine et al. |
| 2010/0306851 A1 | 12/2010 | Zhou |
| 2010/0313013 A1 | 12/2010 | Ginter et al. |
| 2010/0332672 A1 | 12/2010 | Abdullah et al. |
| 2011/0022520 A1 | 1/2011 | Ginter et al. |
| 2011/0022846 A1 | 1/2011 | Ginter et al. |
| 2011/0029644 A1 | 2/2011 | Gelvin et al. |
| 2011/0030057 A1 | 2/2011 | Chen et al. |
| 2011/0035733 A1 | 2/2011 | Horning et al. |
| 2011/0047369 A1 | 2/2011 | Cohen et al. |
| 2011/0047376 A1 | 2/2011 | Mittal |
| 2011/0060809 A1 | 3/2011 | Cohen et al. |
| 2011/0093700 A1 | 4/2011 | Mittal |
| 2011/0093954 A1 | 4/2011 | Lee et al. |
| 2011/0105223 A1 | 5/2011 | Kessman et al. |
| 2011/0125548 A1 | 5/2011 | Aharon et al. |
| 2011/0131402 A1 | 6/2011 | Mittal |
| 2011/0131548 A1 | 6/2011 | Colton et al. |
| 2011/0138469 A1 | 6/2011 | Ye et al. |
| 2011/0138471 A1 | 6/2011 | Van De Weyer et al. |
| 2011/0141877 A1 | 6/2011 | Xu et al. |
| 2011/0145602 A1 | 6/2011 | Ginter et al. |
| 2011/0167110 A1 | 7/2011 | Hoffberg et al. |
| 2011/0173693 A1 | 7/2011 | Wysopal et al. |
| 2011/0173695 A1 | 7/2011 | Ginter et al. |
| 2011/0191854 A1 | 8/2011 | Giakouminakis et al. |
| 2011/0197285 A1 | 8/2011 | Ginter et al. |
| 2011/0208867 A1 | 8/2011 | Anthias et al. |
| 2011/0209193 A1 | 8/2011 | Kennedy |
| 2011/0209194 A1 | 8/2011 | Kennedy |
| 2011/0209195 A1 | 8/2011 | Kennedy |
| 2011/0209196 A1 | 8/2011 | Kennedy |
| 2011/0213485 A1 | 9/2011 | Power et al. |
| 2011/0216701 A1 | 9/2011 | Patel et al. |
| 2011/0219066 A1 | 9/2011 | Saint Clair et al. |
| 2011/0231936 A1 | 9/2011 | Williams et al. |
| 2011/0251868 A1 | 10/2011 | Mikurak |
| 2011/0258258 A1 | 10/2011 | Briere et al. |
| 2011/0296164 A1 | 12/2011 | Boebert et al. |
| 2011/0296440 A1 | 12/2011 | Laurich et al. |
| 2012/0066412 A1 | 3/2012 | Chang et al. |
| 2012/0072968 A1 | 3/2012 | Wysopal et al. |
| 2012/0078794 A1 | 3/2012 | Grandcolas et al. |
| 2012/0079149 A1 | 3/2012 | Gelvin et al. |
| 2012/0089410 A1 | 4/2012 | Mikurak |
| 2012/0166642 A1 | 6/2012 | Saint Clair et al. |
| 2012/0173628 A1 | 7/2012 | Briere et al. |
| 2012/0179656 A1 | 7/2012 | Bunte et al. |
| 2012/0185945 A1 | 7/2012 | Andres et al. |
| 2012/0191860 A1 | 7/2012 | Traversat et al. |
| 2012/0203590 A1 | 8/2012 | Deb et al. |
| 2012/0204261 A1 | 8/2012 | Mantripragada et al. |
| 2012/0222123 A1 | 8/2012 | Williams et al. |
| 2012/0232679 A1 | 9/2012 | Abercrombie et al. |
| 2012/0233237 A1 | 9/2012 | Roa et al. |
| 2012/0239753 A1 | 9/2012 | Beartusk et al. |
| 2012/0240236 A1 | 9/2012 | Wyatt et al. |
| 2012/0246103 A1 | 9/2012 | Mantripragada et al. |
| 2012/0254842 A1 | 10/2012 | Henderson |
| 2012/0259722 A1 | 10/2012 | Mikurak |
| 2012/0260306 A1 | 10/2012 | Njemanze et al. |
| 2012/0272205 A1 | 10/2012 | Fox et al. |
| 2012/0284221 A1 | 11/2012 | Shelton et al. |
| 2012/0304299 A1 | 11/2012 | Kelekar |
| 2012/0304300 A1 | 11/2012 | LaBumbard |
| 2012/0311534 A1 | 12/2012 | Fox et al. |
| 2012/0311715 A1 | 12/2012 | Tal et al. |
| 2012/0323717 A1 | 12/2012 | Kirsch |
| 2012/0323786 A1 | 12/2012 | Kirsch |
| 2012/0324242 A1 | 12/2012 | Kirsch |
| 2013/0031364 A1 | 1/2013 | Glew et al. |
| 2013/0035058 A1 | 2/2013 | Hirvela et al. |
| 2013/0036314 A1 | 2/2013 | Glew et al. |
| 2013/0036448 A1 | 2/2013 | Aciicmez et al. |
| 2013/0055394 A1 | 2/2013 | Beresnevichiene et al. |
| 2013/0074038 A1 | 3/2013 | Fox et al. |
| 2013/0074188 A1 | 3/2013 | Giakouminakis et al. |
| 2013/0086688 A1 | 4/2013 | Patel et al. |
| 2013/0091578 A1 | 4/2013 | Bisht et al. |
| 2013/0097664 A1 | 4/2013 | Herz et al. |
| 2013/0125204 A1 | 5/2013 | La Fever et al. |
| 2013/0167240 A1 | 6/2013 | Kelekar |
| 2013/0179405 A1 | 7/2013 | Bunte et al. |
| 2013/0179685 A1 | 7/2013 | Weinstein et al. |
| 2013/0182561 A1 | 7/2013 | Xu et al. |
| 2013/0188646 A1 | 7/2013 | Lu et al. |
| 2013/0191808 A1 | 7/2013 | Fox et al. |
| 2013/0191919 A1 | 7/2013 | Basavapatna et al. |
| 2013/0198846 A1 | 8/2013 | Chapman |
| 2013/0212118 A1 | 8/2013 | King et al. |
| 2013/0215116 A1 | 8/2013 | Siddique et al. |
| 2013/0227698 A1 | 8/2013 | Taniguchi et al. |
| 2013/0232343 A1 | 9/2013 | Horning et al. |
| 2013/0247206 A1 | 9/2013 | Hugard et al. |
| 2013/0268253 A1 | 10/2013 | Neergaard |
| 2013/0297375 A1 | 11/2013 | Chapman |
| 2013/0298192 A1 | 11/2013 | Kumar et al. |
| 2013/0298230 A1 | 11/2013 | Kumar et al. |
| 2013/0298242 A1 | 11/2013 | Kumar et al. |
| 2013/0298243 A1 | 11/2013 | Kumar et al. |
| 2013/0298244 A1 | 11/2013 | Kumar et al. |
| 2013/0298251 A1 | 11/2013 | Mittal |
| 2013/0304742 A1 | 11/2013 | Roman et al. |
| 2013/0304761 A1 | 11/2013 | Redlich et al. |
| 2013/0304820 A1 | 11/2013 | Vasquez et al. |
| 2013/0305158 A1 | 11/2013 | Vasquez et al. |
| 2013/0306276 A1 | 11/2013 | Duchesneau |
| 2013/0326469 A1 | 12/2013 | Fox et al. |
| 2014/0006482 A1 | 1/2014 | Raghu et al. |
| 2014/0006580 A1 | 1/2014 | Raghu |
| 2014/0006581 A1 | 1/2014 | Raghu |
| 2014/0007241 A1 | 1/2014 | Gula et al. |
| 2014/0019204 A1 | 1/2014 | Briere et al. |
| 2014/0025573 A1 | 1/2014 | Keronen et al. |
| 2014/0032505 A1 | 1/2014 | Grafi et al. |
| 2014/0032690 A1 | 1/2014 | Ramarao et al. |
| 2014/0047545 A1 | 2/2014 | Sidagni |
| 2014/0059683 A1 | 2/2014 | Ashley |
| 2014/0068267 A1 | 3/2014 | Le Saint et al. |
| 2014/0075414 A1 | 3/2014 | Fox et al. |
| 2014/0082733 A1 | 3/2014 | Benefield |
| 2014/0108726 A1 | 4/2014 | Laurich et al. |
| 2014/0109167 A1 | 4/2014 | Alao et al. |
| 2014/0129457 A1 | 5/2014 | Peeler |
| 2014/0137257 A1 | 5/2014 | Martinez et al. |
| 2014/0143754 A1 | 5/2014 | Henderson |
| 2014/0143889 A1 | 5/2014 | Ginter et al. |
| 2014/0157145 A1 | 6/2014 | Bush et al. |
| 2014/0165204 A1 | 6/2014 | Williams et al. |
| 2014/0172495 A1 | 6/2014 | Schneck et al. |

(56) References Cited

U.S. PATENT DOCUMENTS

| | | |
|---|---|---|
| 2014/0172944 A1 | 6/2014 | Newton et al. |
| 2014/0172951 A1 | 6/2014 | Varney et al. |
| 2014/0172952 A1 | 6/2014 | Varney et al. |
| 2014/0172956 A1 | 6/2014 | Varney et al. |
| 2014/0172970 A1 | 6/2014 | Newton et al. |
| 2014/0173023 A1 | 6/2014 | Varney et al. |
| 2014/0173029 A1 | 6/2014 | Varney et al. |
| 2014/0173030 A1 | 6/2014 | Varney et al. |
| 2014/0173038 A1 | 6/2014 | Newton et al. |
| 2014/0173039 A1 | 6/2014 | Newton et al. |
| 2014/0173040 A1 | 6/2014 | Newton et al. |
| 2014/0173041 A1 | 6/2014 | Newton et al. |
| 2014/0173042 A1 | 6/2014 | Newton et al. |
| 2014/0173043 A1 | 6/2014 | Varney et al. |
| 2014/0173044 A1 | 6/2014 | Varney et al. |
| 2014/0173045 A1 | 6/2014 | Crowder et al. |
| 2014/0173046 A1 | 6/2014 | Crowder et al. |
| 2014/0173047 A1 | 6/2014 | Crowder et al. |
| 2014/0173048 A1 | 6/2014 | Crowder et al. |
| 2014/0173052 A1 | 6/2014 | Newton et al. |
| 2014/0173053 A1 | 6/2014 | Varney et al. |
| 2014/0173054 A1 | 6/2014 | Varney et al. |
| 2014/0173061 A1 | 6/2014 | Lipstone et al. |
| 2014/0173062 A1 | 6/2014 | Lipstone et al. |
| 2014/0173064 A1 | 6/2014 | Newton et al. |
| 2014/0173066 A1 | 6/2014 | Newton et al. |
| 2014/0173067 A1 | 6/2014 | Newton et al. |
| 2014/0173077 A1 | 6/2014 | Newton et al. |
| 2014/0173079 A1 | 6/2014 | Newton et al. |
| 2014/0173087 A1 | 6/2014 | Varney et al. |
| 2014/0173088 A1 | 6/2014 | Varney et al. |
| 2014/0173091 A1 | 6/2014 | Lipstone et al. |
| 2014/0173097 A1 | 6/2014 | Newton et al. |
| 2014/0173115 A1 | 6/2014 | Varney et al. |
| 2014/0173131 A1 | 6/2014 | Newton et al. |
| 2014/0173132 A1 | 6/2014 | Varney et al. |
| 2014/0173135 A1 | 6/2014 | Varney et al. |
| 2014/0173731 A1 | 6/2014 | Mantripragada et al. |
| 2014/0173737 A1 | 6/2014 | Toback et al. |
| 2014/0181975 A1 | 6/2014 | Spernow et al. |
| 2014/0181976 A1 | 6/2014 | Snow et al. |
| 2014/0189787 A1 | 7/2014 | Cohen et al. |
| 2014/0189873 A1 | 7/2014 | Elder et al. |
| 2014/0196130 A1 | 7/2014 | Brooker et al. |
| 2014/0196154 A1 | 7/2014 | Swoboda |
| 2014/0201838 A1 | 7/2014 | Varsanyi et al. |
| 2014/0201843 A1 | 7/2014 | Hibbert et al. |
| 2014/0215614 A1 | 7/2014 | Beskrovny et al. |
| 2014/0215629 A1 | 7/2014 | Raz et al. |
| 2014/0218389 A1 | 8/2014 | Bennett et al. |
| 2014/0221069 A1 | 8/2014 | Kessman et al. |
| 2014/0222610 A1 | 8/2014 | Mikurak |
| 2014/0222946 A1 | 8/2014 | Lipstone et al. |
| 2014/0222977 A1 | 8/2014 | Varney et al. |
| 2014/0222984 A1 | 8/2014 | Varney et al. |
| 2014/0223002 A1 | 8/2014 | Varney et al. |
| 2014/0223003 A1 | 8/2014 | Varney et al. |
| 2014/0223015 A1 | 8/2014 | Varney et al. |
| 2014/0223016 A1 | 8/2014 | Varney et al. |
| 2014/0223017 A1 | 8/2014 | Lipstone et al. |
| 2014/0223018 A1 | 8/2014 | Varney et al. |
| 2014/0237545 A1 | 8/2014 | Mylavarapu et al. |
| 2014/0245376 A1 | 8/2014 | Hibbert et al. |
| 2014/0278594 A1 | 9/2014 | Vivadelli et al. |
| 2014/0283083 A1 | 9/2014 | Gula et al. |
| 2014/0317315 A1 | 10/2014 | Duchesneau |
| 2014/0317507 A1 | 10/2014 | Saint Clair |
| 2014/0317677 A1 | 10/2014 | Vaidya et al. |
| 2014/0337321 A1 | 11/2014 | Coyote et al. |
| 2014/0337461 A1 | 11/2014 | Lipstone et al. |
| 2014/0337472 A1 | 11/2014 | Newton et al. |
| 2014/0337971 A1 | 11/2014 | Casassa Mont et al. |
| 2014/0337974 A1 | 11/2014 | Joshi et al. |
| 2014/0344391 A1 | 11/2014 | Varney et al. |
| 2014/0344399 A1 | 11/2014 | Lipstone et al. |
| 2014/0344400 A1 | 11/2014 | Varney et al. |
| 2014/0344401 A1 | 11/2014 | Varney et al. |
| 2014/0344413 A1 | 11/2014 | Lipstone et al. |
| 2014/0344425 A1 | 11/2014 | Varney et al. |
| 2014/0344452 A1 | 11/2014 | Lipstone et al. |
| 2014/0344453 A1 | 11/2014 | Varney et al. |
| 2014/0359776 A1 | 12/2014 | Liu |
| 2014/0366145 A1 | 12/2014 | Benefield |
| 2014/0373160 A1 | 12/2014 | Shigemoto et al. |
| 2015/0006408 A1 | 1/2015 | Mak et al. |
| 2015/0006582 A1 | 1/2015 | Briere et al. |
| 2015/0033340 A1 | 1/2015 | Giokas |
| 2015/0040220 A1 | 2/2015 | Mantripragada et al. |
| 2015/0040228 A1 | 2/2015 | Lee et al. |
| 2015/0052517 A1 | 2/2015 | Raghu et al. |
| 2015/0052521 A1 | 2/2015 | Raghu |
| 2015/0052523 A1 | 2/2015 | Raghu |
| 2015/0052524 A1 | 2/2015 | Raghu |
| 2015/0052525 A1 | 2/2015 | Raghu |
| 2015/0058214 A1 | 2/2015 | Cohen |
| 2015/0058993 A1 | 2/2015 | Choi et al. |
| 2015/0058997 A1 | 2/2015 | Lee et al. |
| 2015/0067323 A1 | 3/2015 | Salowey et al. |
| 2015/0067762 A1 | 3/2015 | Belenky et al. |
| 2015/0067819 A1 | 3/2015 | Shribman et al. |
| 2015/0074670 A1 | 3/2015 | Gerganov |
| 2015/0074743 A1 | 3/2015 | Ilieva et al. |
| 2015/0080081 A1 | 3/2015 | Kessman et al. |
| 2015/0088733 A1 | 3/2015 | Monastyrsky et al. |
| 2015/0088754 A1 | 3/2015 | Kirsch |
| 2015/0106873 A1 | 4/2015 | Marsh et al. |
| 2015/0113288 A1 | 4/2015 | Mittal |
| 2015/0113289 A1 | 4/2015 | Mittal |
| 2015/0121087 A1 | 4/2015 | Mittal |
| 2015/0121090 A1 | 4/2015 | Mittal |
| 2015/0128274 A1 | 5/2015 | Giokas |
| 2015/0149491 A1 | 5/2015 | Redlich et al. |
| 2015/0154423 A1 | 6/2015 | Mittal |
| 2015/0154424 A1 | 6/2015 | Mittal |
| 2015/0156206 A1 | 6/2015 | Redlich et al. |
| 2015/0163097 A1 | 6/2015 | Lipstone et al. |
| 2015/0172307 A1 | 6/2015 | Borohovski et al. |
| 2015/0180724 A1 | 6/2015 | Varney et al. |
| 2015/0180725 A1 | 6/2015 | Varney et al. |
| 2015/0180971 A1 | 6/2015 | Varney et al. |
| 2015/0199405 A1 | 7/2015 | Redlich et al. |
| 2015/0199410 A1 | 7/2015 | Redlich et al. |
| 2015/0200967 A1 | 7/2015 | Redlich et al. |
| 2015/0207695 A1 | 7/2015 | Varney et al. |
| 2015/0213358 A1 | 7/2015 | Shelton et al. |
| 2015/0220734 A1 | 8/2015 | Nalluri et al. |
| 2015/0222655 A1 | 8/2015 | Gula et al. |
| 2015/0235164 A1 | 8/2015 | Key |
| 2015/0237062 A1 | 8/2015 | Roytman et al. |
| 2015/0237065 A1 | 8/2015 | Roytman et al. |
| 2015/0241139 A1 | 8/2015 | Mcginnis |
| 2015/0242637 A1 | 8/2015 | Tonn et al. |
| 2015/0244734 A1 | 8/2015 | Olson et al. |
| 2015/0244735 A1 | 8/2015 | Kumar et al. |
| 2015/0256629 A1 | 9/2015 | Shaheen et al. |
| 2015/0264626 A1 | 9/2015 | Perdomo |
| 2015/0264627 A1 | 9/2015 | Perdomo |
| 2015/0269617 A1 | 9/2015 | Mikurak |
| 2015/0278363 A1 | 10/2015 | Briere et al. |
| 2015/0278491 A1 | 10/2015 | Horning et al. |
| 2015/0287284 A1 | 10/2015 | Kessman et al. |
| 2015/0288712 A1 | 10/2015 | Jones et al. |
| 2015/0295948 A1 | 10/2015 | Hassell et al. |
| 2015/0301515 A1 | 10/2015 | Houmb |
| 2015/0302182 A1 | 10/2015 | Wyatt et al. |
| 2015/0304337 A1 | 10/2015 | Nguyen-Tuong et al. |
| 2015/0310217 A1 | 10/2015 | Artes et al. |
| 2015/0312116 A1 | 10/2015 | Taheri et al. |
| 2015/0347542 A1 | 12/2015 | Sullivan et al. |
| 2015/0358359 A1 | 12/2015 | Ghai et al. |
| 2015/0370799 A1 | 12/2015 | Kushmerick et al. |
| 2015/0370885 A1 | 12/2015 | Kushmerick et al. |
| 2015/0372855 A1 | 12/2015 | Kushmerick et al. |
| 2015/0378354 A1 | 12/2015 | Power et al. |

(56) References Cited

U.S. PATENT DOCUMENTS

| | | |
|---|---|---|
| 2015/0378762 A1 | 12/2015 | Saladi et al. |
| 2015/0379272 A1 | 12/2015 | Liu |
| 2015/0381402 A1 | 12/2015 | Alao et al. |
| 2016/0006735 A1 | 1/2016 | La Fever et al. |
| 2016/0012236 A1 | 1/2016 | Giakouminakis et al. |
| 2016/0020959 A1 | 1/2016 | Rahaman |
| 2016/0034682 A1 | 2/2016 | Fiske |
| 2016/0048709 A1 | 2/2016 | Butler et al. |
| 2016/0048712 A1 | 2/2016 | Butler et al. |
| 2016/0057164 A1 | 2/2016 | Maeng et al. |
| 2016/0063248 A1 | 3/2016 | Spernow et al. |
| 2016/0063249 A1 | 3/2016 | Spernow et al. |
| 2016/0063250 A1 | 3/2016 | Spernow et al. |
| 2016/0063251 A1 | 3/2016 | Spernow et al. |
| 2016/0063252 A1 | 3/2016 | Spernow et al. |
| 2016/0065598 A1 | 3/2016 | Modi et al. |
| 2016/0072835 A1 | 3/2016 | Roytman et al. |
| 2016/0078225 A1 | 3/2016 | Ray et al. |
| 2016/0078377 A1 | 3/2016 | Chapman |
| 2016/0080399 A1 | 3/2016 | Harris et al. |
| 2016/0080417 A1 | 3/2016 | Thomas et al. |
| 2016/0080418 A1 | 3/2016 | Ray et al. |
| 2016/0080419 A1 | 3/2016 | Schiappa et al. |
| 2016/0080420 A1 | 3/2016 | Ray et al. |
| 2016/0092176 A1 | 3/2016 | Straub et al. |
| 2016/0092179 A1 | 3/2016 | Straub |
| 2016/0092180 A1 | 3/2016 | Straub |
| 2016/0092339 A1 | 3/2016 | Straub et al. |
| 2016/0092348 A1 | 3/2016 | Straub et al. |
| 2016/0098564 A1 | 4/2016 | Wysopal et al. |
| 2016/0099963 A1 | 4/2016 | Mahaffey et al. |
| 2016/0103896 A1 | 4/2016 | Briere et al. |
| 2016/0105455 A1 | 4/2016 | Nair et al. |
| 2016/0105530 A1 | 4/2016 | Shribman et al. |
| 2016/0105533 A1 | 4/2016 | Briere et al. |
| 2016/0110434 A1 | 4/2016 | Kakaraddi et al. |
| 2016/0110467 A1 | 4/2016 | Hern |
| 2016/0110545 A1 | 4/2016 | Acar et al. |
| 2016/0113490 A1 | 4/2016 | Gross et al. |
| 2016/0113491 A1 | 4/2016 | Gross et al. |
| 2016/0113492 A1 | 4/2016 | Gross et al. |
| 2016/0113493 A1 | 4/2016 | Gross et al. |
| 2016/0113494 A1 | 4/2016 | Gross et al. |
| 2016/0113496 A1 | 4/2016 | Gross et al. |
| 2016/0113497 A1 | 4/2016 | Gross et al. |
| 2016/0113498 A1 | 4/2016 | Gross et al. |
| 2016/0113499 A1 | 4/2016 | Gross et al. |
| 2016/0113500 A1 | 4/2016 | Gross et al. |
| 2016/0113508 A1 | 4/2016 | Gross et al. |
| 2016/0113509 A1 | 4/2016 | Gross et al. |
| 2016/0113510 A1 | 4/2016 | Gross et al. |
| 2016/0113511 A1 | 4/2016 | Gross et al. |
| 2016/0113512 A1 | 4/2016 | Gross et al. |
| 2016/0113513 A1 | 4/2016 | Gross et al. |
| 2016/0113514 A1 | 4/2016 | Gross et al. |
| 2016/0113515 A1 | 4/2016 | Gross et al. |
| 2016/0113521 A1 | 4/2016 | Gross et al. |
| 2016/0113522 A1 | 4/2016 | Gross et al. |
| 2016/0113523 A1 | 4/2016 | Gross et al. |
| 2016/0113524 A1 | 4/2016 | Gross et al. |
| 2016/0113525 A1 | 4/2016 | Gross et al. |
| 2016/0113590 A1 | 4/2016 | Gross et al. |
| 2016/0116339 A1 | 4/2016 | Crawley et al. |
| 2016/0116340 A1 | 4/2016 | Gross et al. |
| 2016/0116341 A1 | 4/2016 | Gross et al. |
| 2016/0116342 A1 | 4/2016 | Gross et al. |
| 2016/0116349 A1 | 4/2016 | Gross et al. |
| 2016/0116350 A1 | 4/2016 | Gross et al. |
| 2016/0116351 A1 | 4/2016 | Gross et al. |
| 2016/0117462 A1 | 4/2016 | Gross et al. |
| 2016/0117697 A1 | 4/2016 | Briere et al. |
| 2016/0117813 A1 | 4/2016 | Gross et al. |
| 2016/0119373 A1 | 4/2016 | Fausto et al. |
| 2016/0124722 A1 | 5/2016 | Mathew et al. |
| 2016/0125488 A1 | 5/2016 | Saha et al. |
| 2016/0156941 A9 | 6/2016 | Alao et al. |
| 2016/0180080 A1 | 6/2016 | Heldt-Sheller et al. |
| 2016/0180090 A1 | 6/2016 | Dalcher et al. |
| 2016/0188882 A1 | 6/2016 | Mahrous et al. |
| 2016/0189118 A2 | 6/2016 | Cohen |
| 2016/0191465 A1 | 6/2016 | Thomas et al. |
| 2016/0191476 A1 | 6/2016 | Schutz et al. |
| 2016/0205122 A1 | 7/2016 | Bassett |
| 2016/0210427 A1 | 7/2016 | Mynhier et al. |
| 2016/0210602 A1 | 7/2016 | Siddique et al. |
| 2016/0212153 A1 | 7/2016 | Livshits et al. |
| 2016/0218933 A1 | 7/2016 | Porras et al. |
| 2016/0219048 A1 | 7/2016 | Porras et al. |
| 2016/0219078 A1 | 7/2016 | Porras et al. |
| 2016/0224367 A1 | 8/2016 | Raghu et al. |
| 2016/0224951 A1 | 8/2016 | Hoffberg |
| 2016/0232358 A1 | 8/2016 | Grieco et al. |
| 2016/0234065 A1 | 8/2016 | Cohen et al. |
| 2016/0246736 A1 | 8/2016 | Lee et al. |
| 2016/0248631 A1 | 8/2016 | Duchesneau |
| 2016/0248794 A1 | 8/2016 | Cam |
| 2016/0248796 A1 | 8/2016 | Choi et al. |
| 2016/0253590 A1 | 9/2016 | Hershey et al. |
| 2016/0259944 A1 | 9/2016 | Okihara |
| 2016/0261640 A1 | 9/2016 | Modi et al. |
| 2016/0266897 A1 | 9/2016 | Henderson |
| 2016/0269435 A1 | 9/2016 | Hershey et al. |
| 2016/0269475 A1 | 9/2016 | Raghu |
| 2016/0275101 A1 | 9/2016 | Hinterbichler et al. |
| 2016/0277268 A1 | 9/2016 | Brown et al. |
| 2016/0307217 A1 | 10/2016 | Briere et al. |
| 2016/0314327 A1 | 10/2016 | Butler et al. |
| 2016/0314651 A1 | 10/2016 | Kessman et al. |
| 2016/0315779 A1 | 10/2016 | Chan et al. |
| 2016/0321480 A1 | 11/2016 | Hamlin et al. |
| 2016/0337226 A1 | 11/2016 | Padala et al. |
| 2016/0337426 A1 | 11/2016 | Shribman et al. |
| 2016/0337484 A1 | 11/2016 | Tola |
| 2016/0350143 A1 | 12/2016 | Uliel et al. |
| 2016/0352745 A1 | 12/2016 | Ilieva et al. |
| 2016/0359872 A1 | 12/2016 | Yadav et al. |
| 2016/0363921 A1 | 12/2016 | Martindale et al. |
| 2016/0364341 A1 | 12/2016 | Banginwar et al. |
| 2016/0366174 A1 | 12/2016 | Chernin et al. |
| 2016/0371109 A1 | 12/2016 | Palavalli et al. |
| 2016/0373293 A1 | 12/2016 | Kushmerick et al. |
| 2016/0378439 A1 | 12/2016 | Straub et al. |
| 2016/0378519 A1 | 12/2016 | Gaurav et al. |
| 2016/0378530 A1 | 12/2016 | Ramasubramanian et al. |
| 2016/0378994 A1 | 12/2016 | Hibbert et al. |
| 2016/0379237 A1 | 12/2016 | Shapsa et al. |
| 2016/0380862 A1 | 12/2016 | Shapsa et al. |
| 2017/0003991 A1 | 1/2017 | Strandzhev et al. |
| 2017/0005861 A1 | 1/2017 | Strandzhev et al. |
| 2017/0005873 A1 | 1/2017 | Strandzhev et al. |
| 2017/0005878 A1 | 1/2017 | Strandzhev et al. |
| 2017/0012958 A1 | 1/2017 | Brooker et al. |
| 2017/0019402 A1 | 1/2017 | Kulkarni |
| 2017/0026401 A1 | 1/2017 | Polyakov |
| 2017/0034023 A1 | 2/2017 | Nickolov et al. |
| 2017/0034089 A1 | 2/2017 | Ludwig et al. |
| 2017/0034200 A1 | 2/2017 | Costin et al. |
| 2017/0039372 A1 | 2/2017 | Koval et al. |
| 2017/0046134 A1 | 2/2017 | Straub |
| 2017/0046235 A1 | 2/2017 | Straub et al. |
| 2017/0046519 A1 | 2/2017 | Cam |
| 2017/0048215 A1 | 2/2017 | Straub |
| 2017/0048252 A1 | 2/2017 | Straub et al. |
| 2017/0048319 A1 | 2/2017 | Straub |
| 2017/0048339 A1 | 2/2017 | Straub |
| 2017/0048495 A1 | 2/2017 | Scalisi |
| 2017/0053115 A1 | 2/2017 | Healy et al. |
| 2017/0061133 A1 | 3/2017 | Trabelsi |
| 2017/0061174 A1 | 3/2017 | Butler et al. |
| 2017/0078093 A1 | 3/2017 | Schutz et al. |
| 2017/0078322 A1 | 3/2017 | Seiver et al. |
| 2017/0078393 A1 | 3/2017 | Briere et al. |
| 2017/0091465 A9 | 3/2017 | Swoboda |
| 2017/0093669 A1 | 3/2017 | Nortman |

(56) References Cited

U.S. PATENT DOCUMENTS

| | | |
|---|---|---|
| 2017/0093910 A1 | 3/2017 | Gukal et al. |
| 2017/0103215 A1 | 4/2017 | Mahaffey et al. |
| 2017/0109212 A1 | 4/2017 | Gaurav et al. |
| 2017/0126838 A1 | 5/2017 | Saint Clair |
| 2017/0142138 A1 | 5/2017 | Williams et al. |
| 2017/0147681 A1 | 5/2017 | Tankersley et al. |
| 2017/0149786 A1 | 5/2017 | Alon et al. |
| 2017/0149816 A1 | 5/2017 | Kelekar |
| 2017/0161023 A1 | 6/2017 | Khazanchi et al. |
| 2017/0161043 A1 | 6/2017 | Khazanchi et al. |
| 2017/0161044 A1 | 6/2017 | Singh et al. |
| 2017/0161057 A1 | 6/2017 | Khazanchi et al. |
| 2017/0161101 A1 | 6/2017 | Khazanchi et al. |
| 2017/0163492 A1 | 6/2017 | Khazanchi et al. |
| 2017/0163518 A1 | 6/2017 | Dube et al. |
| 2017/0163732 A1 | 6/2017 | Saraf et al. |
| 2017/0168714 A1 | 6/2017 | Saha et al. |
| 2017/0169217 A1 | 6/2017 | Rahaman et al. |
| 2017/0171236 A1 | 6/2017 | Ouchn |
| 2017/0177367 A1 | 6/2017 | DeHon |
| 2017/0177368 A1* | 6/2017 | DeHon ............... G06F 12/1458 |
| 2017/0178193 A1 | 6/2017 | Jagannath et al. |
| 2017/0180411 A1 | 6/2017 | Nair et al. |
| 2017/0193239 A1 | 7/2017 | Chari et al. |
| 2017/0195361 A1 | 7/2017 | Liu |
| 2017/0206381 A1 | 7/2017 | Swoboda |
| 2017/0208084 A1 | 7/2017 | Steelman et al. |
| 2017/0208085 A1 | 7/2017 | Steelman et al. |
| 2017/0208093 A1 | 7/2017 | Williams et al. |
| 2017/0213002 A1 | 7/2017 | Jha et al. |
| 2017/0214708 A1 | 7/2017 | Gukal et al. |
| 2017/0214710 A1 | 7/2017 | Seiver et al. |
| 2017/0214737 A1 | 7/2017 | Agarwal et al. |
| 2017/0214738 A1 | 7/2017 | Agarwal et al. |
| 2017/0220404 A1 | 8/2017 | Polar Seminario |
| 2017/0223052 A1 | 8/2017 | Stutz |
| 2017/0228466 A1 | 8/2017 | Briere et al. |
| 2017/0230179 A1 | 8/2017 | Mannan et al. |
| 2017/0230460 A1 | 8/2017 | Briere et al. |
| 2017/0235966 A1 | 8/2017 | Ray et al. |
| 2017/0235967 A1 | 8/2017 | Ray et al. |
| 2017/0242717 A1 | 8/2017 | Gaurav et al. |
| 2017/0243009 A1 | 8/2017 | Sejpal et al. |
| 2017/0250998 A1 | 8/2017 | Miliefsky et al. |
| 2017/0255890 A1 | 9/2017 | Palavalli et al. |
| 2017/0262655 A1 | 9/2017 | Runkis et al. |
| 2017/0270323 A1 | 9/2017 | Butler et al. |
| 2017/0280109 A1 | 9/2017 | Scalisi |
| 2017/0286690 A1 | 10/2017 | Chari et al. |
| 2017/0289187 A1 | 10/2017 | Noel et al. |
| 2017/0293501 A1 | 10/2017 | Barapatre et al. |
| 2017/0293563 A1 | 10/2017 | DeHon et al. |
| 2017/0295181 A1 | 10/2017 | Parimi et al. |
| 2017/0295197 A1 | 10/2017 | Parimi et al. |
| 2017/0300911 A1 | 10/2017 | Alnajem |
| 2017/0302458 A1 | 10/2017 | Berger et al. |
| 2017/0302635 A1 | 10/2017 | Humphries et al. |
| 2017/0302653 A1 | 10/2017 | Ortner et al. |
| 2017/0302696 A1 | 10/2017 | Schutz et al. |
| 2017/0310556 A1 | 10/2017 | Knowles et al. |
| 2017/0310686 A1 | 10/2017 | Ray et al. |
| 2017/0310692 A1 | 10/2017 | Ackerman et al. |
| 2017/0310693 A1 | 10/2017 | Howard et al. |
| 2017/0310703 A1 | 10/2017 | Ackerman et al. |
| 2017/0310708 A1 | 10/2017 | Schiappa et al. |
| 2017/0316213 A1 | 11/2017 | Mcclintock et al. |
| 2017/0318048 A1 | 11/2017 | Htay |
| 2017/0324763 A1 | 11/2017 | Vasudevan et al. |
| 2017/0324766 A1 | 11/2017 | Gonzalez Granadillo et al. |
| 2017/0329975 A1 | 11/2017 | Artes et al. |
| 2017/0331682 A1 | 11/2017 | Cohen et al. |
| 2017/0346847 A1 | 11/2017 | Borohovski et al. |
| 2017/0353313 A1 | 12/2017 | Goldman |
| 2017/0353482 A1 | 12/2017 | Sommer |
| 2017/0353534 A1 | 12/2017 | Taheri et al. |
| 2017/0357814 A1 | 12/2017 | Mahaffey et al. |
| 2017/0359306 A1 | 12/2017 | Thomas et al. |
| 2017/0359370 A1 | 12/2017 | Humphries et al. |
| 2017/0364844 A1 | 12/2017 | Saraf |
| 2017/0371636 A1 | 12/2017 | Palavalli et al. |
| 2017/0371872 A1 | 12/2017 | Mcbride |
| 2017/0372070 A1 | 12/2017 | Burdett et al. |
| 2017/0372384 A1 | 12/2017 | Yaros et al. |
| 2017/0373937 A1 | 12/2017 | Hovhannisyan et al. |
| 2018/0004503 A1 | 1/2018 | OlmstedThompson |
| 2018/0004937 A1 | 1/2018 | Shannon |
| 2018/0007014 A1 | 1/2018 | Neal |
| 2018/0011708 A1 | 1/2018 | DeHon |
| 2018/0014241 A1 | 1/2018 | Perdomo |
| 2018/0024901 A1 | 1/2018 | Tankersley et al. |
| 2018/0032733 A1 | 2/2018 | Surdu |
| 2018/0032736 A1 | 2/2018 | Inagaki et al. |
| 2018/0034840 A1 | 2/2018 | Marquardt et al. |
| 2018/0040074 A1 | 2/2018 | Raghu et al. |
| 2018/0041539 A1 | 2/2018 | Htay |
| 2018/0041588 A1 | 2/2018 | Straub et al. |
| 2018/0045189 A1 | 2/2018 | Lee et al. |
| 2018/0046823 A1 | 2/2018 | Durham et al. |
| 2018/0048668 A1 | 2/2018 | Gupta et al. |
| 2018/0060106 A1 | 3/2018 | Madtha et al. |
| 2018/0060216 A1 | 3/2018 | Kasi et al. |
| 2018/0060361 A1 | 3/2018 | Beveridge |
| 2018/0060867 A1 | 3/2018 | Hagan et al. |
| 2018/0060894 A1 | 3/2018 | Beveridge et al. |
| 2018/0062928 A1 | 3/2018 | Beveridge et al. |
| 2018/0063017 A1 | 3/2018 | Beveridge |
| 2018/0063026 A1 | 3/2018 | Beveridge et al. |
| 2018/0063171 A1 | 3/2018 | Yamada et al. |
| 2018/0063172 A1 | 3/2018 | Yamada et al. |
| 2018/0063177 A1 | 3/2018 | Yamada et al. |
| 2018/0063235 A1 | 3/2018 | Beveridge et al. |
| 2018/0074029 A1 | 3/2018 | DeVries et al. |
| 2018/0074030 A1 | 3/2018 | DeVries et al. |
| 2018/0075249 A1 | 3/2018 | Ray et al. |
| 2018/0075253 A1 | 3/2018 | Auh |
| 2018/0075262 A1 | 3/2018 | Auh |
| 2018/0077156 A1 | 3/2018 | Ellingson et al. |
| 2018/0077188 A1 | 3/2018 | Mandyam et al. |
| 2018/0077193 A1 | 3/2018 | Roytman et al. |
| 2018/0077195 A1 | 3/2018 | Gathala et al. |
| 2018/0089431 A1 | 3/2018 | Nalluri et al. |
| 2018/0091539 A1 | 3/2018 | Marquardt et al. |
| 2018/0091590 A1 | 3/2018 | Olteanu et al. |
| 2018/0095610 A1 | 4/2018 | Wieder et al. |
| 2018/0095731 A1 | 4/2018 | Brown et al. |
| 2018/0096609 A1 | 4/2018 | de la Cruz et al. |
| 2018/0097687 A1 | 4/2018 | Brown |
| 2018/0103054 A1 | 4/2018 | Cran et al. |
| 2018/0107525 A1 | 4/2018 | Govindaraju et al. |
| 2018/0113817 A1 | 4/2018 | Banginwar et al. |
| 2018/0121420 A1 | 5/2018 | Onusko |
| 2018/0136951 A1 | 5/2018 | Palavalli et al. |
| 2018/0136970 A1 | 5/2018 | Nandagopal et al. |
| 2018/0145828 A1 | 5/2018 | Coon et al. |
| 2018/0152292 A1 | 5/2018 | Coon et al. |
| 2018/0157544 A1 | 6/2018 | Brown et al. |
| 2018/0159953 A1 | 6/2018 | Saint Clair |
| 2018/0165142 A1 | 6/2018 | Harutyunyan et al. |
| 2018/0165173 A1 | 6/2018 | Lin et al. |
| 2018/0165203 A1 | 6/2018 | Boswell et al. |
| 2018/0165693 A1 | 6/2018 | Jain et al. |
| 2018/0204029 A1 | 7/2018 | Butler et al. |
| 2018/0210742 A1 | 7/2018 | Costa |
| 2018/0211034 A1 | 7/2018 | Costa |
| 2018/0211035 A1 | 7/2018 | Costa |
| 2018/0211054 A1 | 7/2018 | Costa |
| 2018/0211067 A1 | 7/2018 | Costa |
| 2018/0212760 A1 | 7/2018 | Costa |
| 2018/0212770 A1 | 7/2018 | Costa |
| 2018/0212939 A1 | 7/2018 | Costa |
| 2018/0212966 A1 | 7/2018 | Costa |
| 2018/0212971 A1 | 7/2018 | Costa |
| 2018/0219970 A1 | 8/2018 | Shribman et al. |
| 2018/0225230 A1 | 8/2018 | Litichever et al. |

(56) References Cited

U.S. PATENT DOCUMENTS

| | | |
|---|---|---|
| 2018/0235468 A1 | 8/2018 | Khachaturian et al. |
| 2018/0235478 A1 | 8/2018 | Khachaturian et al. |
| 2018/0247082 A1 | 8/2018 | Durham et al. |
| 2018/0260251 A1 | 9/2018 | Beveridge et al. |
| 2018/0260564 A1 | 9/2018 | Porteboeuf |
| 2018/0262388 A1 | 9/2018 | Johnson et al. |
| 2018/0276378 A1 | 9/2018 | Ray et al. |
| 2018/0277241 A1 | 9/2018 | Hamlin et al. |
| 2018/0278631 A1 | 9/2018 | Harris et al. |
| 2018/0278649 A1 | 9/2018 | Thomas et al. |
| 2018/0278650 A1 | 9/2018 | Ray et al. |
| 2018/0293389 A1 | 10/2018 | Mahaffey et al. |
| 2018/0303342 A1 | 10/2018 | Khachaturian et al. |
| 2018/0316715 A1 | 11/2018 | Liu et al. |
| 2018/0316761 A1 | 11/2018 | Briere et al. |
| 2018/0317780 A1 | 11/2018 | Khachaturian et al. |
| 2018/0324220 A1 | 11/2018 | Ray et al. |
| 2018/0329738 A1 | 11/2018 | Kasha et al. |
| 2018/0336031 A1 | 11/2018 | DeHon et al. |
| 2018/0336032 A1 | 11/2018 | DeHon et al. |
| 2018/0336033 A1 | 11/2018 | DeHon et al. |
| 2018/0336286 A1 | 11/2018 | Shah |
| 2018/0341490 A1 | 11/2018 | DeHon et al. |
| 2018/0349221 A1 | 12/2018 | Harutyunyan et al. |
| 2018/0349614 A1 | 12/2018 | Ionescu et al. |
| 2018/0351780 A1 | 12/2018 | Atanasov |
| 2018/0351781 A1 | 12/2018 | Movsisyan et al. |
| 2018/0351838 A1 | 12/2018 | Lui |
| 2018/0359250 A1 | 12/2018 | Lerner |
| 2018/0365044 A1 | 12/2018 | Movsisyan et al. |
| 2018/0365298 A1 | 12/2018 | Poghosyan et al. |
| 2018/0365301 A1 | 12/2018 | Poghosyan et al. |
| 2018/0367299 A1 | 12/2018 | Schutz et al. |
| 2018/0367434 A1 | 12/2018 | Kushmerick et al. |
| 2018/0373895 A9 | 12/2018 | Durham et al. |
| 2019/0007521 A1 | 1/2019 | Lipstone et al. |
| 2019/0012150 A1 | 1/2019 | Dimitrov et al. |
| 2019/0012857 A1 | 1/2019 | Noonan |
| 2019/0026206 A1 | 1/2019 | Harutyunyan et al. |
| 2019/0026236 A1 | 1/2019 | Barnes |
| 2019/0026459 A1 | 1/2019 | Harutyunyan et al. |
| 2019/0026464 A1 | 1/2019 | Nalluri et al. |
| 2019/0028438 A1 | 1/2019 | Thomas et al. |
| 2019/0034464 A1 | 1/2019 | Nozhchev et al. |
| 2019/0034664 A1 | 1/2019 | Barnes et al. |
| 2019/0036766 A1 | 1/2019 | Popov |
| 2019/0036901 A1 | 1/2019 | Brooker et al. |
| 2019/0037047 A1 | 1/2019 | Shribman et al. |
| 2019/0042764 A1 | 2/2019 | Durham et al. |
| 2019/0042798 A1 | 2/2019 | Mittal |
| 2019/0042799 A1 | 2/2019 | Durham et al. |
| 2019/0044823 A1 | 2/2019 | Soundararajan et al. |
| 2019/0046056 A1 | 2/2019 | Khachaturian et al. |
| 2019/0046121 A1 | 2/2019 | Khachaturian et al. |
| 2019/0068750 A1 | 2/2019 | Shribman et al. |
| 2019/0072531 A1 | 3/2019 | DeVries et al. |
| 2019/0080078 A1 | 3/2019 | Teal |
| 2019/0080102 A1 | 3/2019 | Teal |
| 2019/0081867 A1 | 3/2019 | Lipstone et al. |
| 2019/0081873 A1 | 3/2019 | Kraft |
| 2019/0081928 A1 | 3/2019 | Teal |
| 2019/0081959 A1 | 3/2019 | Yadav et al. |
| 2019/0081962 A1 | 3/2019 | Teal |
| 2019/0081976 A1 | 3/2019 | Kraft |
| 2019/0081983 A1 | 3/2019 | Teal |
| 2019/0087359 A1 | 3/2019 | Litichever et al. |
| 2019/0089720 A1 | 3/2019 | Aditham et al. |
| 2019/0108342 A1 | 4/2019 | Conikee et al. |
| 2019/0109772 A1 | 4/2019 | Lipstone et al. |
| 2019/0114450 A1 | 4/2019 | Butler et al. |
| 2019/0116242 A1 | 4/2019 | Shribman et al. |
| 2019/0116243 A1 | 4/2019 | Shribman et al. |
| 2019/0116244 A1 | 4/2019 | Shribman et al. |
| 2019/0123904 A1 | 4/2019 | Ackerman et al. |
| 2019/0124042 A1 | 4/2019 | Thomas et al. |
| 2019/0124047 A1 | 4/2019 | Thomas et al. |
| 2019/0124097 A1 | 4/2019 | Thomas et al. |
| 2019/0124098 A1 | 4/2019 | Thomas et al. |
| 2019/0124112 A1 | 4/2019 | Thomas et al. |
| 2019/0132214 A1 | 5/2019 | Porras et al. |
| 2019/0132417 A1 | 5/2019 | Shribman et al. |
| 2019/0138419 A1 | 5/2019 | Poghosyan et al. |
| 2019/0138420 A1 | 5/2019 | Harutyunyan et al. |
| 2019/0149574 A1 | 5/2019 | Thomas et al. |
| 2019/0149580 A1 | 5/2019 | Ray et al. |
| 2019/0154439 A1 | 5/2019 | Binder |
| 2019/0155953 A1 | 5/2019 | Brown et al. |
| 2019/0163355 A1 | 5/2019 | Govindaraju et al. |
| 2019/0163404 A1 | 5/2019 | Pedersen et al. |
| 2019/0163550 A1 | 5/2019 | Harutyunyan et al. |
| 2019/0163616 A1 | 5/2019 | Govindaraju |
| 2019/0166125 A1 | 5/2019 | Bender et al. |
| 2019/0171438 A1 | 6/2019 | Franchitti |
| 2019/0171457 A1 | 6/2019 | DeHon et al. |
| 2019/0171476 A1 | 6/2019 | Lee et al. |
| 2019/0190929 A1 | 6/2019 | Thomas et al. |
| 2019/0190936 A1 | 6/2019 | Thomas et al. |
| 2019/0199824 A1 | 6/2019 | Shribman et al. |
| 2019/0205773 A1 | 7/2019 | Ackerman et al. |
| 2019/0208034 A1 | 7/2019 | Shribman et al. |
| 2019/0208035 A1 | 7/2019 | Shribman et al. |
| 2019/0208036 A1 | 7/2019 | Shribman et al. |
| 2019/0213322 A1 | 7/2019 | Dehon et al. |
| 2019/0220625 A1 | 7/2019 | Durham et al. |
| 2019/0222619 A1 | 7/2019 | Shribman et al. |
| 2019/0222673 A1 | 7/2019 | Shribman et al. |
| 2019/0222674 A1 | 7/2019 | Shribman et al. |
| 2019/0227781 A1 | 7/2019 | Ramasamy et al. |
| 2019/0227793 A1 | 7/2019 | Ramasamy |
| 2019/0227951 A1 | 7/2019 | Durham et al. |
| 2019/0228172 A1 | 7/2019 | Ray et al. |
| 2019/0229983 A1 | 7/2019 | Govindaraju et al. |
| 2019/0230077 A1 | 7/2019 | Lerner |
| 2019/0236825 A1 | 8/2019 | Straub |
| 2019/0238589 A1 | 8/2019 | Stutz |
| 2019/0245894 A1 | 8/2019 | Epple et al. |
| 2019/0251267 A1 | 8/2019 | Wysopal et al. |
| 2019/0253399 A1 | 8/2019 | Humphries et al. |
| 2019/0260799 A1 | 8/2019 | Chen et al. |
| 2019/0268149 A1 | 8/2019 | Kariv et al. |
| 2019/0268150 A1 | 8/2019 | Kariv et al. |
| 2019/0268302 A1 | 8/2019 | McDonald |
| 2019/0268303 A1 | 8/2019 | Schiappa et al. |
| 2019/0268316 A1 | 8/2019 | Kurian |
| 2019/0294592 A1 | 9/2019 | Hinterbichler et al. |
| 2019/0294613 A1 | 9/2019 | Sullivan et al. |
| 2019/0294809 A1 | 9/2019 | Strickland |
| 2019/0296967 A1 | 9/2019 | Yang et al. |
| 2019/0297093 A1 | 9/2019 | Kurian |
| 2019/0303586 A1 | 10/2019 | Mahaffey et al. |
| 2019/0311134 A1 | 10/2019 | Mahaffey et al. |
| 2019/0313907 A1 | 10/2019 | Khachaturian et al. |
| 2019/0317816 A1 | 10/2019 | Chandran et al. |
| 2019/0317817 A1 | 10/2019 | Brown et al. |
| 2019/0317826 A1 | 10/2019 | Jain et al. |
| 2019/0317829 A1 | 10/2019 | Brown et al. |
| 2019/0340048 A1 | 11/2019 | Brown |
| 2019/0340057 A1 | 11/2019 | Brown et al. |
| 2019/0340481 A1 | 11/2019 | Locke et al. |
| 2019/0349449 A1 | 11/2019 | Shribman et al. |
| 2019/0350469 A1 | 11/2019 | Khachaturian et al. |
| 2019/0350470 A1 | 11/2019 | Khachaturian et al. |
| 2019/0372938 A1 | 12/2019 | Pasdar |
| 2019/0373045 A1 | 12/2019 | Raghu |
| 2019/0377570 A1 | 12/2019 | Govindaraju et al. |
| 2019/0384604 A1 | 12/2019 | Dehon et al. |
| 2019/0386957 A1 | 12/2019 | Leon |

OTHER PUBLICATIONS

Jonathan Heiner and Wilmar Sifre, Air Force Research Laboratory Report No. AFRL-RI-RS-TR-2015-210, Security-Tagged Architec-

(56) References Cited

OTHER PUBLICATIONS ture Co-Design (STACD) Final Technical Report (Sep. 2015) (Year: 2015).*

H. Kannan, M. Dalton and C. Kozyrakis, "Decoupling Dynamic Information Flow Tracking with a dedicated coprocessor," 2009 IEEE/IFIP International Conference on Dependable Systems & Networks, 2009, pp. 105-114 (IEEE 2009) (Year: 2009).*

P. Akritidis, C. Cadar, C. Raiciu, M. Costa and M. Castro, "Preventing Memory Error Exploits with WIT," 2008 IEEE Symposium on Security and Privacy, pp. 263-277 (IEEE 2008) (Year: 2008).*

\* cited by examiner

A Protected Domain and its Typical Contents

Protection Domains

RISC-V Rocket Pipeline showing Security Extensions for SP transferring instructions and data, in conjunction with tags accompanying respective instructions and data 101

Tag may optionally comprise a privilege level which restricts access by the logic execution unit under control of instructions having the privilege level to the tags, and/or a second privilege level which permits access by the logic execution unit under control of instructions having the second privilege level to the tags 101A enforcing, by a tag processing unit, specific restrictions with respect to at least execution of instructions, access to resources, and manipulation of data by an instruction execution unit, selectively dependent on the received tags 102

*optional restrictions:* data type rules; memory access rules; context-specific data usage rules; source-dependent data usage rules; data modification rules; source-dependent instruction execution rules; context-dependent instruction execution rules; instruction sequence modification rules; control transfer instruction rules; metadata tag modification rules; restriction on use of data as an address within a memory space; data as a return address for a subroutine call; data as a target address of an indirect branch; data as a pointer; an instruction to control flow to a legal path; an instruction to call a function; an instruction to return from a function call; an instruction to access a protected domain or module; an instruction to perform a legal operation based on the source data type; an instruction to

validating a branch instruction execution and an entry point instruction of each control transfer, selectively dependent on the respective tags, with a control transfer processing unit 103

Fig. 4

DETECTING AND PREVENTING EXPLOITS OF SOFTWARE VULNERABILITY USING INSTRUCTION TAGS

CROSS REFERENCE TO RELATED APPLICATIONS

The present application is a non-provisional of, and claims benefit of priority under, U.S. Provisional Patent Application No. 62/767,908, filed Nov. 15, 2019, the entirety of which is expressly incorporated herein by reference.

FIELD OF THE INVENTION

The present invention relates to the field of secure processors, and more particularly to processors which tag code and data with metadata which controls or restricts access and/or execution privileges.

BACKGROUND OF THE INVENTION

Since 2005, Mitre Corporation has developed a list of common types of software vulnerabilities or weaknesses that lead to security violations in a computing system. See, cwe.mitre.org/index.html, and cve.mitre.org/data/downloads/allitems.html. See also, the National Vulnerability Database (NIST), nvd.nist.gov/.

Security-tagged architectures have been around for over five decades in research projects as well as commercially available processors like the Burrough's families of stack machines [37], the Intel iAPX 432 [30], the IBM System 38 [26] and others [19, 33, 35]. MINOS [12] adds a single bit tag to a data word, in the worst case, to protect the integrity of control flow data. In [42], instruction and data tags are used to track data from suspect inputs to prevent their malicious use as instructions of targets of jumps. Efforts such as LIFT [39], RAKSHA [13] and RIFLE [45] have used tagging to primarily track information flow. More elaborate tagging and metadata tags have been used in a number of other projects [2, 15] to implement a richer variety of security functions, designate proper usage of sensitive data structures and provide programmable security policies [15, 44]. The T-core processor uses two hardware-controlled tag bits per byte in memory to track taints and control flow integrity marks [3].

In all of this existing, the focus has been to use tags largely to enforce data usage and, barring the exception noted below, tags have not been used pervasively to enforce context-specific usage of existing instructions. Existing work have also used function tagging [2] to enforce security policies.

The concept of protection domains as security compartments have been around for a while [7, 10, 11, 17, 22, 33, 34, 48, 50].

The use of secure pointers and bounds register together implement functionality very similar to those realized in some designs with capability-based addressing [33,37]. However, capabilities in their purest form have no concept of a traditional address for the associated object. Instead, a unique object ID is used to refer to an object, which is then translated to a memory address.

The Security Tagged Architecture Co-Design (STACD) initiative discussed in [2] focused on eliminating inherent software vulnerabilities by redesigning the underlying hardware and the operating system to enforce software security policies and semantics. The proposed approach uses a metadata processing unit known as the Tagged Management Unit (TMU) that operates concurrently with the Central Processing Unit (CPU) to process the metadata. The introduction of tag-capable hardware requires software that uses tagged information.

Processors, such as Intel's x86 architecture, provide 2-bit tagging, to provide what is known as the ring architecture, which separates information into three domains; 0—The Kernel Domain, 1 & 2—Middle Domains (largely ignored), 3—User Domain. All kernel code and data must operate in the Kernel Domain (ring 0) while user code and data must remain in User Domain (ring 3). This technique increases the security of the system by providing isolation and separation of information, adhering to the security policy. However, Intel did not take into consideration the systems software. In order to use certain system functions, the user must perform a costly context switch into the Kernel Domain, which forced widespread violations of security policy by the hardware, allowing users to inject a portion of their code into the Kernel Domain.

The ST-ZKOS implements a 32-bit tag that is paired with each 32-bit word in memory. This effectively cuts the amount of memory. There are three primary fields:

1. Owner Field—this field indicates the entity that owns the resource managed by the code module. All code and data on the system have been separated into code modules that perform specific functions based on the concept of least privilege. An example of a code module would be the garbage collector, or a device driver.

2. Code-space Field—this field indicates the code modules that are currently executing and/or the code modules that are authorized to access specific operating system resources.

3. Control-bits Field—this field is used to even further support least privilege by providing some typing and access control information to system resources.

Each component on the bus would be associated with a single owner at any given time. Any master component owned by one entity would not be able to read/write from/to any slave component owned by another entity. Additionally, since the provenance of all components and the intent of their designers cannot be guaranteed, permission from the controller is required for component to accessing the bus (read or write), except for access requests. The bus width was widened to permit the 32-bit tag to accompany the associated code and data.

In order to associate each component on the bus with a specific owner, the components needed a way to identify who their owner is. The owner field of the tagging scheme allows each component to identify an owner. The other fields of the tag are used by the tag management unit to indicate what rules the data/code must follow in the processor and are not relevant for the interconnect.

Software needs a means to set the tag value for each component, thus identifying the owner. To accomplish this, the plug and play information for each component is stored in a record array in the arbiter of the controller. The arbiter needs to be modified such that this array is now memory mapped so that software can address it to assign tags for each component. When a master component, after having been granted sole access to the bus, writes data to a specific address, the arbiter will interpret the address to identify which slave component should receive the data, and will also compare the tag of the master with the tag of the slave from the memory mapped array to determine if they are owned by the same entity. If they are not, then the arbiter reports an error and cancels the transaction. Most memory components are shared among various owners.

Software needs to ensure that one owner does not attempt to overwrite the memory locations of another owner. The arbiter will not perform tag checks on writes to memory, such as Direct Memory Access (DMA) writes. For DMA writes, the arbiter will assign the master's tag to all data from the master on the tag bus to memory. This approach allegedly does not sacrifice security as the new data is tagged appropriately according to the owner of the master. Therefore, it is important that software assign the tag appropriately. The arbiter performs tag checks on reads from memory when the requesting master is not a processor. If the requesting master is not a processor, then the tag of the data is compared to the tag of the requesting master. If the tags do not match, then the arbiter initiates an error response and terminates the transaction.

See, U.S. Pat. Nos. 3,956,615; 5,204,840; 7,171,689; 7,194,769; 7,219,239; 7,254,586; 7,346,922; 7,376,969; 7,451,488; 7,464,407; 7,607,169; 7,650,638; 7,673,345; 7,743,421; 7,752,255; 7,752,459; 7,761,917; 7,761,918; 7,788,722; 7,861,299; 7,926,113; 7,958,549; 7,962,961; 8,028,341; 8,055,732; 8,055,797; 8,056,130; 8,065,725; 8,095,984; 8,127,359; 8,141,155; 8,161,540; 8,176,001; 8,176,527; 8,201,257; 8,209,753; 8,224,930; 8,230,507; 8,234,711; 8,281,036; 8,296,848; 8,306,228; 8,316,448; 8,332,367; 8,365,278; 8,365,289; 8,381,192; 8,392,997; 8,422,379; 8,438,532; 8,438,643; 8,458,798; 8,468,606; 8,474,004; 8,484,741; 8,516,594; 8,522,348; 8,533,843; 8,544,098; 8,566,928; 8,572,550; 8,572,750; 8,595,845; 8,601,104; 8,601,530; 8,602,089; 8,607,336; 8,611,232; 8,612,936; 8,613,083; 8,615,656; 8,627,402; 8,631,248; 8,631,489; 8,640,240; 8,644,516; 8,650,637; 8,730,946; 8,762,188; 8,776,180; 8,789,192; 8,789,193; 8,813,235; 8,819,420; 8,826,438; 8,844,043; 8,844,045; 8,850,588; 8,856,936; 8,869,110; 8,874,685; 8,893,283; 8,903,705; 8,918,884; 8,918,887; 8,925,082; 8,949,169; 8,966,619; 8,966,639; 8,984,579; 8,984,643; 8,990,948; 9,003,537; 9,027,125; 9,032,533; 9,043,753; 9,043,920; 9,047,293; 9,069,930; 9,092,616; 9,094,448; 9,118,706; 9,128,801; 9,141,378; 9,141,805; 9,158,871; 9,160,761; 9,165,133; 9,166,994; 9,178,911; 9,224,117; 9,256,746; 9,268,945; 9,270,695; 9,276,951; 9,292,695; 9,298,923; 9,305,165; 9,306,969; 9,306,975; 9,317,692; 9,317,708; 9,319,425; 9,323,921; 9,325,729; 9,369,482; 9,372,995; 9,389,933; 9,392,007; 9,407,645; 9,411,965; 9,413,538; 9,425,965; 9,456,004; 9,467,464; 9,467,465; 9,473,529; 9,479,535; 9,495,183; 9,503,467; 9,516,058; 9,537,876; 9,537,884; 9,544,326; 9,588,803; 9,602,529; 9,614,864; 9,619,655; 9,628,501; 9,633,213; 9,635,033; 9,648,036; 9,665,721; 9,680,699; 9,680,861; 9,686,291; 9,690,583; 9,692,778; 9,692,779; 9,716,721; 9,722,803; 9,726,460; 9,727,736; 9,729,568; 9,762,617; 9,779,191; 9,792,438; 9,817,978; 9,825,981; 9,825,982; 9,846,780; 9,860,265; 9,866,426; 9,871,815; 9,881,271; 9,886,303; 9,886,581; 9,886,582; 9,887,886; 9,894,088; 9,898,739; 9,900,339; 9,912,683; 9,923,916; 9,923,917; 9,928,369; 9,930,065; 20030167406; 20030182572; 20040003278; 20040143730; 20040172557; 20040218762; 20050005169; 20050010821; 20050138413; 20050187963; 20050229255; 20060069912; 20060225135; 20060259726; 20060259828; 20060265324; 20060265751; 20070061874; 20070061885; 20070067846; 20070067847; 20070067848; 20070162890; 20070169199; 20070177615; 20070192866; 20070192867; 20080005784; 20080060077; 20080068381; 20080071793; 20080071826; 20080071871; 20080071888; 20080071889; 20080071891; 20080071896; 20080071898; 20080072032; 20080072241; 20080072277; 20080072278; 20080089521; 20080092237; 20080127293; 20080127349; 20080172739; 20080222724; 20080256638; 20080270104; 20080271018; 20080271019; 20080271025; 20080282339; 20080313739; 20080314570; 20090007269; 20090028135; 20090077666; 20090099885; 20090100077; 20090103524; 20090106318; 20090113550; 20090204591; 20090254993; 20090281864; 20090293100; 20100042824; 20100050266; 20100095235; 20100095381; 20100154066; 20100192228; 20100275263; 20100306851; 20110030057; 20110047369; 20110060809; 20110093954; 20110125548; 20110138469; 20110138471; 20110141877; 20110191854; 20110231936; 20120185945; 20120203590; 20120204261; 20120222123; 20120232679; 20120246103; 20120260306; 20120272205; 20120284221; 20120304299; 20120304300; 20120311534; 20120311715; 20130055394; 20130074038; 20130074188; 20130086688; 20130125204; 20130167240; 20130179685; 20130182561; 20130191808; 20130191919; 20130198846; 20130227698; 20130247206; 20130268253; 20130297375; 20130298192; 20130298230; 20130298242; 20130298243; 20130298244; 20130326469; 20140007241; 20140032505; 20140047545; 20140059683; 20140068267; 20140075414; 20140082733; 20140137257; 20140165204; 20140172495; 20140173731; 20140173737; 20140181975; 20140181976; 20140189787; 20140189873; 20140196154; 20140201843; 20140215614; 20140215629; 20140218389; 20140237545; 20140245376; 20140283083; 20140317677; 20140337971; 20140337974; 20140366145; 20140373160; 20150033340; 20150040220; 20150040228; 20150058993; 20150067323; 20150067762; 20150088733; 20150106873; 20150172307; 20150213358; 20150222655; 20150235164; 20150237062; 20150237065; 20150241139; 20150242637; 20150244734; 20150244735; 20150288712; 20150295948; 20150301515; 20150304337; 20150310217; 20160006735; 20160012236; 20160020959; 20160034682; 20160057164; 20160063248; 20160063249; 20160063250; 20160063251; 20160063252; 20160065598; 20160072835; 20160078377; 20160105455; 20160119373; 20160180080; 20160188882; 20160205122; 20160212153; 20160232358; 20160234065; 20160248794; 20160248796; 20160253590; 20160259944; 20160261640; 20160269435; 20160337484; 20160366174; 20160378994; 20170026401; 20170034023; 20170034089; 20170034200; 20170046519; 20170053115; 20170061133; 20170078322; 20170091465; 20170093910; 20170142138; 20170149786; 20170149816; 20170169217; 20170171236; 20170177367; 20170177368; 20170180411; 20170193239; 20170206381; 20170208084; 20170208085; 20170208093; 20170213002; 20170214708; 20170214710; 20170243009; 20170250998; 20170262655; 20170286690; 20170289187; 20170293563; 20170295181; 20170295197; 20170300911; 20170316213; 20170318048; 20170324763; 20170324766; 20170329975; 20170331682; 20170346847; 20170353313; 20170353482; 20180011708; 20180032733; 20180032736; 20180034840; 20180041539; 20180048668; 20180060867; 20180063171; 20180063172; 20180063177; 20180077156; 20180077188; 20180077193; 20180077195; 20180091539; 20180096609; and 20180103054, each of which is expressly incorporated herein by reference.

SUMMARY OF THE INVENTION

The present technology provides a microprocessor having specific hardware support for detection of common types of software vulnerabilities or weaknesses that lead to security violations in a computing system.

This technology may be implemented as a hardware improvement that can be incorporated into an existing processor type, called a "Secure Processor" (SP) to detect exploitations of software vulnerabilities in the software, either accidentally or maliciously by compromised programs. The mechanisms employed are largely portable across different instruction sets, and are therefore not limited to any particular type of microprocessor architecture.

The security mechanism adds tags to each instruction and data word, leading to a tagged processor design for the SP. The added tag bits are used to enforce specific usage of instructions and data in the SP. The tags may be uniform in size (8-bits), or variable in size. The SP associates relatively narrow word-tags with every memory word that contains data or an instruction, to detect the exploitation of a number of software vulnerabilities.

The SP improves on existing security-tagged architectures is its pervasive use of these tags, to not only enforce the data type compliance rules of the application, but to also enforce context-specific legal uses of both data and instructions associated with control transfer, secured/bounded pointers, potentially-tainted data from an input device, and in other critical scenarios.

The SP may include additional secure features, such as word-sized, in-line metadata tags that specify access control information, which complement the word tags, which help form a basis of protection domains. Protection domains are hardware-implemented security compartments that encapsulate externally-callable and private functions, private data and can be set up to a security compartment that encompasses a single address space or set up multiple protection domains within a single address space. This permits a single application or a system component (like the OS) to be compartmentalized. The callable functions within a domain are invoked through word-tag enforced legal call gates, and every invocation uses existing control transfer primitives tagged appropriately for context-specific use. Such calls perform an access control check which can further enforce the principle of least privileges and/or other access control policies.

To secure a fenced, contiguous region of data, word tags also ensure that accesses are possible with secured pointers, with automatic bounds checking on each access. The SP's security mechanisms also include CPU-internal per-thread key registers and memory encryption engines, which together with protection domains provide information containment and isolation. In many instances, the SP uses multiple layers of protection to provide a robust solution against the software vulnerabilities.

In SP, the enforcement of proper context-specific use of many existing instructions (that are related to control flow or to accesses performed to a secured memory region with bounds enforcement) is specifically targeted with word tags for instructions to avoid the addition of new instructions that lead to an ISA bloat.

The SP implements two types of protection domains, fully-isolated and lightweight domains relying on instruction tagging to implement secure call gates and using sealed pointers to implement cross-domain calls with access checks on entry. Word tags are also used labels to enforce context-specific usage of exiting instructions for cross-domain calls. The approach taken has some similarity with earlier work on capability extensions for a RISC pipeline [21, 46].

The SP's protection domains can be used within the applications or the systems software components, specifically within the OS, libraries and utilities and are thus more homogeneous compared to Intel's SGX [11] or ISoX [17] that provide safe execution harbor to the applications from a compromised kernel and also from ARM's Trustzone, which effectively provides a safe harbor for only the trusted components in a system.

The SP's use of low-overhead local handlers is similar to RAKSHA's [13], but the SP, for added security, implements the scope of such functions only to the individual functions identified by the compiler.

The SP's fencing mechanism for limiting accesses with bounds checking to a fenced memory region uses a capability-like secure region pointer that specifies the region's address and size and the privilege level with which the region is accessed using instructions at all privilege levels as long as they have the secured pointers. This is similar to Intel's MPX extensions [28] that rely on the use of privileged instructions.

It is therefore an object to provide a secure processor, comprising: a logic execution unit configured to process data based on instructions; a communication interface unit, configured to transfer the instructions and the data, and tags accompanying respective instructions and data; a tag processing unit, configured to enforce specific restrictions with respect to at least execution of instructions, access to resources, and manipulation of data, selectively dependent on the accompanying tags; and a control transfer processing unit, configured to validate a branch instruction execution and an entry point instruction of each control transfer, selectively dependent on the respective accompanying tags.

It is also an object to provide a secure processing method, comprising: transferring instructions and data, in conjunction with tags accompanying respective instructions and data; enforcing, by a tag processing unit, specific restrictions with respect to at least execution of instructions, access to resources, and manipulation of data by an instruction execution unit, selectively dependent on the accompanying tags; and validating a branch instruction execution and an entry point instruction of each control transfer, selectively dependent on the respective accompanying tags, with a control transfer processing unit.

The tag processing unit may be implemented in hardware.

The tag processing unit may be further configured to ensure compliance with data type rules; memory access rules; context-specific data usage rules; source-dependent data usage rules; data modification rules; source-dependent instruction execution rules; context-dependent instruction execution rules; instruction sequence modification rules; control transfer instruction rules; and/or metadata tag modification rules.

The tag processing unit may be configured to enforce a restriction on use of data as an address within a memory space; data as a return address for a subroutine call; data as a target address of an indirect branch; data as a pointer; an instruction to control flow to a legal path; an instruction to call a function; an instruction to return from a function call; an instruction to access a protected domain or module; an instruction to perform a legal operation based on the source data type; and/or an instruction to bound access to a fenced memory region.

The communication interface unit may be configured to concurrently or sequentially transfer a respective instruction or data, and a respective accompanying tag.

The logic execution unit may be a RISC or CISC processor or portion thereof, with word length 8, 16, 32, or 64 bits, for example.

The tags may be 4-bits, 8-bits, or 16-bits for example.

The tag may comprise a privilege level which restricts access by the logic execution unit under control of instructions having the privilege level to the tags. The may tag comprises a second privilege level which permits access by the logic execution unit under control of instructions having the second privilege level to the tags.

At least one tag may indicate tainted instructions or data, wherein the tag processing unit requires validation of the tainted instructions or data prior to use.

The secure processor may further comprise a cryptographic unit, configured to perform cryptographic operations on information communicated through the communication interface unit. The cryptographic unit may employ distinct cryptographic keys selectively dependent on the tags. The cryptographic unit may employ distinct cryptographic keys selectively dependent on a respective thread of instruction execution.

The secure processor may further comprise an address translation unit, configured to map logical memory spaces to physical memory pages. The address translation unit may be further configured to maintain separate memory pages of instructions, data, and tags. The address translation unit may be further configured to retrieve memory pages of tags together with associated memory pages of instructions or data for storage in a common cache. The address translation unit may be further configured to maintain a privilege restriction on memory pages of instructions and tags which restricts reading, writing, and execution, unless accessed by trusted hardware or according to instructions having associated tags which indicate higher privileges. The memory pages of tags may be subject to an integrity check by the secure processor prior to execution of instructions from the memory pages of instructions.

A set of instructions comprising a code segment may be accompanied by a metadata tag, comprising at least one of a security level or a privilege level of the code segment, wherein the tag processing unit may be further configured to compare the security level or the privilege level of the code segment with a security level or a privilege level indicated by the respective tag of a calling instruction of the code segment.

The logic execution unit may have a logic execution pipeline with a first number of stages, and the tag processing unit has a tag processing pipeline with a second number of stages, the first number and the second number being the same, and wherein instruction processing advances through the logic execution pipeline at the same rate as tags advance through the tag processing pipeline processing.

The tag processing pipeline may have a tag processing stage which relies on information provided by at least one stage of the logic execution pipeline.

The logic execution pipeline may selectively process instructions in dependence on signal generated by stages of the tag processing pipeline.

The tag processing unit may comprise a tag processing pipeline, and the logic execution units comprises a logic execution pipeline, the tag processing pipeline and logic execution pipeline having synchronized operation, wherein the tag processing pipeline relies on information received the logic execution pipeline pertaining to the instructions it processes, sent from a stage in the logic execution pipeline to a corresponding stage in the tag processing pipeline, and the tag processing pipeline having at least one stage configured to generate signals that affect the behavior of the logic execution pipeline.

The secure processor may further comprise an instruction cache having cache lines, each cache line comprising memory locations for storing instructions and memory locations for storing tags, wherein the secure processor is configured to retrieve instructions based on instruction addresses, and to retrieve tags for storing in the instruction cache based on an address of a corresponding instruction.

The communication interface unit may be configured to retrieve an instruction based on an instruction address, and to retrieve a tag corresponding to the instruction based on the instruction address.

The secure processor may further comprise a data cache having cache lines, each cache line comprising memory locations for storing data and memory locations for storing tags, wherein the secure processor is configured to retrieve data based on data addresses, and to retrieve tags for storing in the data cache based on an address of corresponding data.

The communication interface unit may be configured to retrieve data based on a data address, and to retrieve a tag corresponding to the data based on the data address.

The communication interface unit may be configured to: retrieve information from a memory according to an address, store the retrieved information in a cache, and to perform a confinement check to determine whether the address is within a predefined memory region, and selectively access a tag in dependence on whether the address is within the predefined memory region.

The predefined memory region may comprise a fenced memory region demarcating by a set of guard memory words defining a starting address of a string of memory locations containing the information to be retrieved.

The fenced memory region may contain information that does not need to be protected and tagged as unmodifiable.

Each tag may have a number of bits of information dependent on a number of bits of information in a corresponding instruction.

BRIEF DESCRIPTION OF THE DRAWINGS

FIG. 4 shows a flowchart of a method according to one embodiment of the invention.

DETAILED DESCRIPTION OF THE PREFERRED EMBODIMENTS

Figure 1:
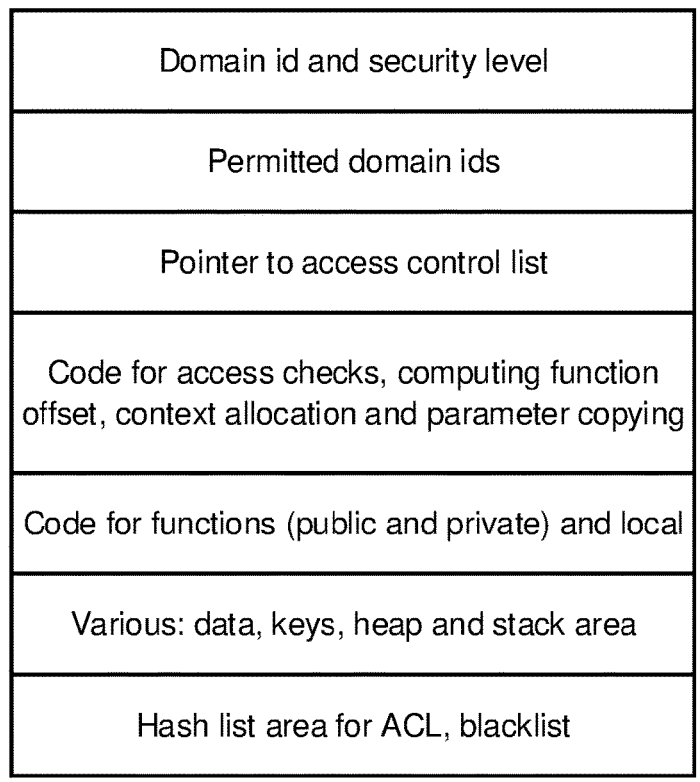
FIG. 1 depicts a protected domain and its typical contents.

In a particular embodiment of the Secure Processor (SP), each of the aforementioned security paradigms is employed. It is noted that these may be employed individually, or in subcombination, or with other solutions to address the same potential vulnerabilities.

In this embodiment, we assume a 32-bit memory word for the following discussions, as in the 32-bit version of RISC-V. Each of the 32-bit memory words has an associated 8-bit tag. Of course, the technology is not limited to 32-bit architectures, 8-bit tags, or RISC-V architectures, and the technology may explicitly include CISC architectures, such as x86, IA-32, IA-64, as well as ARM64, ARMv7s. ARMv7, nVidia GPU, ATI GPU, SPARC, MIPS, etc. Likewise, the technology may encompass 4, 6, 8, 12, 16, 32, and 64-bit architectures, and other less standard word-lengths. The tags may be 2, 4, 8, 12, 16, 24, 32, 48, or 64-bits, for example.

For data words, the tag indicates the data type and allowed access mode. For 32-bit memory words containing instructions, the 8-bit tag indicates how the instruction is to be used and if the instruction has any special significance that was intended by the programmer. The tags are interpreted during execution by tag processing units provided within the instruction decoder and/or processing units. The tag processing units (as well as optional tag storage, transfer, security, etc. hardware) distinguish the SP from the parent processor architecture. Note, however, that is may be possible in some architectures to implement the SP system without hardware modification, though microcode enhancements. However, in order to achieve minimal impact on processor throughput, and freedom from reliance on trusted software, hardware support and acceleration is preferred.

The tags can get updated as the result of executing an instruction. Preferably, programs, i.e., sequences of tagged instructions, have no ability to overwrite the tags directly—tag usage and tag updates are intrinsic to the instruction semantics. Tags on critical data and instructions can also be marked as immutable and unreadable to prevent the misuse of instruction and data. Tags are preferably only manipulable under software control by a single trusted module.

The SP separates instruction and data pages for security and to simplify addressing. Tags are stored in pages separate from the data, and code pages and the tag pages are marked as non-readable, non-writeable and non-executable. Only trusted tag manipulation logic and the SP hardware can access/update these pages. As in any normal processor, page protection bits are associated with each page (and stored within TLB entries) that indicate the permitted access modes (read, write, execute). The SP relies upon a trusted compiler, linker and loader, which take care of tag generation, tag loading and linking modules. An integrity check is performed immediately after booting to ensure that tag pages were not altered during forced disruptions in the booting phase.

Tags in SP are encoded and interpreted in context, depending on whether the page is an instruction page or data page. Tables 1 and 2 describe the possible tag values for data and instruction words. Data tags indicate the type of data in the associated word and/or, in some cases, how the data is to be legally used (e.g., as a return address or as the target of an indirect branch or as a pointer). Instruction tags are used to enforce control flow to legal paths, to enforce legal ways to call and return from functions and protected domains or modules and enforce legal data operations based on the source data type as well as bounded accesses to fenced memory regions. Note that, in effect, the instruction tags extend the ISA by designating specific context-dependent variant of some existing instructions. This, in effect, permits the extensions to be retrofitted into an existing datapath relatively easily. Additional combinations of the word tags shown in Tables 1 and 2 are also possible.

The storage overhead of tags, with 32-bit data words and 32-bit instructions (as in a RISC-V variant) is thus 25%. For the 64-bit RISC-V implementations, the storage overhead for tags is 12.5%.

TABLE 1

Examples of Data Word Tag Values, Their Meaning and Usage.

| Data Word Tag Value | Meaning/Use |
| --- | --- |
| [INV] | Invalid, uninitialized |
| [PW] | Writeable by writer with appropriate privilege |
| [PRW] | Readable and writeable by writers with the appropriate privilege. |
| [REA] | Return address, cannot be overwritten. Call instruction sets this tag, cleared to INV on return |
| [MCM], [MCI] | Mapped control register, writeable (MCM) or immutable - this is, not writeable (MCI) |
| [JTI] | Jump table entry and immutable (=non-writeable) |
| [SP0], [SP1] | Secured pointer types used for accessing a fenced region in permitted modes with automatic bounds checking (Technique 4). Between two adjacent memory words tagged as [SP0] and [SP1], specify the base address and size of a fenced memory region and the permitted access mode. Both types of pointers are marked as immutable and usable only by specially-tagged memory instructions. |
| [DPR], [DPU] | Protected domain function pointers. These come in two flavors - resolved (DPR) and unresolved (DPU). These are used to transfer control to protection domains (Technique 5). Both types of pointers are marked as immutable and non-copyable at compile time. |
| Data type tags | Several types, with other variations (immutable, readable/writeable etc.) - unsigned, integers, floats, doubles etc. Used for type enforcements based on permitted language semantics. |
| [TAI] | Potentially tainted data. Data coming in from external sources (such as via the network) or DMA are tagged like this unless certified by a trusted program to be of specific type. |
| [TBS] | Words in potentially tainted byte string passed as argument, for example, as network packet payload, Technique 7. |
| Reserved | Reserved for use by system |

TABLE 2

Examples of Instruction Word Tag Values, Their Meaning and Usage.

| Instruction Word Tag Value | Meaning/Use |
|---|---|
| [INV] | Invalid, uninitialized |
| [IMI] | Immutable instruction (not modifiable). For safety, unless intended otherwise by the system, all generated instructions are immutable and data cannot be executed as instruction. |
| [TRT], [TCA] | Target of a return from a function call, immutable (TRT) and target of a function call (TCA) - Technique 4. |
| [TIN] | Target of an indirect branch |
| [RFN] | Instruction implementing a return from a function call (which could be an ordinary JUMP instruction instead of a return instruction). |
| [EPD], [EXD] | Instruction at legal entry point of a module/protection domain (EPD) and exit point (EXD). Modules or domains can have multiple entry and exit points. |
| [DIN] | Instruction within a protection domain, immutable by default |
| [LBR] | LOAD instruction capable of loading a bounds register with pointers tagged as [SP0], [SP1], Technique 4 |
| [FMA] | Memory instructions (LOADs or STOREs) capable of accessing a fenced memory region with bounds register and automatic bounds checking, Technique 4. |
| [ENC] | Used for STOREs - result has to be encrypted before the memory update. A series of these stores deposit data into an internal encryption buffer before encryption and writing to memory by the memory encryption/decryption logic. |
| [CDT] | Cross-domain JUMP (unconditional) or system call (using unresolved pointer, Technique 5) |
| [EMD] | In-lined metadata embedded within code containing information for access checking at entry point to a protected domain, enabling local exception handler of specific type, labeling source of indirect jump at target. These are immutable by default. Note that words tagged as [EMD] are not instructions, but they appear within code, so their tag is interpreted in the context of a code page. |
| Reserved | Reserved for use by system |

Metadata Tags

Metadata tags (MDTs) in SP are in line with the code as a 32-bit tagged entity, and such tags carry information used for access control, control flow integrity markers for indirect branches, information about local validated exception handlers that can be quickly invoked within a function. When a single MDT is not enough to convey the information needed, a sequence of metadata tags with appropriate indicators for the contents and flags to indicate the start and end of the sequence can be used. MDTs are generated by the compiler and are marked as immutable by all software, excepting the trusted software module that updates tags. MDTs can be implemented as 32-bit words tagged [EMD] that are embedded within the code. The 32-bit metadata word contains other indicators that specify its remaining contents. Embedding metadata within code makes it possible to exploit the temporal and spatial locality in accessing instructions.

The MDT containing access information within a code segment can include the security or privilege level of the code segment and can be compared against the caller's privilege level to implement class-based access control (e.g., MLS). Alternatively, or in addition, MDTs used for access control can include pointers to access control lists (whitelist and/or blacklist), permitted access mode to data private to the called segment. MDT s are also used for specifying local exception handlers, invoked essentially as a function call. Note that from the standpoint of the baseline processor, the MDTs are effectively NOPs (No-operation instructions) and are interpreted only by the tag processing logic.

Fenced Protected Regions with Automatic Bounds Checking

The SP permits memory regions to be fenced with automatic bounds checking. Virtual pages containing these regions are marked as not-readable, not-writeable, so that normal memory instructions are incapable of accessing such protected regions. Only memory instructions (such as LOADs and STOREs in a RISC ISA), specifically tagged by the compiler can access these fenced regions using a specified bounds register which demarcates the memory region. Memory accesses using such tagged instructions automatically force a SP hardware check of the effective memory address to ensure that the memory accessed falls within the region specified in the bounds register. Each bounds register has the following fields:
  (a) a start address S indicating the starting address of the fenced region in virtual memory;
  (b) an offset limit L that indicates the size of the data structure. The highest accessible address in this region is S+L−1; and
  (c) the access mode in which this data structure can be accessed—one of: read-only, write-only, read and write.

Four such bounds registers are provided in SP, BR0 through BR3.

The information to be loaded into each bounds register is stored in two adjacent memory words tagged as "Secure Pointer 0" and "Secure Pointer 1". The first of these two words contains the starting address of a secured data region containing sensitive data while the second word contains the segment register id of the segment containing the data, the offset limit and the access mode. The tags and contents of these words are generated at compile time and both words are immutable and unreadable by normal software. The compiler uses bounded pointers and specifically-tagged instructions, tagged [FMA] to perform secure accesses in the least privileged mode to a fenced contiguous memory region, going through an automatic bounds checking in hardware. Another special instruction tag ([LBR]) is used with a LOAD to permit secure pointers to be loaded into the specified bounds register.

Specifically, [LBR] LOAD <BRid><reg><offset>, tagged to indicate that this is a LOAD capable of loading a bounds register with secure pointers (tagged as [SP0] and [SP1]) is used to load the bounds register specified in <Brid> with the bounds of a fenced memory region. The effective memory address targeted by this LOAD is computed by adding the contents of an existing architected register specified in <reg> to the literal value specified in offset. The address so computed should point to a memory word tagged as "SP0". The contents of this memory location, if the tag check passes, are loaded into the appropriate field of the specified bounds register. Next, the effective word address is incremented and should point to a memory word tagged as "SP1". If the tag check passes, the contents are loaded into the respective fields within the specified bounds register. If either or both tag checks fail, an exception is generated. An alternative mechanism for loading, respectively, the two secure pointers ("Secure Pointer 0" and "Secure Pointer 1") into a bounds register can use two separate LOAD instructions to load these pointers into a bounds register as follows:

[LBR0] LOAD <BRid><reg><offset1>
[LBR1] LOAD <BRid><reg><offset2>

Where the value of <offset2> is obtained by adding the value specified in <offset1> with the size of "Secure Pointer 1". Note also that two separate tags are used for the two LOAD instructions, LBR0 and LBR1. The hardware implementing the LOAD tagged with LBR0 checks, in addition to all other checks as described above, if the pointer type being loaded matches the tag associated with Secure Pointer 0. A similar tag check is done for the LOAD tagged with LBR1 to check compatibility with "Secure pointer 1". The two secure pointers can have distinct associated tag values to enable this check.

To access a fenced memory region, LOAD and STORE instructions, tagged as [FMA] can access a fenced memory region. Specifically, [FMA] LOAD <reg>, <Brid><offset> performs a load into the architectural register specified in <reg> by adding the contents of the "base" field of the bounds register specified in <BRid> and the offset. Note that in a normal LOAD instruction, the field used by <BRid> specifies an architectural register, whereas for a [FMA] LOAD, the same field specifies a bounds register. Before the memory access is actually performed, the following three checks are performed to ensure that:

(a) the resulting word address is confined within the memory region specified in the bounds register;
(b) if a read access is permitted as specified in the bounds register; and
(c) the targeted memory word is tagged as readable.

An exception is generated if any of these conditions are not valid. The instruction [FMA] STORE <reg>, <BRid><offset> is the variant of a normal STORE and is used to write to a fenced memory region after checks similar to that of a [FMA] LOAD.

Protected Domains for Isolating Sensitive Data or Resources

Protected domains in SP encapsulate functions and sensitive data, including private data, and safeguard against unintended information leakage. Some of these functions within a protected domain are callable from external entities, including other protected domains, provided they have the appropriate privileges. These calls are cross-domain and take place through secure entry points, passing parameters through special registers. Cross-domain calls in SP use accesses to parameters passed to the called function and data inside the domain accessed by the function called in the least necessary access mode, as determined by the SP compiler or by using default policies. To complete the controlled, validated cross-domain call mechanisms, a separate call stack is used inside the protected domain as the called function executes. When the cross-domain call returns, this stack is cleared automatically to prevent any information leakage to the subsequent cross-domain calls.

The implementation of protected domains in SP relies on the tagging mechanism. A single segment encapsulates the code for a protected domain. Domain-local data and the local stack can also be implemented within this segment. Alternatively, these structures can be implemented as fenced regions with bounded pointers, with the secure pointers stored inside the domain's code segment. The cross domain call transfers control to the callee using a protected, unresolved pointer. Data private or exclusive to the called domain are protected using fenced, bounds checking. Input parameters may be similarly protected. Legal entry points are tagged as such and all other instructions in the domain are marked as non-enterable to prevent illicit calls. In-line metadata tags are used to verify the caller's privileges on entry through these legal entry points as described below. FIG. 1 depicts the essential ingredients of a protected domain.

Fully Isolated Protected Domains

The broad mechanism described above implements a fully-isolated domain. A fully-isolated domain provides full-fledged isolation guarantees and protection, and is implemented as a segment not known and not directly accessible to the caller. Cross-domain calls use a modified system call (or a new instruction, depending on the ISA targeted), specifying an appropriately tagged domain ID and a function offset in a sealed cross-domain pointer that essentially behaves as a capability, both specified in a single word tagged as "unresolved" domain function pointer. The domain ID is translated to a segment address by an underlying trusted system call handler.

Control transfer to an isolated domain, after appropriate tag validation of the tagged and modified system calls and unresolved pointer takes place as follows.

First, the call parameters are saved in special registers and the trusted system call handler translates the domain ID to an internal address.

Next, control is transferred to the specified entry point, where access checks are performed. Subsequently, a new context (that is, call stack) is allocated to serve the call. Such context stacks can be statically or dynamically allocated [20,46] and on exit, the context pages are cleared by marking the associated tags as invalid. This clearing is necessary to prevent information in the call stack from leaking to the next caller indirectly.

To complete the protected call, after validating the legitimacy of the caller from the access control information, the input parameters are copied from the parameter register into the newly-allocated context stack and the incoming parameter registers are cleared.

The above steps indicate that the overhead of a call to a fully-isolated protection domain is relatively expensive compared to a normal function call, as domain ID translation, context allocation are needed on an entry and context clearing is needed on an exit. Parameters in a cross-domain call to a fully isolated domain are passed through special registers as scalars or as pointers to pointer secured bounded segments, whose pointers are kept in the special parameter register set. The qualifier "fully-isolated" alludes to the higher level of isolation achieved between the caller and the callee using unresolved domain pointers, separate call stacks and automatic stack clearing on exits.

From an implementation perspective, cross-domain calls to fully-isolated domains can benefit from a number of optimizations that will be explored in this effort. Examples of these optimizations include the in-lining of domain IDs of frequent callers or storing them in a local hashed data structure, use of the encryption engine within the memory controller to keep private data encrypted in memory, and decrypt them when they are fetched into the registers, or encrypt register data when they are stored into memory. Finally, the access control functions using the information in metadata can be implemented in microcode or in software, that can use an approach similar to the one for fast local exception handling described later.

Lightweight Protected Domains

Somewhat moderate isolation can be implemented as a lightweight cross domain call where the protected domain is a segment co-mapped to the address space of the application that uses functions within the domain. A call to a function in a co-mapped domain is implemented by a JUMP instruction tagged by the compiler as a cross-domain transfer primitive. These JUMP instructions are immutable. The offset used in the JUMP is set by the compiler to the offset of a legal entry point. The address to be used is also tagged as a "resolved" domain pointer which can be only used by JUMPs tagged as a cross domain transfer instruction. The resolved domain pointers cannot be overwritten or copied, like words tagged as return addresses. They are only usable without restriction by trusted code within the system. An exception is generated if the target of the JUMP used for cross-domain call does not target a legal entry point, which has to have an instruction tagged as an entry point. Instructions within a protection domain that are not at legal entry points are tagged as "domain-sealed". With co-mapped domains, a traditional activation stack (that is, call stack) can be used, making calls to functions within a co-mapped domain have an overhead identical to a normal function call.

Protected Domains

Figure 2:
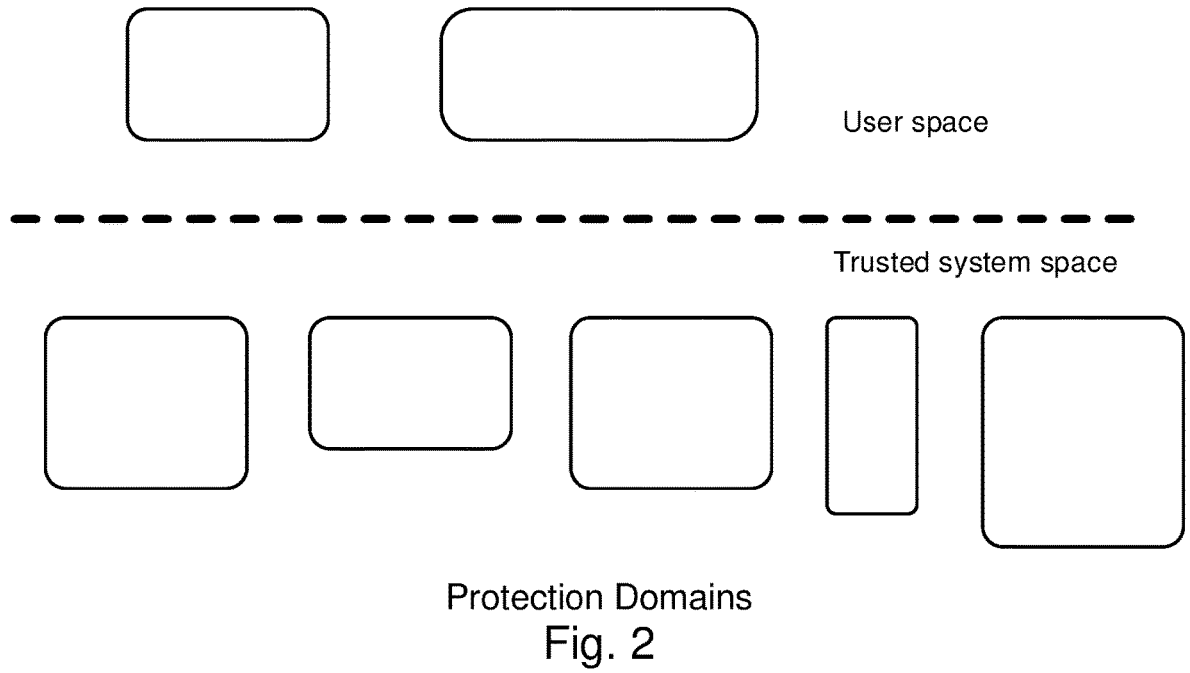
FIG. 2 depicts protection domains.

Critical systems functions and critical databases are examples of entities that demand the use of a fully-isolated domain for protection. FIG. 2 depicts a setup where multiple domains exist within the user and system space.

Protection domains represent a way of implementing security compartments that contain executable code. Access to the code within a compartment is enabled through pre-defined entry points and only if the caller has the right access privileges. From the usage perspective, the choice between a lightweight domain and a fully-isolated domain is determined largely by the level of isolation needed.

The SP permits one or more protection domains to be set up within the user space or within the systems space as shown in FIG. 2. Domains in SP are functionally identical whether they are in the user space or system space. A single application may be written to incorporate multiple protection domains in the user space. Similarly, the OS itself can be decomposed into multiple domains.

A simple decomposition breaks down the system into domains corresponding to core kernel functions, other kernel function, trusted tag manipulation module, system calls, Virtual Machine Monitor (VMM), individual libraries, individual utilities such as trusted linkers, trusted loaders, trusted compilers, etc. The hardware support is required to implement and enforce the address limits of the domain, confining address calculations performed with a segment base register in the virtual address to addresses within the domain.

Fast Local Exception Handling

In some cases, security checks can be quite elaborate and need to be performed in software. Such checks can be done using a function local to a protection domain that can be invoked with low overhead on a tag-generated exception. The existence of a local trap is indicated by inserting a metadata tag, preceding the code that uses the data, to indicate that a local handler exists for specific exception types. The in-lined metadata words at the beginning of this function where the exception is generated, passes on the address of the handling function and the type of exception it handles, to the underlying SP control logic. When the function generating the exception returns, the local exception function is disabled by another metadata tag (tagged [EMD]) inserted by the compiler to precede the return instruction, reverting exception handling responsibilities to the system-provided handler.

RAKSHA [13] also provides local handlers, but in the SP according to the present technology, their scope is additionally limited only to the function where they are specified for added security. Local exception handling for security checks can be used for dealing with SQL injection.

Keeping Track of Lowest Privileges in a Protected Call Chain

A call to a protected domain performs the necessary access checks, but it may be useful in some situations to keep track of the lowest privileged domain in the call chain. This information is passed on to the callee through an extension of the cross-domain parameter transfer register and saved in the context stack allocated for the call. With a dynamic, privilege-based security policy, where policies need to be changed on-the-fly, the privilege level of the protected domain with the lowest privilege in the call chain can be used in software to identify and deal with any unintended violation.

More generally, the tag in each case may be arbitrarily extensible through reference to an optional additional tag, register, stack entry, or memory location. Thus, the tag may be limited to 8 bits, but include "extensions" as required.

Crypto Engine and Per-Thread Key Registers

To permit fast encryption and decryption in the memory access path for data going out to memory or fetched from encrypted memory regions, the SP may incorporate a memory encryption and decryption engine within the memory controller. Memory access instructions (such as LOADs and STOREs) tagged as [ENC] may invoke memory encryption or decryption when a line is fetched from memory or written to memory.

This cryptographic processing capability may be used for other features, and thus need not be dedicated to the SP functionality only, though preferably the cryptographic key(s) used for SP is distinct from key(s) used for other purposes. Likewise, key management for the SP functionality key(s) is restricted to hardware and/or specially privileged software.

For example, memory writes to cache lines that need to be encrypted before being written to memory are marked within the cache using a bit flag and encryption takes place when such lines are evicted from the cache. This flag accompanies the line to the memory write buffer and is examined by the memory controller to decide if the line needs to be encrypted prior to the write.

The SP also incorporates a per-thread key register that is used to hold the key for the encryption. The key registers are loaded by a trusted kernel module when the thread is scheduled.

The present approach provides cryptographic protection in two areas: software requested cryptographic operations and cryptography embedded in the hardware to support the SP architecture tag and data security. A cryptographic block is provided for software use. The software cryptographic engine block enforces protocol compliance to eliminate common misuse of cryptographic operations. Cryptographic keys are isolated from software access and provide the capability to generate unique power-on keys to protect data at rest.

The embedded cryptographic processing utilizes high speed encryption/decryption engines and hash capabilities for protecting the various tags and vulnerable memory areas defined in the SP architecture from modification and inadvertent data exposure. In addition, the solution provides flexibility for future enhancements by enabling integration of commercial Physically Unclonable Functions (PUFs) to provide unique per part protection, verification and authentication of data. This combination of enhancements is utilized to eliminate attacks on the cryptographic operations.

Memory Mapped IO Devices and Taint Tagging

The SP maps all IO device registers to the memory space and protects accesses to them using special tags [MCM, MCI]. For added protection, these can be private to drivers that are implemented as a protected domain.

The SP also implements taint propagation. Any 10 device that can import potentially suspect data performs the DMAs into area word-tagged as [INV], or invalid. Any use of such data triggers exceptions that validates the data type in software, and once validated, copies it into the appropriate memory locations with proper tags. Byte sequences coming in from potentially compromised sources, such as a network interface, will be stored as a sequence of words tagged with [TBS] or, as a potentially tainted byte string components, with null byte pads to round up to a word size. Any operation using an input tagged as [INV] or [TBS] propagates the same tag to the result (both value and flags such as carry, zero, etc.). Overflows, underflows and results produced using inappropriate types of input operands will also taint the result produced by tagging it as [INV].

Specific SP Example

Figure 3:
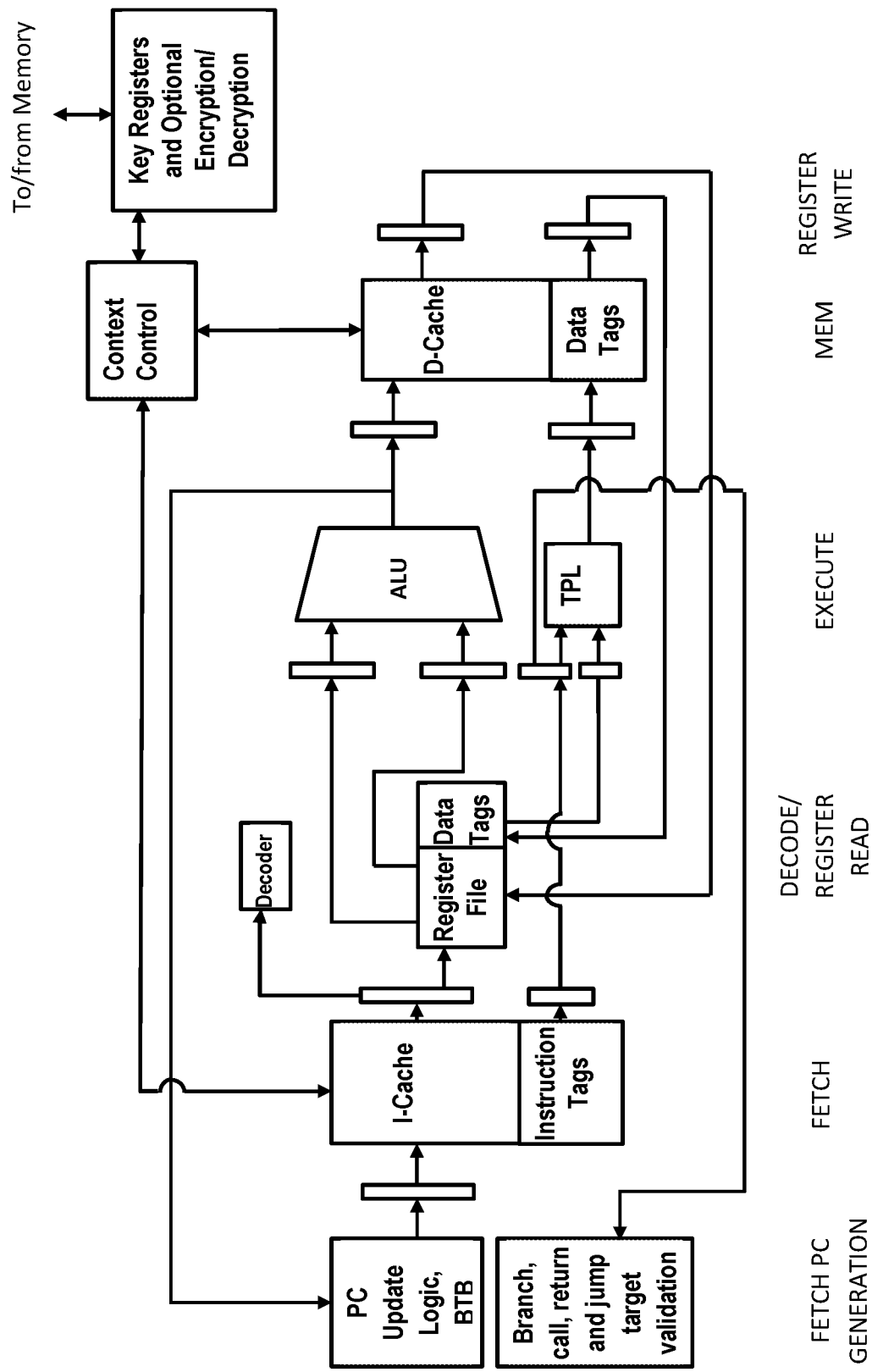
FIG. 3 shows a block diagram of a RISC-V rocket pipeline with security extensions for realizing the SP in Gray.

FIG. 3 shows an embodiment of a simple pipelined processor (the RISC-V Rocket implementation) with hardware extensions for realizing the SP pipeline design, including the branch, call, return and jump target validation, instruction tags, data tags, TPL, context control, key registers and optional encryption/decryption, as well as the latches associated with them (unlabeled boxes) in between adjacent pipeline stages Extended registers may also include bounds registers, parameter registers for cross-domain calls and the local handler address register. TPL is the tag processing logic for operations. The cryptographic engine can encrypt/decrypt data or pass data through without encryption/decryption. The tag storage and the tag processing components and latches can be implemented in a separate parallel pipeline.

Tags and data or code are all stored in their respective pages. Accesses to a data or instruction word requires the corresponding tag to be fetched, thus doubling the number of memory accesses needed. The performance penalty that results is mitigated by using extensions (Itag$ and Dtag$) to the instruction (I$) and data cache (D$) to hold the tags corresponding to a cache line, noting that accesses to tags exhibit the same localities seen in the course of accessing instructions and data. The impact of using tag caching was simulated on the Simplescalar simulator for an Alphas ISA (which is representative) with 32 Kbyte instruction and data caches, extended to hold tags and with a 256K unified L2 cache holding data, instruction and tag lines. Across the benchmarks in the SPEC benchmark suite, the extra memory accesses needed for word tags impose a performance penalty of less than 2% to a maximum of 19%, with an average penalty of about 10.5%. This can be reduced with other optimizations such as word tag prefetching and page-level tag consolidation into the TLB entries of pages with immutable and homogeneous contents. The additional energy overhead of word tag accesses can be reduced by using line buffering [21], which keeps recently-accessed cache rows in a few buffers external to the cache tag and data arrays, preventing unnecessary discharges of the pre-charged bit lines in the cache tag and data arrays on a hit in the line buffers in a direct silicon implementation or avoiding a read of the RAM-implemented data ways in a FPGA implementation, saving energy. This technique imposes no penalty on the cache access time and can also be used on the normal caches to stay within a reasonable power budget.

FIG. 4 shows a flowchart of a method of operating the secure processor in accordance with an embodiment of the invention.

Instructions and data are transferred, in conjunction with tags accompanying respective instructions and data 101. Tag may optionally comprise a privilege level which restricts access by the logic execution unit under control of instructions having the privilege level to the tags, and/or a second privilege level which permits access by the logic execution unit under control of instructions having the second privilege level to the tags 101A.

A tag processing unit enforces specific restrictions with respect to at least execution of instructions, access to resources, and manipulation of data by an instruction execution unit, selectively dependent on the received tags 102. The tag processing unit may ensure compliance with data type rules; memory access rules; context-specific data usage rules; source-dependent data usage rules; data modification rules; source-dependent instruction execution rules; context-dependent instruction execution rules; instruction sequence modification rules; control transfer instruction rules; and/or metadata tag modification rules. The tag processing unit may enforce a restriction on use of data as an address within a memory space; data as a return address for a subroutine call; data as a target address of an indirect branch; data as a pointer; an instruction to control flow to a legal path; an instruction to call a function; an instruction to return from a function call; an instruction to access a protected domain or module; an instruction to perform a legal operation based on the source data type; and/or an instruction to bound access to a fenced memory region 102A.

A branch instruction execution and an entry point instruction of each control transfer are validated, selectively dependent on the respective tags, with a control transfer processing unit 103.

Security Provided by SP

The SP relies fundamentally on the integrity of the word-tagging mechanism and in-line metatags (which are also word-tagged). This is realized by making tags inaccessible to software. The only exception to this is a high-privilege trusted software module that can manipulate the tags. SP also assumes that the compiler, linker and loader are trusted, as the compiler is responsible for the tag generation and the linker and loader are responsible for loading the word tags in a secure memory area inaccessible to all but the trusted software module that can manipulate tags. The hardware, of course, is also assumed to be secure as it interprets the tags. Attacks during booting or tag loading by induced interrupts that can potentially corrupt the tags are addressed by validating the hash signature of the tag pages prior to execution.

Instruction tagging in the SP, to enforce their context-dependent legal use, a distinctive feature of the SP, provides the basis for enforcing control flow for functions calls and returns and for directing indirect jumps to legal targets. The SP also disallows data to be interpreted as instruction—this is the basis for preventing several attacks. At the same time, to permit legal code modifications in interpreters and during the boot loading of some OS s, the functions performing such modifications are vetted out and validated at run-time using tags.

Data areas secured with bounds checking and accessed in the least-necessary access modes use secure pointers and specially-tagged memory instructions, making it impossible for normal memory instructions to access such fenced areas, which are implemented in pages marked as non-readable and non-writeable (and non-executable).

Protection Domains (PDs) in the SP for encapsulating data, associated private and public functions, are invoked only through compiler-directed control instructions (tagged as such) and invoke domain functions through legal entry points by ensuring that the control transfer to such domains from the caller take place at instructions tagged as entry points. PDs are entered only after validating the eligibility of the caller at the entry point using in-line metadata tags that point to access control information or has embedded access control information. This guarantees that only legitimate callers can invoke the PD's public functions. PDs allocate a call-specific context (call stack) on each call and can also use optional encryption for any private data in the RAM, facilitated by a master key maintained in the per-thread key register and memory encryption/de-encryption engine. All of these features permit PDs to implement security compartments and guard against unintended data leakage.

Examples of Security Provided by SP Against Software Vulnerabilities

The protection provided by the SP may be provided against instances of weaknesses from various CWE (Common Weakness Enumeration) classes as listed by Mitre Corporation.

The following table lists how exemplary instances of the seven classes of CWEs are handled in SP. Tags are shown, where used in square brackets. Additionally, the SP compiler avoids vulnerabilities by using proper libraries, vetted functions and trusted system functions.

TABLE 3

Common Weakness Evaluation

| CWE Class | Examples | SP Mechanism Addressing CWE |
|---|---|---|
| Buffer errors | Stack attacks including ROP CWE119: improper restriction of operation within memory area CWE120: buffer copying without checking buffer size | Instruction and return address tagging Bounds registers implementing fenced memory area |
| Permissions, privileges, access control | CWE-250: execution with unnecessary privilege CWE-306: missing authentication of critical functions | Access-controlled protection domains, access to data in least-necessary mode |
| Resource management | CWE-732: incorrect permission for critical resources | PD encapsulating resource + memory encryption, memory-mapped, tagged device control registers in fenced area + BR |
| | CWE-22: Improper Limitation of a Pathname to a Restricted Directory, CWE-494: Download of Code Without Integrity Check | Word tagging to taint input arguments and software handlers on using tainted arguments |
| Code injection | JOP | Tagging of jumps, jump table entries, targets + CFI markers in in-lined MD |
| | Executing data as instructions | Data word tags disabling execution + separate data and instruction pages |
| | CWE-89: SQL injection, CWE-79: cross-domain scripting | Word tagging to taint input arguments [TBS] and software handlers on using tainted argument words of byte sequence |
| Information leakage | Information exposure through error message (CWE-209), debug (CWE-215), caching (CWE-524), log files (CWE-532) | Access controlled PDs, tag marking data as sensitive, memory encryption |
| Crypto error | CWE-306: missing authentication of critical functions | Access controlled PDs, encryption-needed tag [ENC] |
| | CWE-327: use of broken crypto | Force use of hardware crypto engine, master key in per-tread key register |
| Numeric errors | Operations on incompatible operands | Data type enforcement through tagging, tagging result produced as [TAI] |
| | CWE-682: Incorrect Calculation | Tagging result produced with overflow/underflow as tainted [TAI] |
| | CWE-198: Use of Incorrect Byte Ordering | Words in byte sequence from external sources marked as tainted [TBS], invokes handlers on use. Other situations handled by compiler. |

Example details on how SP handles some vulnerability classes is discussed below.

Buffer Errors

In SP, buffer errors are avoided by using protected fenced memory regions in general. In buffer overflow attacks that center on a stack and compromise function call and return control flow, word and instruction tags detect control flow compromises as follows. The key idea here is to enforce that the return from a function uses a legitimate return address from the call stack and that control returns to the instruction immediately following the call instruction (implemented using a JALR or JAL on the RISC-V). The SP accomplishes this as follows:

1. The control logic implementing a Call instruction is augmented to tag the return address pushed onto the call stack as a "return" address. The return address tag is generated only by the Call instruction. The return address tag also marks the word as immutable (that is not overwriteable) and permits only a return instruction (tagged appropriately) to use this return address. Word tagged as a return address cannot also be copied (for instance by using a LOAD).

2. The instruction following a call, which is the point of return, is tagged by the compiler as the target of a return.

3. The Return instruction or the JUMP instruction implementing a function call return is tagged as a "return" instruction by the compiler.

Control flow returns only when the target address on the call stack is marked as a return address and the next instruction executed is marked as the target of a return. A successfully executed return also resets the stack location associated with the return address used to permit overwrites during subsequent usage.

For relocation of stacks and context switches, tag checking is turned off momentarily by a trusted code and stack words, including words tagged as a return address can be copied and written elsewhere.

This simple data word-tagging and instruction-tagging mechanism prevents the simple "stack smashing" attacks as well as libc attacks [40], and more sophisticated return-oriented programming attacks [27] that all use buffer overruns to overwrite return addresses on the attack. Overwrites to stack locations that hold the return address are prevented, and raise an exception because of the "return" address tag, which prevents overwrites and copying. Further, for libc and ROP attacks, arbitrary gadgets cannot be constructed, as the instruction at the point of the misdirected return is not tagged as a legitimate instruction following a call by the compiler in general.

The tag-based implementation of proper function call and return control flow has significant advantages compared to shadow stacks that provide similar functionality (for example, as recently introduced by Intel [29]). The shadow stack mechanism essentially saves the return address at the time of a call on a separate shadow stack. At the time of a return, the return address used for the normal call stack is compared against the return address saved on the shadow stack and an exception is triggered on a mismatch. The shadow stack needs to be implemented in a protected area and also needs to be saved and restored on context switches. SP eliminates the need to implement and manage a shadow stack across context switches. The mechanism also imposes zero performance overhead (i.e., the protection mechanism does not add any execution overhead when the security checks pass, other than the performance degradation caused by additional accesses to tags, which are mitigated using the encoded tag cache hierarchy and tag perfecting), and is far less complicated than exotic architectural support that has been proposed for detecting ROP attacks [4, 5, 31].

Enforcing Control Flow for Indirect/Computed Branches

The legal targets of an indirect jump are all tagged as such at compile time. When an indirect jump executes, the tag of the target is verified to be marked as a target for the indirect branch; an exception is generated if the indirect branch attempts to transfer control to any instruction that is not marked as a target. Jump-oriented programming attacks that construct attack gadgets by stringing together existing instruction chunks through the modification of targets of indirect jumps [6] are thus not possible. Again, the SP is far simpler compared to proposed solutions like [4, 5], or the use of special instructions at the target of indirect branches, as in a recent Intel solution [29], and has a zero performance overhead.

Note that with the SP tagging scheme, it is still possible for an indirect jump to legally transfer control to the marked target of another indirect jump. Although this would be a relatively difficult exploit, the SP can protect against this by storing an in-line metadata tag at the target that holds a unique-compiler-generated label derived from the indirect branch's virtual address. This metadata-bearing word is followed by the original instruction at the target. Control transfer is allowed only after validating this label and ensuring that the jump target is labeled as a legitimate target. This approach is similar to what has been used for enforcing control flow integrity in software [1].

Protecting Transfer Vectors and Function Pointer Tables

A class of attacks redirect control flow from the intended path by altering the address of virtual functions used by many programming languages (for example, Vtable attacks for C++ programs) or jump vectors stored in jump tables by the linker for dynamically linked code modules. Tagging these table entries as immutable jump table entry prevents them from being overwritten by malicious code and also ensures their proper use by jump instructions.

Preserving Code Integrity

At the page level, data segments have an associated NX (no-execute flag) for each page within the segment. In addition, instructions are tagged as immutable by the compiler, so they cannot be altered. Together, these mechanisms ensure code integrity is preserved. However, there are legitimate reasons for using run-time code modification in current systems. Many OSs use self-modifying code at boot time for booting off a small image. Similarly, bytecode interpreters in languages such as Java rely on code modification for performance optimization. A solution to permitting these undesirable legacy practices is to validate the code that performs this on-the-fly modification, and rely on the trusted software module that can directly access and update the tags before and after modification. To do this, the permitted functions that modify the binaries at run-time are implemented within their own protection domain and they are permitted to call functions within the domain runs the functions that perform the code modifications. This permission is granted through explicit entries in an access control list for the protection domain that implements the tag updates.

SQL Injection and Cross-Domain Scripting

Both SQL injection and cross-domain scripting vulnerabilities stem from the use of potentially tainted inputs. The SP marks such inputs as tainted with the word tag [TAT]. Byte sequences are put into words, and the constituent words bear this tag. The SP does not rely on hardware to perform the validation of arguments, as the process is very complex. Instead, any attempt to use such tainted arguments trigger a context-specific check by a handler. In some cases, the handler may be encapsulated in the domain where the argument is processed or used, and is invoked through a locally-handled trap as a function call with low overhead. As an example in the case of SQL injection, the SQL database and its associated functions can be encapsulated in a protection domain with a handler to check the byte string passed on as argument. On exit from the validation function (which will typically call trusted functions for validating the argument as legal, for example using SQL whitelists and/or blacklists and other mechanisms), normal exception handling is automatically restored.

General Implementation of the Security Extensions

The SP technologies are implementation-agnostic across many RISC ISAs. The narrow tags and in-line metadata tags facilitate this. Extending tag storage to instruction and data caches facilitate the performance scaling, along with use of known techniques for mitigating the overhead of tag accesses. It is worth noting that the SP system, as described herein, does not use all of the 256 tag values that are possible with 8-bit word tags. This permits other tag values to be used in ways that can evolve as the SP design matures during or beyond the project, and other extensions consistent with the SP architecture or independent of it.

The access control policies used for protection domains in SP are also very flexible, as the access control code can be implemented in software within trusted handlers that can be invoked quickly as a local handler. Thus, SP's security architecture provides flexibility in the design and use of tags, as well as in crafting a variety of security policies.

In the SP, the code associated with protection domains is designed to support multithreading and SMP (multicore) implementations. Utilities for SP are also designed to be thread-safe. Cross-domain parameter passing registers, bounds, special registers containing a local handler address(es), and tags associated with general-purpose registers in the ISA, have to be all part of the context of a process/thread and need to be saved on context switches. Extending the tags to the instruction and data caches permit exiting cache coherence mechanisms to be easily used for SP for multicore implementations with cache coherence logic.

For CISC ISAs like the x86, variable-length instructions do impose an addressing challenge for the instruction tags in separate pages from the code. The solution to be used for incorporating the SP security mechanism for detecting software vulnerability exploits relies on instructions being non-writable, and stores instructions adjacent to their tags, and the instruction decoder is modified to take the (uniform-sized) instruction tags into account. The compiler also takes into account the tag size for generating the offsets used in PC-relative addressing.

It is also possible to use 4-bit encoded tags for SP, which makes it easy to pad memory lines containing instruction tags and simplify instruction tag addressing. There are many specific optimizations that can reduce the performance overhead of a x86 CPU including the SP security mechanisms, compared to the baseline traditional implementation.

For example, micro-op (uop) trace caches used in many x86 implementations, which contain validated traces and security checks (and associated performance delays and power dissipations), can be avoided when the trace is re-executed and other performance boosting artifacts built around trace caches (such as group commitment) can be used.

REFERENCES

Each of the following is expressly incorporated herein by reference in its entirety.

1. Abadi, M., M. Budiu, Ú. Erlingsson, and J. Ligatti, "Control-flow Integrity", in Proceedings of the 12th ACM Conference on Computer and Communications Security, pp. 340-353. ACM, 2005.
2. Air Force Research Laboratory Report No. AFRL-RI-RS-TR-2015-210, *Security-Tagged Architecture Co-Design (STACD)*, September 2015.
3. Air Force Research Laboratory, Publicly-released information on the T-Core project, provided by J. Rooks, in email to J. Kiernan at Lockheed-Martin, May 19, 2017.
4. Aktas, E., F. Afram, K. Ghose, "Continuous, Low Overhead, Run-Time Validation of Program Executions", in IEEE Proceedings of the 47th Annual Symposium on Microarchitecture (MICRO), (2014), pp. 229-241.
5. Arora, D., Ravi, S., Raghunathan, A., and Jha, N. K. "Hardware-assisted run-time monitoring for secure program execution on embedded processors." IEEE Transactions on Very Large Scale Integration (VLSI) Systems 14, no. 12 (2006): 1295-1308.
6. Bletsch T., X. Jiang, V. W. Freeh, Z. Liang, "Jump oriented programming: a new class of code-reuse attack", In Proc. of the 6th ACM Symposium on Information, Computer and Communications Security. ASIACCS, pp. 30-40, 2011.
7. Chen, Y.-Y., P. A. Jamkhedkar, and R. B. Lee, "A Software Hardware Architecture for Self-Protecting Data", in Proceedings of the ACM Conference on Computer and Communications Security, pp. 14-27. ACM, 2012.
8. Cheng, B.-C., and W.-M. Hwu, "Modular Interprocedural Pointer Analysis using Access Paths: Design, Implementation, and Evaluation", in ACM SIGPLAN Notices 35, no. 5 (2000), pp. 57-69.
9. Choi, J.-D., M. Burke, and P. Carini. "Efficient Flow-sensitive Interprocedural Computation of Pointer-induced Aliases and Side effects", in Proceedings of the 20th ACM SIGPLAN-SIGACT symposium on Principles of programming languages, pp. 232-245, 1993.
10. Costan, V, Ilia Lebedev, and Srinivas Devadas, "Sanctum: Minimal Hardware Extensions for Strong Software Isolation", in Proceedings of the 25th Usenix Security Symposium, 2016, pp. 857-874.
11. Costan, V. and Srinivas Devadas, "Intel SGX Explained", Cryptology ePrint Archive, Report 2016/086, February 2016.
12. Crandall, J. R. and F. T. Chong, "MINOS: Control Data Attack Prevention Orthogonal to Memory Model", in Proceedings of the 37th Intl. Symposium on Microarchitecture, Portland, Oreg., December 2004.
13. Dalton, M., H. Kannan, and C. Kozyrakis, "Raksha: A Flexible Information Flow Architecture for Software Security", in Proceedings of the International Symposium on Computer Architecture (ISCA), pp. 482-493, 2007.
14. De Moura, L., and N. Bjørner, "Z3: An efficient SMT solver", in Proceedings of International conference on Tools and Algorithms for the Construction and Analysis of Systems, pp. 337-340, 2008.
15. Dhawan, U., C. Hritcu, R. Rubin, N. Vasilakis, S. Chiricescu, J. M. Smith, T. F. Knight, Jr., B. C. Pierce and A. DeHon, "Architectural Support for Software-Defined Metadata Processing", in Proceedings of the 20-th International Conference on Architectural Support for Programming Languages and Operating Systems, pp. 487-502, 2015.
16. Emami, M., R. Ghiya, and L. J. Hendren. "Context-Sensitive Interprocedural Points-to Analysis in the Presence of Function Pointers, in ACM SIGPLAN Notices, vol. 29, no. 6, pp. 242-256, 1994.

17. Evtyushkin, D. E., J. Elwell, M. Ozsoy, D. Ponomarev, N. Abu-Ghazaleh and R. Riley, "Iso-X: A Flexible Architecture for Hardware-Managed Isolated Execution", in Proceedings of the 47-th Annual Symposium on Microarchitecture (MICRO), (2014), pp. 190-202. IEEE.
18. Fahndrich, M., J. S. Foster, Z. Su, and A. Aiken, "Partial Online Cycle Elimination in Inclusion Constraint Graphs", in Proceedings Proceedings of the ACM SIGPLAN Conference on Programming Language Design and Implementation (PLDI '98), pp. 85-96, 1998.
19. Feustel, Edward A, "On the Advantages of Tagged Architectures", in IEEE Transactions on Computers, Vol. 22 (7), pp. 644-652, July 1973.
20. Ghose K. and P. Vasek, "A Fast Capability Extension to a RISC Architecture", in Proceedings of the EUROMICRO Conference, September 1996, pp. 606-614.
21. Ghose, K. and M. B. Kamble, "Reducing Power in Superscalar Processor Caches using Subbanking, Multiple Line Buffers and Bit-line segmentation", in Proceedings of the 1999 international symposium on Low Power Electronics and Design (ISLPED '99), pp. 70-75, 1999.
22. Graham, B, Protection in an Information Processing Utility, in Communications of the ACM, Volume 11, pp. 306-312, May 1968.
23. Halfond, W. G. J., and A. Orso, "AMNESIA: Analysis and Monitoring for NEutralizing SQL-Injection Attacks", in Proceedings of the 20th IEEE/ACM international Conference on Automated Software Engineering (ASE '05), pp. 174-183, 2005.
24. Hardekopf, B., and C. Lin, "The Ant and the Grasshopper: Fast and Accurate Pointer Analysis for Millions of Lines of Code", in ACM SIGPLAN Notices, vol. 42, no. 6, pp. 290-299, 2007.
25. Heintze, N., and O. Tardieu, "Ultra-fast Aliasing Analysis using CLA: A Million Lines of C Code in a Second", in ACM SIGPLAN Notices, vol. 36, no. 5, pp. 254-263, 2001.
26. Houdek, M. E., F. G. Soltis, and R. L. Hoffman, "IBM System/38 Support for Capability-based Addressing", in Proceedings of the Eighth Annual Symposium on Computer Architecture, pp. 341-348, 1981.
27. Hund R., T. Holz and F. Freiling, "Return oriented rootkits: Bypassing kernel code integrity protection mechanisms", in Proc. of Usenix Security Symposium, pp. 383-398, 2009.
28. Intel Corporation., *Intel Memory Protection Extensions Enabling Guide*, software.intel.com/sites/default/files/managed/9d/f6/Intel_MPX_EnablingGuide.pdf Accessed: 2017-05-30.
29. Intel Corporation, Control-flow Enforcement Technology Preview, Document Number: 334525-001, June 2016.
30. Intel Corporation, *Introduction to the iAPX 432 Architecture*, Manual No. 171821-001, 1981.
31. Kayaalp M., Ozsoy M., Abu-Ghazaleh N., Ponomarev D., "Branch Regulation: Low Overhead Protection Fron Code Reuse Attacks", 39th Int'l. Symp. on Computer Architecture (ISCA), pp. 94-105, 2012.
32. Landi, W., and B. G. Ryder. "A Safe Approximate Algorithm for Interprocedural Pointer Aliasing", ACM SIGPLAN Notices 39, no. 4 (2004), pp. 473-489.
33. Levy, H. M., *Capability-Based Computer Systems*, Digital Press, 1984.
34. McKeen, F., I. Alexandrovich, A. Berenzon, C. Rozas, H. Shafi, V. Shanbhogue, and U. R. Savagaonkar, "Innovative Instructions and Software Model for Isolated Execution", in Proceedings of the Workshop on Hardware and Architectural Support for Security and Privacy (HASP), pp. 10:1-10:8, 2013.
35. Moon, D. A., "Architecture of the Symbolics 3600", in Proceedings of the $12^{th}$. Annual International Symposium on Computer Architecture, ISCA, pp. 76-83, 1985. IEEE Computer Society.
36. Nystrom, Erik, Hong-Seok Kim, and Wen-Mei Hwu. "Bottom-up and Top-down Context-sensitive Summary-based Pointer Analysis." Static Analysis, pp. 165-180, 2004.
37. Organick, E. I, *Computer System Organization: The B5700/B6700 Series*, Academic Press, 1973.
38. Pietraszek, T. and C. V. Berghe, "Defending Against Injection Attacks through Context-Sensitive String Evaluation", in Proceedings of the Recent Advances in Intrusion Detection Symposium, Seattle, Wash., September 2005.
39. Qin, F., C. Wang, Z. Li, H. Seop Kim, Y. Zhou, and Y. Wu, "LIFT: A Low-Overhead Practical Information Flow Tracking System for Detecting Security Attacks", in Proceedings of the 39th the Intl. Symposium on Microarchitecture, Orlando, Fla., December 2006.
40. Shacham H. "The Geometry of Innocent Flesh on the Bone: Return-into-libc without Function Calls (on the x86)", In14th The ACM Conference on Computer and Communications Security (CCS), pp. 552-561, 2007.
41. Shioya, R., D. Kim, K. Horio, M. Goshima, and S. Sakai, Low-overhead Architecture for Security Tag, in Proceedings of the 2009 15th IEEE Pacific Rim International Symposium on Dependable DComputing, PRDC '09, pages 135-142, Washington, D.C., USA, 2009. IEEE Computer Society.
42. Suh, G. E., J. W. Lee, D. Zhang, and S. Devadas., "Secure Program Execution via Dynamic Information Flow Tracking", in Proceedings of the 11th Intl. Conference on Architectural Support for Programming Languages and Operating Systems, Boston, Mass., October 2004, In ACM Sigplan Notices, vol. 39, no. 11, pp. 85-96. ACM, 2004.
43. Sui, Y., and J. Xue. "SVF: Interprocedural Static Value-flow Analysis in LLVM", in Proceedings of the 25th ACM International Conference on Compiler Construction, pp. 265-266, 2016.
44. Sullivan, G., "The Dover Architecture", presentation at New England Security Day, Nov. 28, 2016
45. Vachharajani, N., M. J. Bridges, J. Chang, R. Rangan, G. Ottoni, J. A. Blome, G. A. Reis, M. Vachharajani, and D. I. August, "RIFLE: An Architectural Framework for User-Centric Information-Flow Security", in Proceedings of the 37th Intl. Symposium on Microarchitecture, Portland, Oreg., December 2004.
46. Vasek, P. and K. Ghose, "A Comparison of Two Context Allocation Approaches for Fast Protected Calls", in Proceedings of the IEEE Conference on High-Performance Computing (HiPC), December 1997, pp. 16-21.
47. Whaley, J., and M. S. Lam. "Cloning-based Context-Sensitive Pointer Alias Analysis Using Binary Decision Diagrams", in ACM SIGPLAN Notices, vol. 39, no. 6, pp. 131-144, 2004.
48. Witchel, E., J. Cates, and K. Asanovic, "Mondrian Memory Protection", in Proceedings of the 10th International Conference on Architectural Support for Programming Languages and Operating Systems, ASPLOS X, Vol. 37, no. 10. pp. 304-316, New York, N.Y., USA, 2002. ACM.
49. Woodruff, J., R. N. Watson, D. Chisnall, S. W. Moore, J. Anderson, B. Davis, B. Laurie, P. G. Neumann, R. Norton and M. Roe, "The CHERI Capability Model: Revisiting RISC in an Age of Risk", in Proceedings of the International Symposium on Computer Architecture (ISCA), pages 457-468, June 2014.
50. Wulf, W. A., S. P. Levin and S. P. Harbison, *Hydra/Cmmp: An Experimental Computer System*, McGraw-Hill, 1981.
51. Xu, W., S. Bhatkar, and R. Sekar, "Taint-enhanced Policy Enforcement: A Practical Approach to Defeat a Wide Range of Attacks", in Proceedings of the 15th USENIX Security Conference, Vancouver, Canada, August 2006.
52. Zhu, J., "Towards Scalable Flow and Context Sensitive Pointer Analysis", in Proceedings of the 42nd annual Design Automation Conference, pp. 831-836, 2005.
53. Achermann, Reto, Chris Dalton, Paolo Faraboschi, Moritz Hoffmann, Dejan Milojicic, Geoffrey Ndu, Alexander Richardson, Timothy Roscoe, Adrian L. Shaw, and Robert N M Watson. "Separating Translation from Protection in Address Spaces with Dynamic Remapping." In Proceedings of the 16th Workshop on Hot Topics in Operating Systems, pp. 118-124. ACM, 2017.
54. Aga, Shaizeen, and Satish Narayanasamy. "InvisiMem: Smart memory defenses for memory bus side channel." In ACM SIGARCH Computer Architecture News, vol. 45, no. 2, pp. 94-106. ACM, 2017.
55. Arora, Divya, Srivaths Ravi, Anand Raghunathan, and Niraj K. Jha. "Secure embedded processing through hardware-assisted run-time monitoring." In Design, Automation and Test in Europe, 2005. Proceedings, pp. 178-183. IEEE, 2005.
56. Belay, Adam, Andrea Bittau, Ali José Mashtizadeh, David Terei, David Maziéres, and Christos Kozyrakis. "Dune: Safe User-level Access to Privileged CPU Features." In Osdi, vol. 12, pp. 335-348. 2012.
57. Chen, Chun-Chung, Shih-Hao Hung, and Chen-Pang Lee. "Protection against Buffer Overflow Attacks via Dynamic Binary Translation." In Reliable and Autonomous Computational Science, pp. 305-324. Springer, Basel, 2011.
58. Chien, Andrew A., and Jay H. Byun. "Safe and protected execution for the morph/AMRM reconfigurable processor." In Field-Programmable Custom Computing Machines, 1999. FCCM'99. Proceedings. Seventh Annual IEEE Symposium on, pp. 209-221. IEEE, 1999.
59. Corliss, Marc L., E. Christopher Lewis, and Amir Roth. "DISE: A programmable macro engine for customizing applications." In Computer Architecture, 2003. Proceedings. 30th Annual International Symposium on, pp. 362-373. IEEE, 2003.
60. Cox, Benjamin, David Evans, Adrian Filipi, Jonathan Rowanhill, Wei Hu, Jack Davidson, John Knight, Anh Nguyen-Tuong, and Jason Hiser. "15th USENIX Security Symposium."
61. Dagit, Jason, Simon Winwood, Jem Berkes, and Adam Wick. "Code re-use attacks and their mitigation." (2017).
62. Ferraiuolo, Andrew, Mark Zhao, Andrew C. Myers, and G. Edward Suh. "HyperFlow: A processor architecture for nonmalleable, timing-safe information flow security." In Proceedings of the 2018 ACM SIGSAC Conference on Computer and Communications Security, pp. 1583-1600. ACM, 2018.
63. Ferraiuolo, Andrew, Yuqi Zhao, G. Edward Suh, and Andrew C. Myers. HyperFlow: A Processor Architecture for Timing-Safe Information-Flow Security. 2018.
64. Fu, Jianming, Rui Jin, and Yan Lin. "FRProtector: Defeating Control Flow Hijacking Through Function-Level Randomization and Transfer Protection." In International Conference on Security and Privacy in Communication Systems, pp. 659-672. Springer, Cham, 2017.
65. González, Julián A. "Hardware Modifications to Prevent Code Reuse Attacks." (2014).
66. Havet, Aurélien, Rafael Pires, Pascal Felber, Marcelo Pasin, Romain Rouvoy, and Valerio Schiavoni. "SecureStreams: A Reactive Middleware Framework for Secure Data Stream Processing." In Proceedings of the 11th ACM International Conference on Distributed and Event-based Systems, pp. 124-133. ACM, 2017.
67. Hoefler, Torsten, Salvatore Di Girolamo, Konstantin Taranov, Ryan E. Grant, and Ron Brightwell. "sPIN: High-performance streaming Processing in the Network." In Proceedings of the International Conference for High Performance Computing, Networking, Storage and Analysis, p. 59. ACM, 2017.
68. Joannou, Alexandre, Jonathan Woodruff, Robert Kovacsics, Simon W. Moore, Alex Bradbury, Hongyan Xia, Robert N M Watson et al. "Efficient Tagged Memory." In Computer Design (ICCD), 2017 IEEE International Conference on, pp. 641-648. IEEE, 2017.
69. Jungwirth, Patrick, Phil Chan, Eric Imsand, and Hameed Badawy. "Security tag computation and propagation in OSFA." In Cyber Sensing 2018, vol. 10630, p. 1063004. International Society for Optics and Photonics, 2018.
70. Jungwirth, Patrick, Philip Chan, Thomas Barnett, and Abdel-Hameed Badawy. "Cyber defense through hardware security." In Disruptive Technologies in Information Sciences, vol. 10652, p. 106520P. International Society for Optics and Photonics, 2018.
71. Kannan, Hari, Michael Dalton, and Christos Kozyrakis. "Decoupling dynamic information flow tracking with a dedicated coprocessor." In Dependable Systems & Networks, 2009. DSN'09. IEEE/IFIP International Conference on, pp. 105-114. IEEE, 2009.
72. Kim, Channoh, Jaehyeok Kim, Sungmin Kim, Dooyoung Kim, Namho Kim, Gitae Na, Young H. Oh, Hyeon Gyu Cho, and Jae W. Lee. "Typed Architectures: Architectural Support for Lightweight Scripting." ACM SIGOPS Operating Systems Review 51, no. 2 (2017): 77-90.
73. Lentz, Matthew, Rijurekha Sen, Peter Druschel, and Bobby Bhattacharjee. "SeCloak: ARM Trustzone-based Mobile Peripheral Control." (2018).
74. Lie, David, Chandramohan Thekkath, Mark Mitchell, Patrick Lincoln, Dan Boneh, John Mitchell, and Mark Horowitz. "Architectural support for copy and tamper resistant software." ACM SIGPLAN Notices 35, no. 11 (2000): 168-177.
75. Liu, Tao, Hui Guo, Sri Parameswaran, and Sharon X. Hu. "iCETD: An improved tag generation design for memory data authentication in embedded processor systems." Integration, the VLSI Journal 56 (2017): 96-104.
76. Liu, Tong, Gang Shi, Liwei Chen, Fei Zhang, Yaxuan Yang, and Jihu Zhang. "TMDFI: Tagged Memory Assisted for Fine-Grained Data-Flow Integrity Towards Embedded Systems Against Software Exploitation." In 2018 17th IEEE International Conference On Trust, Security And Privacy In Computing And Communications/12th IEEE International Conference On Big Data Science And Engineering (TrustCom/BigDataSE), pp. 545-550. IEEE, 2018.
77. Reddy, A L Narasimha, and Prithviraj Banerjee. "A fault secure dictionary machine." In Data Engineering, 1987 IEEE Third International Conference on, pp. 104-110. IEEE, 1987.

78. Roessler, Nick, and André DeHon. "Protecting the stack with metadata policies and tagged hardware." In 2018 IEEE Symposium on Security and Privacy (SP), pp. 478-495. IEEE, 2018.

79. Shioya, Ryota, Daewung Kim, Kazuo Horio, Masahiro Goshima, and Shuichi Sakai. "Low-overhead architecture for security tag." IEICE TRANSACTIONS on Information and Systems 94, no. 1 (2011): 69-78.

80. Skorstengaard, Lau, Dominique Devriese, and Lars Birkedal. "Enforcing well-bracketed control flow and stack encapsulation using linear capabilities." In PriSC 2018 Principles of Secure Compilation. 2018.

81. Sullivan, Gregory T., André DeHon, Steven Milburn, Eli Boling, Marco Ciaffi, Jothy Rosenberg, and Andrew Sutherland. "The Dover inherently secure processor." In Technologies for Homeland Security (HST), 2017 IEEE International Symposium on, pp. 1-5. IEEE, 2017.

82. Tiwari, Mohit, Banit Agrawal, Shashidhar Mysore, Jonathan Valamehr, and Timothy Sherwood. "A small cache of large ranges: Hardware methods for efficiently searching, storing, and updating big dataflow tags." In Proceedings of the 41st annual IEEE/ACM International Symposium on Microarchitecture, pp. 94-105. IEEE Computer Society, 2008.

83. Watson, Robert Nicholas, Peter G. Neumann, and Simon W. Moore. "Balancing Disruption and Deployability in the CHERI Instruction-Set Architecture (ISA)." MIT Press, 2017.

84. Watson, Robert N M, Jonathan Woodruff, Michael Roe, Simon W. Moore, and Peter G. Neumann. Capability Hardware Enhanced RISC Instructions (CHERI): Notes on the Meltdown and Spectre Attacks. No. UCAM-CL-TR-916. University of Cambridge, Computer Laboratory, 2018.

85. Wilkerson, Christopher B. "System and method to bypass execution of instructions involving unreliable data during speculative execution." U.S. Pat. No. 7,114,059, issued Sep. 26, 2006.

86. Wong, Ming Ming, Jawad Haj-Yahya, and Anupam Chattopadhyay. "SMARTS: secure memory assurance of RISC-V trusted SoC." In Proceedings of the 7th International Workshop on Hardware and Architectural Support for Security and Privacy, p. 6. ACM, 2018.

87. Woodruff, Jonathan David, A. Joannou, Robert Kovacsics, Simon William Moore, A. Bradbury, H. Xia, R. N. M. Robert et al. "Efficient Tagged Memory." (2018).

88. Xia, Yubin, Yutao Liu, Haibo Chen, and Binyu Zang. "CFIMon: Detecting violation of control flow integrity using performance counters." In Dependable Systems and Networks (DSN), 2012 42nd Annual IEEE/IFIP International Conference on, pp. 1-12. IEEE, 2012.

89. Yang, L. I., and Jun-wei L I. "A Technique Preventing Code Reuse Attacks Based on RISC Processor." DEStech Transactions on Computer Science and Engineering CCNT (2018).

90. Yao, Zhihao, Saeed Mirzamohammadi, Ardalan Amiri Sani, and Mathias Payer. "Milkomeda: Safeguarding the Mobile GPU Interface Using WebGL Security Checks." In Proceedings of the 2018 ACM SIGSAC Conference on Computer and Communications Security, pp. 1455-1469. ACM, 2018.

91. Zeldovich, Nickolai, Hari Kannan, Michael Dalton, and Christos Kozyrakis. "Hardware Enforcement of Application Security Policies Using Tagged Memory." In OSDI, vol. 8, pp. 225-240. 2008.

92. Zeldovich, Nickolai, Silas Boyd-Wickizer, Eddie Kohler, and David Mazières. "Making information flow explicit in HiStar." In Proceedings of the 7th symposium on Operating systems design and implementation, pp. 263-278. USENIX Association, 2006.

What is claimed is:

1. A secure microprocessor, comprising:
a logic execution unit configured to process data based on instructions, subject to interaction with a tag processing unit to enforce instruction execution restrictions and a control transfer processing unit to enforce control transfer restrictions;
a cache comprising a cache line having memory locations for storing instructions, and memory locations for storing instruction tags accompanying each respective instruction, the cache being configured to receive the instructions and instruction tags from a memory external to the secure microprocessor, wherein the cache line is configured to store a plurality of instructions and a plurality of accompanying instruction tags;
the tag processing unit, configured to enforce the execution restrictions with respect to execution of instructions from the cache line, access to resources, and manipulation of data, selectively dependent on the accompanying instruction tag from the cache line for each respective instruction, and concurrently interacting with the logic execution unit dependent on the execution restrictions; and
the control transfer processing unit, configured to enforce the control transfer restrictions based on a validity of instructions comprising a control flow instruction defining at least an entry point of each control transfer, selectively dependent on a respective accompanying instruction tags for the respective instruction from the cache line, and interacting with the logic execution unit dependent on the control transfer restrictions.

2. The secure microprocessor according to claim 1, wherein each of the tag processing unit, the cache, the logic execution unit, and the control transfer processing unit comprises a distinct dedicated hardware component.

3. The secure microprocessor according to claim 1, wherein the tag processing unit is further configured to ensure compliance with at least one rule, selected from the group consisting of data type rules, memory access rules, context-specific data usage rules, source-dependent data usage rules, data modification rules, source-dependent instruction execution rules, context-dependent instruction execution rules, instruction sequence modification rules, and control transfer instruction rules.

4. The secure microprocessor according to claim 1, wherein the accompanying instruction tag is used in conjunction with a data tag associated with the data to restrict use of a memory address calculated using the data, by the respective instruction for an operation, selected from the group consisting of a control transfer via indirect jump, a function call, a function return and memory access.

5. The secure microprocessor according to claim 1, wherein the tag processing unit is further configured to enforce a restriction on use of an instruction, selected from the group consisting of use of an instruction to control flow to a legal path, to call a function, to return from a function call, to access a protected domain or module, to perform a legal operation based on the source data type, and to bound access to a fenced memory region.

6. The secure microprocessor according to claim 1, wherein the cache is configured to concurrently store a respective instruction, data associated with the instruction, and a respective accompanying instruction tag for each respective instruction.

7. The secure microprocessor according to claim 1, wherein the tag processing unit is further configured to respond to an accompanying instruction tag having a plurality of privilege levels, to respectively restrict access by the logic execution unit dependent on a respective privilege level corresponding to the accompanying instruction tag.

8. The secure microprocessor according to claim 1, wherein the tag processing unit is further configured to:
determine that at least one accompanying instruction tag in conjunction with at least one data tag indicates tainted data, and
restrict use of the tainted data by the logic execution unit.

9. The secure microprocessor according to claim 1, further comprising a cryptographic processing unit, configured to perform cryptographic operations on information communicated through a communication interface unit, wherein the cryptographic unit employs a distinct cryptographic key selectively dependent on at least one of a respective accompanying instruction tag and a respective thread of instruction execution.

10. The secure microprocessor according to claim 1, further comprising an address translation unit configured to map logical memory spaces to physical memory pages of the memory external to the secure microprocessor, and retrieve the physical memory pages for storage in the cache.

11. The secure microprocessor according to claim 10, wherein the address translation unit is further configured to maintain a privilege restriction on memory pages of instructions and tags which restricts reading, writing, and execution, unless accessed by trusted hardware or according to an instruction having an accompanying instruction which indicates sufficient access privileges.

12. The secure microprocessor according to claim 1, wherein each instruction of a set of instructions comprising a code segment is accompanied by an accompanying instruction tag comprising metadata indicating at least one of a security level or a privilege level, wherein the tag processing unit is further configured to compare the security level or the privilege level of the respective instruction with a security level or a privilege level indicated by the respective accompanying instruction tag of a calling instruction of the code segment.

13. The secure microprocessor according to claim 1, wherein the logic execution unit and the tag processing unit are synchronized in processing of the instructions and enforcement of the dependent on the accompanying instruction tags.

14. The secure microprocessor according to claim 1, wherein the logic execution unit further comprises a logic execution pipeline, and the tag processing unit further comprises a tag processing pipeline, the logic execution pipeline and the tag processing pipeline providing coordinated processing of respective instructions and accompanying instruction tags from the cache line, wherein at least one of:
the tag processing pipeline has a tag processing stage which relies on information provided by at least one stage of the logic execution pipeline;
the logic execution pipeline selectively processes instructions in dependence on signal generated by stages of the tag processing pipeline; and
the tag processing pipeline is dependent on information received from the logic execution pipeline dependent on the instructions, and the logic execution pipeline is dependent on information received from the tag processing pipeline dependent on the accompanying instruction tags.

15. The secure microprocessor according to claim 1, is further configured to receive a respective instruction based on a respective instruction address of the memory external to the secure microprocessor, and to receive the accompanying instruction tag based on the respective instruction address.

16. The secure microprocessor according to claim 1, further comprising a communication interface unit configured to:
determine an address of instructions to be retrieved;
perform a check to determine whether the address is within a predefined memory region demarcated by a set of guard memory words, the predefined memory region having a starting address of a string of memory locations containing the instructions to be retrieved;
retrieve an instruction and the accompanying instruction tag from the memory external to the secure microprocessor according to the address, and
store the retrieved instruction and the accompanying instruction tag in the cache.

17. A secure microprocessor, comprising:
a cache comprising a cache line, each cache line comprising memory locations configured to store an instruction, and a memory location for storing a tag accompanying each instruction, wherein the cache line is configured to store a plurality of instructions and a plurality of accompanying tags;
a tag processing unit, configured to receive the accompanying tag from the cache line, concurrently enforce a specific restriction with respect to at least execution of the instruction, access to at least one resource, and manipulation of data, selectively dependent on the accompanying tag from the cache line;
a control transfer processing unit, configured to validate each instruction comprising a control transfer instruction for control flow execution and entry point, selectively dependent on at least the accompanying tag from the cache line; and
a logic execution unit comprising an instruction processing pipeline, configured to receive the instruction from the cache line, decode the instruction, and process the data based on the instruction in the instruction processing pipeline, subject to enforcement of the specific restrictions by the tag processing unit, and validation of the control transfer instruction by the control transfer processing unit.

18. A secure processing method, comprising:
transferring a plurality of instructions in conjunction with tags accompanying each respective instructions, from a memory external to a secure microprocessor to a cache comprising a cache line, each cache line comprising first memory locations for storing the plurality of instructions and second memory locations for storing the tags accompanying each respective instruction, wherein the cache line is configured to store a plurality of the instructions and a plurality of the tags;
enforcing, by a tag processing unit, specific restrictions with respect to at least concurrent execution of instructions, concurrent access to resources, and concurrent manipulation of data by an instruction execution unit, selectively dependent on the accompanying tags from the second memory locations; and
validating, by a control transfer processing unit, a control flow instruction execution and an entry point address of each control transfer, selectively dependent on at least the respective accompanying tags from the second memory locations.

19. The secure processing method according to claim 18, wherein the accompanying tags are used in conjunction with data tags associated with the data to restrict use of a memory address calculated using the data, by the respective instruction for an operation selected from the group consisting of selected from the group consisting of a control transfer via indirect jump, a function call, a function return and memory access.

20. The secure microprocessor according to claim 17, wherein the accompanying tag is used in conjunction with a data tag associated with the data to restrict use of a memory address calculated using the data, by the respective instruction for an operation selected from the group consisting of selected from the group consisting of a control transfer via indirect jump, a function call, a function return and memory access.

\* \* \* \* \*